(12) United States Patent
Zenou et al.

(10) Patent No.: US 11,420,397 B2
(45) Date of Patent: Aug. 23, 2022

(54) METHOD AND SYSTEM FOR ADDITIVE-ABLATIVE FABRICATION

(71) Applicant: IO Tech Group Ltd., London (GB)

(72) Inventors: Michael Zenou, Hashmonaim (IL); Ziv Gilan, Kfar Harif (IL)

(73) Assignee: IO Tech Group Ltd., London (GB)

( * ) Notice: Subject to any disclaimer, the term of this patent is extended or adjusted under 35 U.S.C. 154(b) by 94 days.

(21) Appl. No.: 16/911,804

(22) Filed: Jun. 25, 2020

(65) Prior Publication Data
US 2020/0324487 A1    Oct. 15, 2020

Related U.S. Application Data

(60) Continuation of application No. 16/730,610, filed on Dec. 30, 2019, which is a continuation of application
(Continued)

(51) Int. Cl.
*B29C 64/393* (2017.01)
*B23K 26/402* (2014.01)
(Continued)

(52) U.S. Cl.
CPC .......... *B29C 64/393* (2017.08); *B23K 26/402* (2013.01); *B29C 64/106* (2017.08);
(Continued)

(58) Field of Classification Search
CPC ... B29C 64/393; B29C 64/106; B29C 64/112; B29C 64/118; B29C 64/165;
(Continued)

(56) References Cited

U.S. PATENT DOCUMENTS

| 4,575,330 A | 3/1986 | Hull |
|---|---|---|
| 5,204,055 A | 4/1993 | Sachs et al. |
| (Continued) | | |

FOREIGN PATENT DOCUMENTS

| CN | 102056729 A | 5/2011 |
|---|---|---|
| CN | 105163894 A | 12/2015 |
| (Continued) | | |

OTHER PUBLICATIONS

Office Action dated Aug. 10, 2021, for TW Patent Application No. 110115605, with partial English translation, 6 pgs.
(Continued)

*Primary Examiner* — Thomas C Lee
*Assistant Examiner* — Anzuman Sharmin
(74) *Attorney, Agent, or Firm* — Ascenda Law Group, PC

(57) ABSTRACT

A method for solid free form fabrication includes providing a dispensing head, printing one or more support material layer(s) with the dispensing head and forming vacancies within the one or more support material layer(s), and filling the vacancies within the one or more support material layer(s) with a modeling material. The method also includes straightening the modeling material with a leveler to form a three-dimensional shaped object and removing at least a portion of the one or more support material layer(s) from the three-dimensional shaped object.

21 Claims, 38 Drawing Sheets

Related U.S. Application Data

No. 16/126,565, filed on Sep. 10, 2018, now Pat. No. 10,562,231, which is a division of application No. 15/704,575, filed on Sep. 14, 2017, now Pat. No. 10,099,422.

(60) Provisional application No. 62/394,849, filed on Sep. 15, 2016.

(51) Int. Cl.

| | |
|---|---|
| *B29C 64/106* | (2017.01) |
| *B29C 64/112* | (2017.01) |
| *B29C 64/118* | (2017.01) |
| *B29C 64/165* | (2017.01) |
| *B29C 64/209* | (2017.01) |
| *B29C 64/268* | (2017.01) |
| *B29C 64/277* | (2017.01) |
| *B29C 64/379* | (2017.01) |
| *B29C 64/40* | (2017.01) |
| *G05B 19/4099* | (2006.01) |
| *B29C 35/08* | (2006.01) |
| *B33Y 10/00* | (2015.01) |
| *B33Y 30/00* | (2015.01) |
| *B29C 64/30* | (2017.01) |

(52) U.S. Cl.
CPC .......... *B29C 64/112* (2017.08); *B29C 64/118* (2017.08); *B29C 64/165* (2017.08); *B29C 64/209* (2017.08); *B29C 64/268* (2017.08); *B29C 64/277* (2017.08); *B29C 64/379* (2017.08); *B29C 64/40* (2017.08); *G05B 19/4099* (2013.01); *B29C 2035/0838* (2013.01); *B33Y 10/00* (2014.12); *B33Y 30/00* (2014.12); *G05B 2219/49016* (2013.01); *G05B 2219/49021* (2013.01)

(58) Field of Classification Search
CPC ... B29C 64/209; B29C 64/268; B29C 64/277; B29C 64/379; B29C 64/40; B29C 2035/0838; B29C 64/30; B23K 26/402; G05B 19/4099; G05B 2219/49016; G05B 2219/49021; B33Y 10/00; B33Y 30/00; Y02P 10/25; Y02P 90/02
See application file for complete search history.

(56) References Cited

U.S. PATENT DOCUMENTS

| | | | |
|---|---|---|---|
| 5,876,550 | A | 3/1999 | Feygin et al. |
| 6,119,335 | A | 9/2000 | Park et al. |
| 6,259,962 | B1 | 7/2001 | Gothait |
| 6,782,303 | B1 | 8/2004 | Fong |
| 9,550,207 | B2 | 1/2017 | Ackelid |
| 9,713,844 | B2 | 7/2017 | Ackelid |
| 10,071,422 | B2 | 9/2018 | Buller |
| 10,207,454 | B2 | 2/2019 | Buller |
| 10,412,840 | B1* | 9/2019 | Marggraff ............ H01L 23/481 |
| 2003/0157434 | A1* | 8/2003 | Oda .................... B41C 1/1016 430/944 |
| 2004/0121258 | A1 | 6/2004 | Daniel et al. |
| 2008/0121130 | A1* | 5/2008 | Kritchman ............ B29C 41/02 101/485 |
| 2009/0232969 | A1* | 9/2009 | Hayton ................ H01L 21/288 427/58 |
| 2009/0304952 | A1* | 12/2009 | Kritchman ............. B33Y 10/00 427/256 |
| 2010/0214333 | A1 | 8/2010 | Matsui et al. |
| 2013/0057637 | A1* | 3/2013 | Sen ..................... B41M 7/0054 347/225 |
| 2014/0272121 | A1 | 9/2014 | Ng et al. |
| 2015/0076739 | A1* | 3/2015 | Batchelder ............ B29C 48/266 264/401 |
| 2017/0080494 | A1 | 3/2017 | Ackelid |
| 2017/0304894 | A1 | 10/2017 | Buller |
| 2018/0043618 | A1* | 2/2018 | Shemelya ............. B33Y 10/00 |
| 2018/0237610 | A1 | 8/2018 | Watanabe et al. |
| 2019/0322052 | A1* | 10/2019 | Houben ............... B29C 64/153 |

FOREIGN PATENT DOCUMENTS

| | | |
|---|---|---|
| EP | 1961514 | 8/2008 |
| EP | 2463928 | 6/2012 |
| JP | 2016215432 A | 12/2016 |
| WO | 95/05935 A1 | 3/1995 |
| WO | 96/11117 | 4/1996 |

OTHER PUBLICATIONS

European Search Report dated May 21, 2021, for European Patent Application No. 20202352.9, 10 pgs.
Reply to Examination Report filed Apr. 21, 2020, for European Patent Application No. 17784004.8, 6 pgs.
Notice of Allowance dated Oct. 3, 2019, for U.S. Appl. No. 16/126,565, filed Sep. 10, 2018, 7 pgs.
Amendment and Response filed Jun. 20, 2019, for U.S. Appl. No. 16/126,565, filed Sep. 10, 2018, 12 pgs.
Non-Final Office Action dated Mar. 20, 2019, for U.S. Appl. No. 16/126,565, filed Sep. 10, 2018, 8 pgs.
Notice of Allowance dated Jun. 8, 2018, for U.S. Appl. No. 15/704,575, filed Sep. 14, 2017, 5 pgs.
Amendment and Response filed May 11, 2018, for U.S. Appl. No. 15/704,575, filed Sep. 14, 2017, 13 pgs.
Applicant Initiated Interview Summary dated May 2, 2018, for U.S. Appl. No. 15/704,575, filed Sep. 14, 2017, 4 pgs.
Non-Final Office Action dated Feb. 14, 2018, for U.S. Appl. No. 15/704,575, filed Sep. 14, 2017, 8 pgs.
International Preliminary Report on Patentability received in PCT/IB2017/055585, dated Mar. 19, 2019.
Non-Final Office Action dated Nov. 8, 2021, from U.S. Appl. No. 16/730,610, filed Dec. 30, 2019, 23 pgs.
Taiwan Official Action with appended Search Report received in TW Patent Application No. 106131829, dated Oct. 21, 2020 and translation of appended Search Report.
Amendment filed Jan. 18, 2022, for U.S. Appl. No. 16/730,610, filed Dec. 30, 2019, 14 pgs.
Non-Final Office Action dated Mar. 15, 2022, for U.S. Appl. No. 16/730,610, filed Dec. 30, 2019, 25 pgs.
Amendment filed Apr. 25, 2022, for U.S. Appl. No. 16/730,610, filed Dec. 30, 2019, 7 pgs.
International Search Report and Written Opinion received in PCT/IB2017/055585, dated Feb. 15, 2018.
Lakshminarayan et al: "Selective Laser Sintering of Ceramic Materials," Solid Freeform Fabrication Symposium, 1990, dated Dec. 31, 1990.
S. Hallhann et al: "Manufacturing of Medical Implants by Combination of Selective Laser Melting and Laser Ablation", Lasers in Manufactlring and Materials Processing, vol. 2, No. 3, dated Apr. 2, 2015.
Kitty A. M. Seerden et al: "Ink-Jet Printing of Wax-Based Alumina Suspensions", J. Am. Ceram. Soc., 84 [11] 2514-20(2001).

* cited by examiner

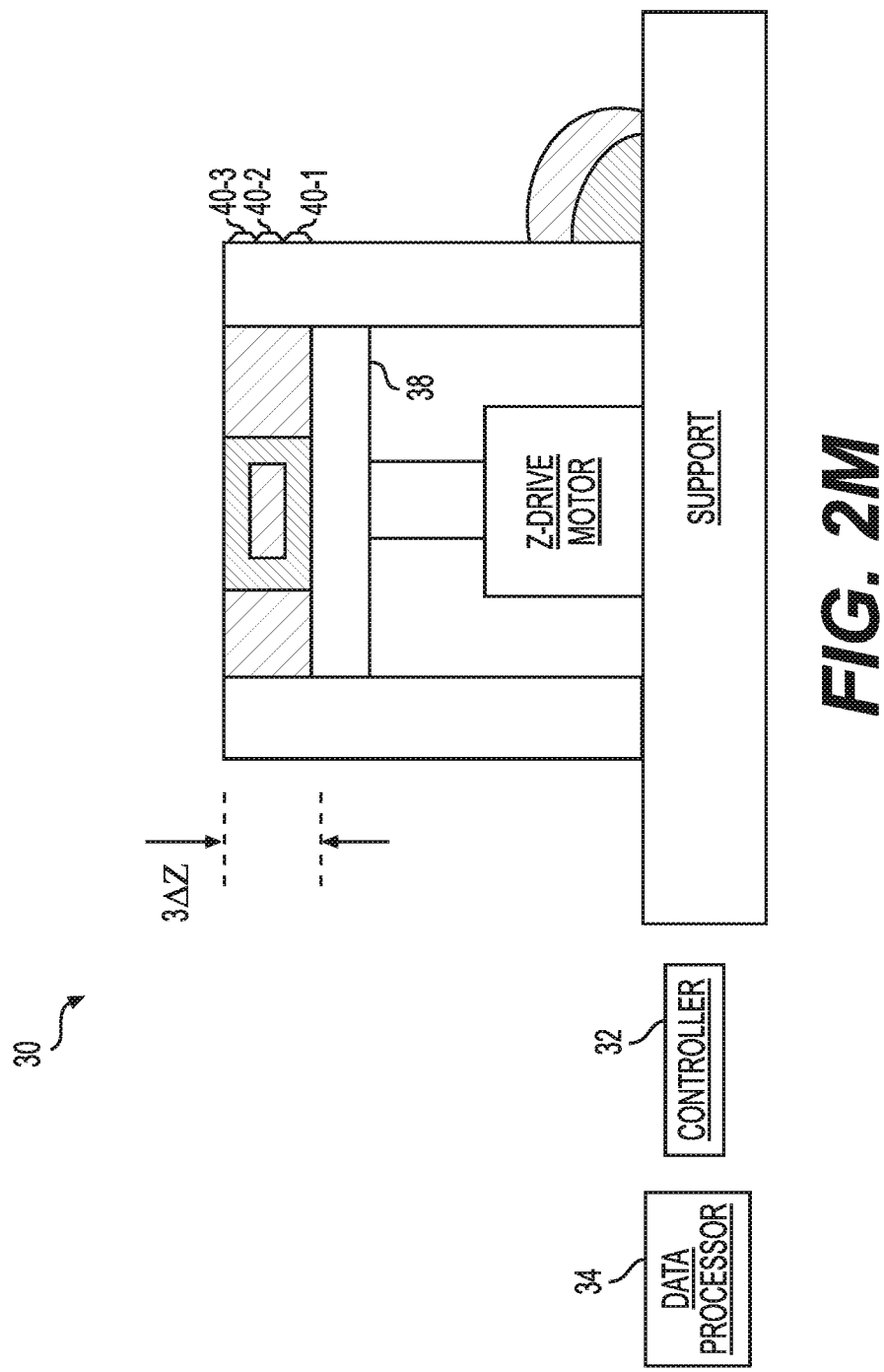

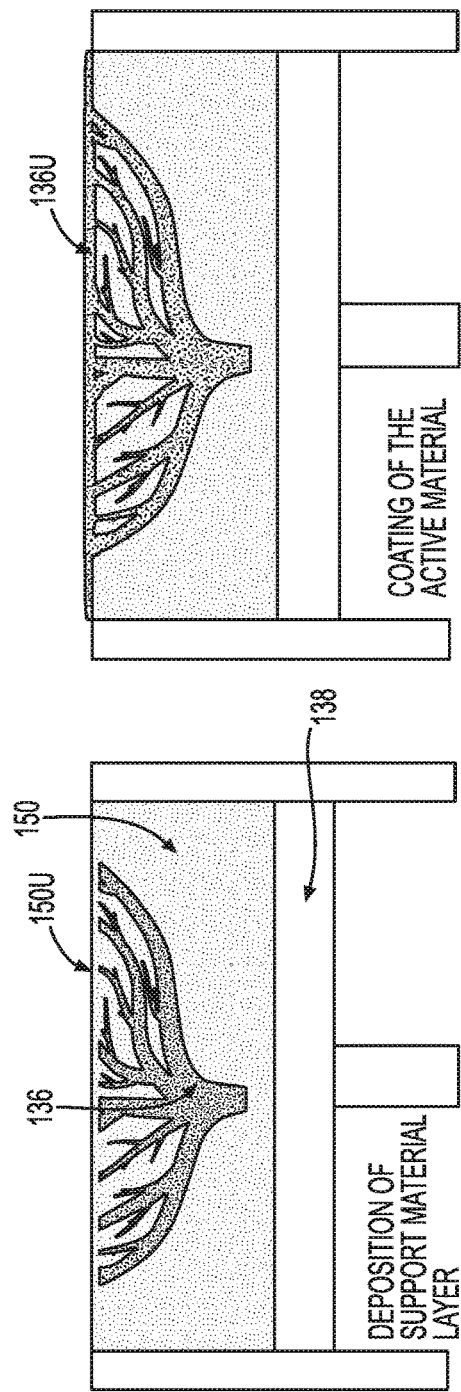
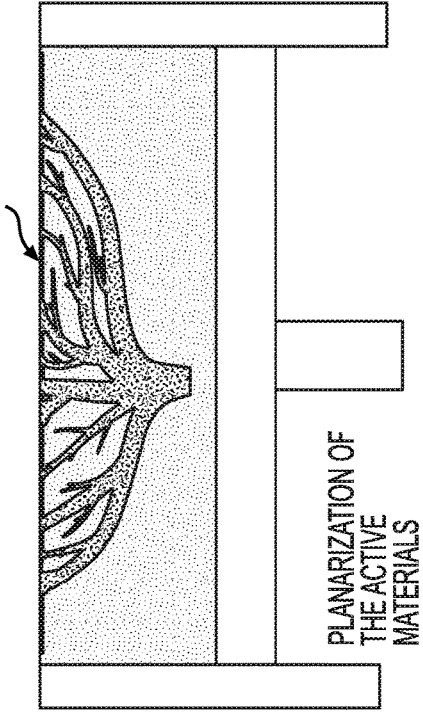
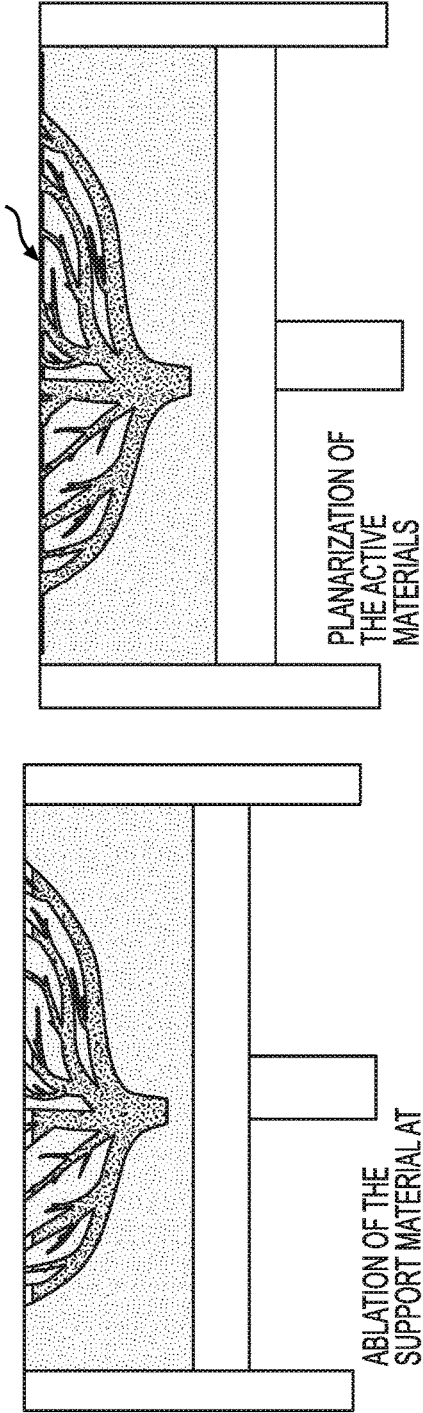

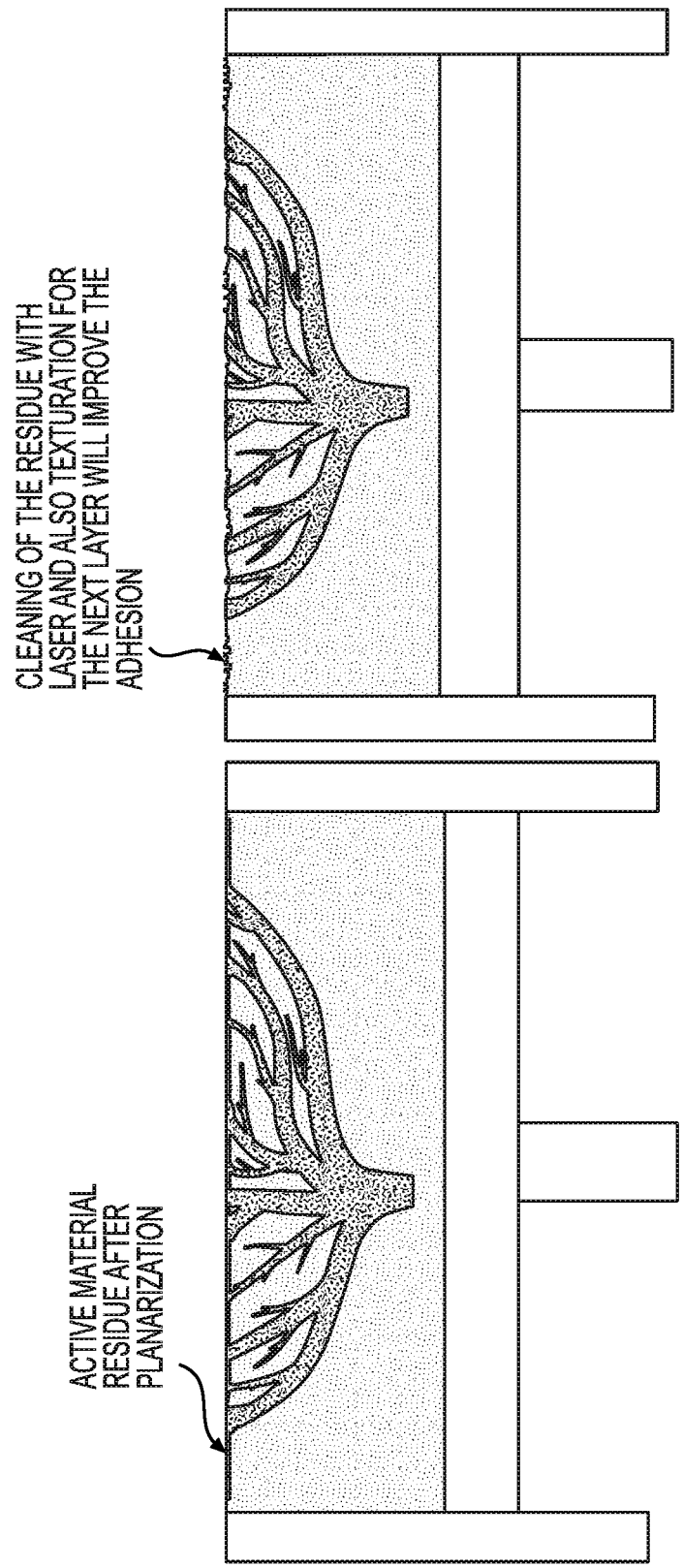

METHOD AND SYSTEM FOR ADDITIVE-ABLATIVE FABRICATION

CROSS REFERENCE TO RELATED APPLICATIONS

This is a continuation application of pending U.S. application Ser. No. 16/730,610, filed on Dec. 30, 2019, which is a continuation application of U.S. application Ser. No. 16/126,565, filed on Sep. 10, 2018, now issued as U.S. Pat. No. 10,562,231, which is a divisional application of U.S. application Ser. No. 15/704,575, filed on Sep. 14, 2017, now issued as U.S. Pat. No. 10,099,422, which claims the benefit of U.S. Provisional Application No. 62/394,849 filed on Sep. 15, 2016, the entire contents of which are hereby incorporated by reference.

FIELD OF THE INVENTION

The present disclosure, in some embodiments thereof, relates to solid free form fabrication (SFF) and, more particularly, but not exclusively, to a method, system and apparatus for SFF by an additive-ablative process.

BACKGROUND OF THE INVENTION

SFF is typically used in design-related fields where it is used for visualization, demonstration and mechanical prototyping. Thus, in three-dimensional fabrication facilitates rapid fabrication of functioning prototypes with minimal investment in tooling and labor may be employed. Such rapid prototyping shortens the product development cycle and improves the design process by providing rapid and effective feedback to the designer. Three-dimensional fabrication can also be used for rapid fabrication of non-functional parts, e.g., for the purpose of assessing various aspects of a design such as aesthetics, fit, assembly and the like. Additionally, three-dimensional fabrication techniques have been proven to be useful in the fields of medicine, where expected outcomes are modeled prior to performing procedures. It is recognized that many other areas can benefit from rapid prototyping technology, including, without limitation, the fields of architecture, dentistry and plastic surgery where the visualization of a particular design and/or function is useful.

Over the past decade, there has been considerable interest in developing computerized three-dimensional fabrication techniques.

In one such technique, see, e.g., U.S. Pat. No. 6,259,962, a material is dispensed from a printing head having a set of nozzles to deposit layers on a supporting structure. The layers are then cured using a suitable curing device. It is further noted that in the conventional art printing viscous material with a resolution below 40 µm is relatively complex.

Additionally, the conventional art has a problem of oxygen inhibition that may occur in, for example, the curing of a monomer. In this regard, oxygen inhibition may hinder significantly or can even stop the curing process. For this reason, it is relatively complex to cure plastic in atmospheric environment; and therefore, a special inert gas environment is required.

Molecular oxygen can physically quench the triplet state of the photo-initiator/sensitizer, or it can attract free radicals or active radical centers and transform them into unreactive peroxide radicals. The end result may range from reduced coating properties to uncured, liquid surfaces on the coating.

The aforementioned problem is even more pronounced in low intensity curing processes, such as UV LED or UVA cure, which frequently result in sticky, uncured surfaces.

In another technique, see, e.g., in U.S. Pat. No. 5,204,055, a component is produced by spreading powder in a layer and then depositing a binder material at specific regions of a layer as determined by the computer model of the component. The binder material binds the powder both within the layer and between adjacent layers. In a modification of this approach, the powder is raster-scanned with a high-power laser beam which fuses the powder material together. Areas not hit by the laser beam remain loose and fall from the part upon its removal from the system.

In an additional technique, see, e.g., in U.S. Pat. No. 4,575,330, a focused ultra-violet (UV) laser scans the top of a bath of a photopolymerizable liquid material. The UV laser causes the bath to polymerize where the laser beam strikes the surface of the bath, resulting in the creation of a solid plastic layer just below the surface. The solid layer is then lowered into the bath and the process is repeated for the generation of the next layer, until a plurality of superimposed layers forming the desired part is obtained.

SUMMARY OF THE INVENTION

Some embodiments of the present disclosure provide a method and system for SFF that combine additive manufacturing and selective ablation. The additive manufacturing is preferably at a lower resolution compared to the selective ablation. An advantage of the technique of the present embodiments is that it optionally and preferably provides an improved resolution and/or improved fabrication speed. When the ablation is by a laser beam, it can provide a lateral resolution of less than 16 µm, more preferably less than 8 µm, more preferably less than 4 µm, more preferably less than 2 µm, e.g., 1 mm or less. The wavelength of the laser light can optionally and preferably be set to define an absorption depth, hence also a vertical resolution (minimal layer thickness) that is approximately an order of magnitude less than the lateral resolution (e.g., less than 0.16 µm, more preferably less than 0.8 µm, more preferably less than 0.4 more preferably less than 0.2 µm, e.g., about 0.1 µm or less). In some embodiments of the present disclosure the laser light has a wavelength in an ultraviolet range, e.g., from about 300 nm to about 400 nm, for example, about 355 nm. Ultraviolet laser is advantageous from the standpoint of performances. However, for lower resolution, and for materials that do not require ultraviolet light for ablation, the laser can be in the infrared range. Infrared laser is advantageous from the standpoint of cost and beam manipulation simplification.

Another advantage of the technique of the present embodiments is that it allows the use of a variety of types of building materials, since it is sufficient to execute the additive manufacturing at relatively low lateral resolution. The present embodiments are suitable for SFF of three-dimensional (3D) objects from low viscosity materials (e.g., photoresists or the like) to high viscosity materials (e.g., glue, conductive paste or the like). Representative examples of material families suitable for the present embodiments including, without limitation, ceramic materials, metals, silica, plastics and wax. Another advantage of the technique of the present embodiments is that it allows fabrication 3D objects from a multiplicity of materials. In particular, the present embodiments can be used to fabricate electrically conductive patterns.

Another advantage of the technique of the present embodiments is that it can be combined with an embedding technique, wherein a foreign element, such as, but not limited to, an electronic device, is embedded in the fabricated 3D object. Unlike conventional SFF systems in which the fabrication is typically within a working chamber, the SFF process of the present embodiments is optionally and preferably performed at an open space, thus allowing embedding the foreign element in situ. For example, the present embodiments contemplate an automatic process in which a robotic arm or the like embeds the foreign element in one or more of the layers of the 3D object without removing the 3D object from the SFF working surface.

Thus, according to an aspect of some embodiments of the present disclosure there is provided a method of solid free form fabrication (SFF). The method comprises: receiving SFF data collectively pertaining to a three-dimensional shape of the object and comprising a plurality of slice data each defining a layer of the object. The method also comprises, for each of at least a few of the layers, dispensing a building material on a receiving medium, straightening the building material, and selectively ablating the building material according to respective slice data.

According to some embodiments of the present disclosure, the method comprises dispensing at least one additional building material onto the building material to fill vacant regions formed in the layer by the selective ablation, and straightening the additional building material, wherein a resolution of the dispensing of the additional building material is less than a resolution of the selective ablation.

According to some embodiments of the present disclosure, the dispensing of the building material and the additional building material provide the same lateral coverage.

According to some embodiments of the present disclosure, the dispensing of the building material is to cover a layer immediately below the layer by its entirety.

According to some embodiments of the present disclosure, the dispensing of the building material is selective, wherein a resolution of the dispensing of the building material is less than a resolution of the selective ablation.

According to some embodiments of the present disclosure, the dispensing of the additional building material is selective.

According to some embodiments of the present disclosure, the building material is curable, and the method comprises at least partially curing the building material after the ablation. According to some embodiments of the present disclosure the building material is curable, and the method comprises at least partially curing the building material prior to the ablation. According to some embodiments of the present disclosure, the additional building material is curable, and the method comprises at least partially curing the additional building material.

According to some embodiments of the present disclosure, the ablation is by an ablation system, wherein the curing is also by same ablation system except operating at a different set of parameters.

According to some embodiments of the present disclosure, the curing and the ablation is by different systems.

According to some embodiments of the present disclosure, the method comprises removing a debris dispensing of the additional building material on non-vacant regions. According to some embodiments of the present disclosure, the removal is by a laser beam.

According to some embodiments of the present disclosure, the method comprises elevating the receiving medium prior to the dispensing of the additional building material, to ensure removal of the additional building material during the straightening, substantially from all on non-vacant regions.

According to some embodiments of the present disclosure, the method comprises generating gas flow over the layer following or during the ablation, so as to remove building material debris and/or residue. According to some embodiments of the present disclosure, the gas comprises air.

According to some embodiments of the present disclosure, the ablation comprises laser ablation. According to some embodiments of the present disclosure, the laser ablation is a pulsed laser ablation.

According to some embodiments of the present disclosure, the method comprises receiving input pertaining to a type of the building material, accessing a computer readable medium storing pulse energy data corresponding to the type of the building material, and setting pulse energy for the pulsed laser ablation based on the pulse energy data.

According to some embodiments of the present disclosure, the ablation comprises Computer Numeric Controlled (CNC) ablation.

According to some embodiments of the present disclosure, the method comprises at least partially removing solvent from the building material, prior to the straightening.

According to some embodiments of the present disclosure, the method comprises ablating a cavity in at least one of the layers, and placing a foreign element in the cavity.

According to some embodiments of the present disclosure, the placing is by a robotic arm.

According to some embodiments of the present disclosure, the method comprises the foreign element is an electronic device, and the method comprises forming a conductive track in electrical contact with the electronic device.

Selected operation of the method as delineated above can be executed according to some embodiments of the present disclosure, by an SFF system. Hence, according to an aspect of some embodiments of the present disclosure, there is provided a system for solid free form fabrication (SFF). The system comprises: an input for receiving SFF data, wherein the SFF data collectively pertains to a three-dimensional shape of an object and comprises a plurality of slice data each defining a layer of the object. The system also comprises a dispensing head configured for dispensing a building material, a leveling device for straightening the building material, an ablation system for ablating the building material, and a controller. In various exemplary embodiments of the present disclosure, the controller has a circuit configured for controlling the ablation system to perform selective ablation, for each of at least a few of the layers, according to slice data corresponding to the layer.

According to some embodiments of the present disclosure, the system comprises at least one additional dispensing head configured for dispensing at least one additional building material onto the building material, to fill vacant regions formed in the layer by the selective ablation. The resolution of the dispensing of the additional building material is optionally and preferably less than a resolution of the selective ablation.

According to some embodiments of the present disclosure, the controller is configured to operate the ablation system also for at least partially curing the building material and/or the additional building material.

According to some embodiments of the present disclosure, the system comprises a building material curing system.

According to some embodiments of the present disclosure, the controller is configured for operating the ablation system to remove a debris dispensing of the additional building material on non-vacant regions.

According to some embodiments of the present disclosure, the controller is configured for elevating a receiving medium receiving the building material prior to the dispensing of the additional building material.

According to some embodiments of the present disclosure, the system comprises a gas flow generator configured for generating gas flow over the layer following or during the ablation, so as to remove building material debris and/or residue.

According to some embodiments of the present disclosure, the ablation system comprises a laser ablation system. According to some embodiments of the present disclosure, the laser ablation system is configured to provide laser pulses.

According to some embodiments of the present disclosure, the controller is configured to receiving input pertaining to a type of the building material, to access a computer readable medium storing pulse energy data corresponding to the type of the building material, and to control the laser ablation system to adjust a pulse energy of the ablation based on the pulse energy data.

According to some embodiments of the present disclosure, the ablation system comprises a Computer Numeric Controlled (CNC) system.

According to some embodiments of the present disclosure, the system comprises a drying system for at least partially removing solvent from the building material, prior to the straightening.

According to some embodiments of the present disclosure, the controller is configured for ablating a cavity in at least one of the layers, to allow placing a foreign element in the cavity. According to some embodiments of the present disclosure, the system comprises a robotic arm configured for placing the foreign element in the cavity.

According to some embodiments of the present disclosure, the foreign element is an electronic device, and the controller is configured for forming a conductive track in electrical contact with the electronic device.

According to some embodiments of the present disclosure, the electronic device is selected from the group consisting of a radiation transmitter, a radiation receiver, a radiation transceiver, a transistor, a diode, an electronic circuit, a camera and a processor.

Unless otherwise defined, all technical and/or scientific terms used herein have the same meaning as commonly understood by one of ordinary skill in the art to which the present disclosure, pertains. Although methods and materials similar or equivalent to those described herein can be used in the practice or testing of embodiments of the present disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the present disclosure can involve performing or completing selected tasks manually, automatically, or a combination thereof. Moreover, according to actual instrumentation and equipment of embodiments of the method and/or system of the present disclosure, several selected tasks could be implemented by hardware, by software or by firmware or by a combination thereof using an operating system.

For example, hardware for performing selected tasks according to embodiments of the present disclosure could be implemented as a chip or a circuit. As software, selected tasks according to embodiments of the present disclosure could be implemented as a plurality of software instructions being executed by a computer using any suitable operating system. In an exemplary embodiment of the present disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

In accordance with another feature of the present disclosure, a method for solid free form fabrication (SFF) may include dispensing a support material having an intrinsic "support material energy damage level" at which exposure/subjection to a first amount of energy, exceeding the support material energy damage level, alters the support material. Additionally, the support material may have an "intrinsic support material energy ablation threshold" at which a second amount of energy, which is higher than the first amount of energy and exceeds the "support material energy ablation threshold," ablates the support material. The method further includes dispensing an active material having an "intrinsic active material energy damage level" at which exposure to a third amount of energy, exceeding the "active material energy damage level," alters the active material.

Further, the active material may have "an intrinsic active material energy ablation threshold" at which a fourth amount of energy, which is higher than the third amount of energy and exceeds the "active material energy ablation threshold," ablates the active material. Further, the "active material energy damage level" may be higher than the "support material energy ablation threshold." Further, in accordance with the method, the active material and the support material may deposited so as to form a combined material and exposing the combined material to a processing amount of energy such the combined material is modified.

In another feature, the processing amount of energy that the combined material is exposed to may be at least equal to the first amount of energy and less than the second amount of energy so as to alter the support material without ablation.

In yet another feature, the processing amount of energy that the combined material may be exposed to may be at least equal to the second amount of energy and less than the third amount of energy so as to ablate the support material without altering the active material.

Further, the processing amount of energy that the combined material may be exposed to may be at least equal to the third amount of energy and less than the fourth amount of energy so as to alter the active material without ablation.

Furthermore, the processing amount of energy that the combined material may be exposed to is at least equal to the fourth amount of energy so as to ablate the active material.

Additionally, the active material may include a plurality of different active materials, and the "active material energy damage level" of each of the different active materials may be higher than "the support material energy ablation threshold."

Another feature may include emitting a laser beam at differing intensities to expose the combined material to varying amounts of energy. For example, a feature of the present disclosure may include emitting the laser beam at an intensity corresponding to the second amount of energy. In addition, a feature of the present disclosure may include depositing the active material and the support material in layers according to slice data corresponding to formation of each of the layers.

Further, a feature of the present disclosure may include depositing an uppermost support material layer (e.g., deposited as part of the combined material) that is entirely made of the material of the support material. Further, by emitting the laser beam from the laser source to expose selected regions of the uppermost support material layer to the second amount of energy, selective ablation of the uppermost support material layer may be accomplished. As a result, the uppermost support material layer may have vacant regions formed therein; thereby, uncovering regions of the active material that were once covered by the selectively ablated regions of the uppermost support material layer.

Additionally, a feature of the present disclosure may include depositing an uppermost active material layer on top of un-ablated portions of the uppermost support material layer and within the vacant regions. The uppermost active material layer may be entirely made of the active material and leveled. Further, still another feature an outer surface of the uppermost active material layer may be ablated to remove residue. Further, another feature may include ablating the leveled uppermost active material layer to provide a texturized surface, for example, in order to improve adhesion of a subsequent layer to-be-deposited on the texturized surface.

Another feature of the present disclosure, for example, of a three-dimensionally shaped object, may include providing a printer pressing assembly for forming material layer(s.) The printer pressing assembly may include a support assembly having a support surface, a driver and a press stop. The driver may change an elevation of the support surface relative to an elevation of the press stop. Further, the printer press assembly may include a nozzle configured to dispense a material onto a support surface. Further, the press may be configured to be positioned opposite to the support surface and move relative to the support. In addition, the press stop may be configured to be elevated above the support surface to engage an abutment surface of the press, thereby setting a pre-determined distance between the contact surface of the press and the support surface. Further, the press stop may include a wall surrounding the support surface. As an alternative, the press stop may include a plurality of elongated stops.

Further, the press may have a plate-shaped surface (e.g., planar surface) provided with the contact surface and configured to be positioned opposite to the support surface.

In another feature of the present disclosure, the press may include a roller configured to level a material deposited on the support surface by translating in a direction parallel to the support surface. The roller may include a stationary rod and a movable rod, wherein the stationary rod engages at least a portion of the press stop and the movable rod translates in the direction parallel to the support surface to level the material deposited on the support surface.

In yet another feature, a foil may extend around outer peripheries of the stationary rod and the movable rod to come into direct engagement with the material deposited on the support surface as the movable rod translates in the direction parallel to the support surface. Further, the foil extending around the outer periphery of the movable rod may be oriented at an acute angle with respect to the support surface as the foil departs/separates from contact with the outer periphery of the movable rod.

Additionally, a first end of the foil may be wound around a first roll/spool and a second end of the foil may be connected to a second roll/spool such that the foil is released from at least one of the first and second spools as the movable rod translates. In another feature, a curing member may cure, dry or otherwise harden the material deposited on the support surface.

In another feature, the printing assembly may be provided with a laser source configured to emit a laser beam to ablate the material deposited on the support surface. Further, the press stop may be provided as a wall that includes first and second walls (of which at least one may be motorized).

Additionally, in accordance with a feature of the present disclosure, the first wall may be configured to be elevated to a different height relative to the second wall to provide an inclined engagement surface that engages the abutment surface of the press. Further, at least one of the first wall and second wall may be configured to be moved towards the press (e.g., the walls may be coupled to a motor configured to elevate the walls in, e.g., a vertical direction).

In accordance with another feature, a method of solid free form fabrication may include providing a press and a support assembly having a support surface, a driver and a press stop. Further, the driver may be configured to elevate and lower the support surface relative to the press stop. In addition, the method may include positioning the support surface such that a predetermined distance is defined between a surface of the press stop, which is configured to engage an abutment surface of the press, and a support surface.

Further, the method may include depositing a first material onto the support surface, bringing the surface of the press stop and the abutment surface of the press into contact with each other such that the first material is pressed into a first material layer having a thickness corresponding to the predetermined thickness, separating the press stop and the abutment surface of the press from each other, and selectively ablating the first material layer to form vacant regions within the first material layer.

A further feature may include dispensing at least a second material onto the first material layer to fill the vacant regions formed within the first material layer, and bringing the surface of the press stop and the abutment surface of the press into contact with each other such that the second material is leveled. Also, when a thin residue layer of the second material remains after the second material is leveled, the residue layer may be ablated to remove at least a portion of the residue layer.

Further, the entire residue layer may be removed by ablation. In another feature of the present disclose, at least regions of the residue layer immediately surrounding the second material that fills the vacant regions of the first material are removed. Also, the method may include at least one of an upper surface of the first material layer and a leveled surface of the second material (e.g., residue on an outer layer of the combined material) being ablated to provide a texturized surface to improve adhesion of a subsequent layer deposited on the texturized surface. Also, as a further feature, the first material may be at least partially cured. Further, in accordance with another feature, at least one of the first material and the second material may be partially cured. The first and second material may be partially cured before or after pressing the material(s).

In yet another feature, a method of solid free form fabrication using the printer pressing assembly of the present disclosure may include providing the press strop with a first press stop and a second press stop. Further, the method may include elevating the first press stop to a different height relative to the second press stop so as to provide an inclined engagement surface that engages the abutment surface of the press such that the press is oriented at angle with respect to the support surface. Further, the method may include progressively lowering an elevation of one of the first press stop and the second press stop such that the first material is progressively pressed by the press in a direction from one end of the support surface towards another end of the support surface at which the one of the first press stop and second press stop is lowered. Thereby, eliminating air bubbles within the first material as the contact surface of the press becomes oriented horizontal to the support surface.

Further, in accordance with another feature, a solid free form fabrication system incorporating the printer pressing assembly of the present disclosure may include an ablation system configured to cure and ablate the material dispensed onto the support surface, wherein the curing and ablating is performed by the same ablation system, which is configured to operate at a different set of parameters. Further, the ablation system may include a pulse laser configured to emit a laser beam at different intensities.

Further, in accordance with yet another feature of the present disclosure, a solid free form fabrication system incorporating the printer pressing assembly may further include a curing member configured to cure the material dispensed onto the support surface and an ablation system configured to ablate the material dispensed onto the support surface. Further, the ablation system may include a Computer Numeric Controlled (CNC) system.

In another feature of the present disclosure, a system for solid free form fabrication may include a material deposited on a surface, and a laser source configured to emit a laser beam at different set parameters. Further, the laser source, when emitting the laser beam at a first setting of the different set parameters, may be configured to cure the material deposited on the surface. The laser source, when emitting the laser beam at a second setting of the different set parameters, may be configured to sinter the material deposited on the surface. The laser source, when emitting the laser beam at a third setting of the different set parameters, may be configured to ablate the material deposited on the surface. Further, the laser source may include an ultraviolet fiber laser. Further, a pulse duration of the laser may be adjusted in setting one of the first setting, the second setting and the third setting. Additionally, the pulse duration may be configured to be selected within a range of between 2-200 nanoseconds to perform a selected one of curing, sintering and ablating.

It should be appreciated that the controller, data processor, firmware, software, hardware, manually, and automated controlled operations as described above are equally applicable to all disclosed embodiments/features unless otherwise noted.

BRIEF DESCRIPTION OF SEVERAL VIEWS OF THE DRAWINGS

Some embodiments of the present disclosure are herein described, by way of example only, with reference to the accompanying drawings. It is stressed, however, that the particulars shown are by way of example and for purposes of illustrative discussion of embodiments of the present disclosure. In this regard, the description taken with the drawings makes apparent to those skilled in the art how embodiments of the present disclosure may be practiced.

In the drawings:

FIGS. 2A-M are process illustrations of the method of FIG. 1, according to various exemplary embodiments of the present disclosure;

FIGS. 8A-H illustrate a process in which a support material and active material may be deposited with selective ablation, cleaning and texturization;

DESCRIPTION OF SPECIFIC EMBODIMENTS OF THE INVENTION

Figure 1:
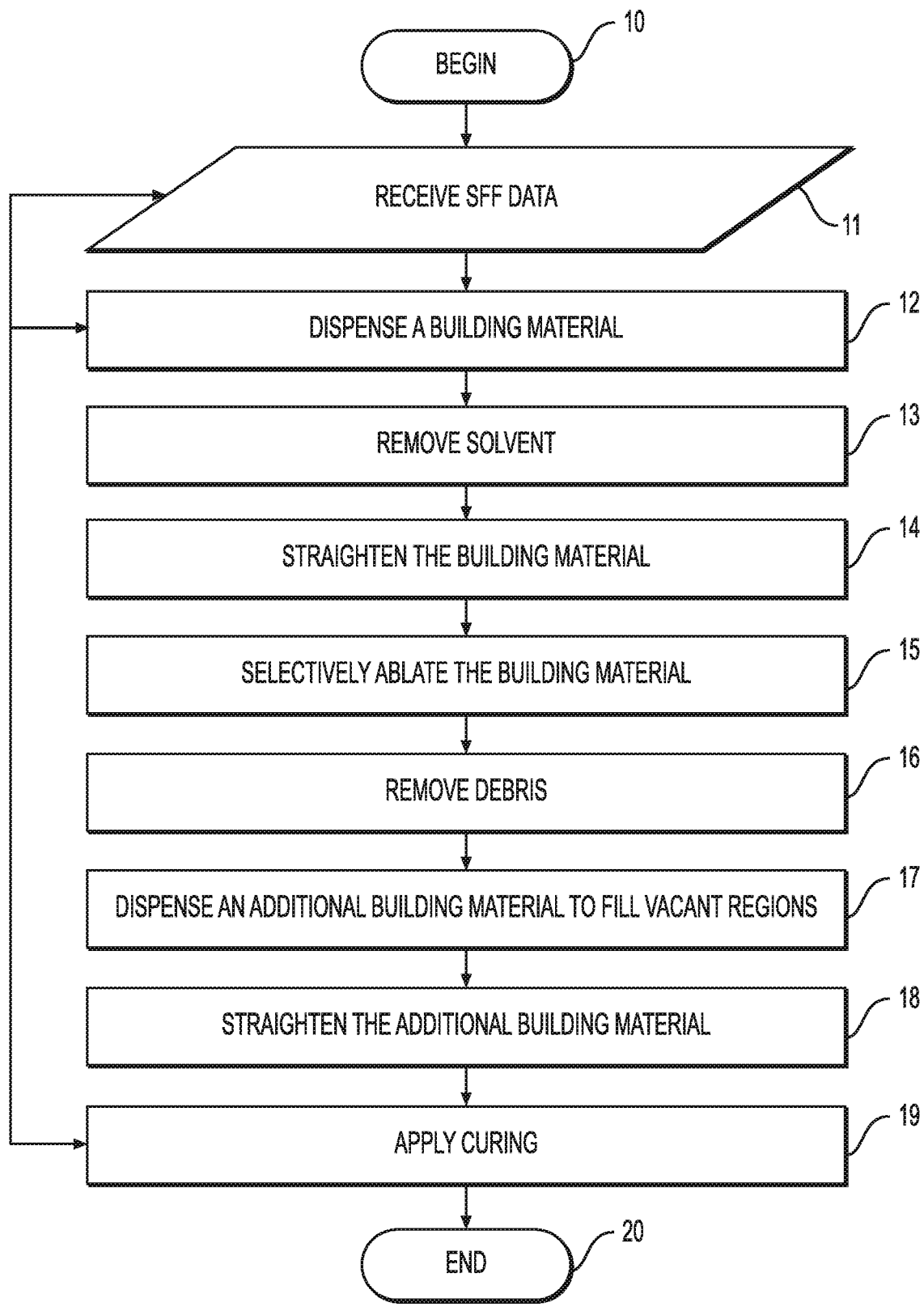
FIG. 1 is a flowchart diagram of a method suitable for SFF, according to various exemplary embodiments of the present disclosure.

The present disclosure relates to, among other things, SFF and, more particularly, but not exclusively, to a method and system for SFF by an additive-ablative process.

Before explaining non-limiting embodiments of the present disclosure in detail, it is to be understood that the present disclosure is not necessarily limited in its application to the details of construction and the arrangement of the components and/or methods set forth in the following description and/or illustrated in the drawings and/or the Examples. The present disclosure is capable of other embodiments or of being practiced or carried out in various ways.

Referring now to the drawings, FIG. 1 is a flowchart diagram and FIGS. 2A-M are process illustrations of a method suitable for SFF, according to various exemplary embodiments of the present disclosure. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

As illustrated in FIG. 1, a method of SFF may begin with 10 and continue to 11 (i.e., at which SFF data that collectively pertains to a three-dimensional shape of the object may be received.) For example, the data may be received by a data processor 34 operatively associated with an SFF system 30 (see FIGS. 2A-M) that executes the method or by a controller 32 of the SFF system 30. For example, the data processor 34 may access a computer-readable storage medium (not shown) and retrieve the data from the medium. The data processor 34 can also generate the data, or a portion thereof, instead of, or in addition to, retrieving data from the storage medium, for example, by utilizing a computer aided design (CAD) or computer aided manufacturing (CAM) software. For example, the SFF data may include a plurality of slice data each of which may define a layer of the object to-be-manufactured. The data processor 34 may transfer the data, or a portion thereof, to the controller 32 of the SFF system 30. Further, the controller 32 may receive the data on a slice-by-slice basis. The operation of the data processor and controller are applicable to all disclosed embodiments unless otherwise stated.

The data can be in any data format known in the art, including, without limitation, stereolithography (STL) format, additive manufacturing format (AMF), surface precursor data (SPD) format and the like.

The following operations are described with reference to particular layers of the object, and can be repeated for each of at least a few of the layers.

Figure 2A:
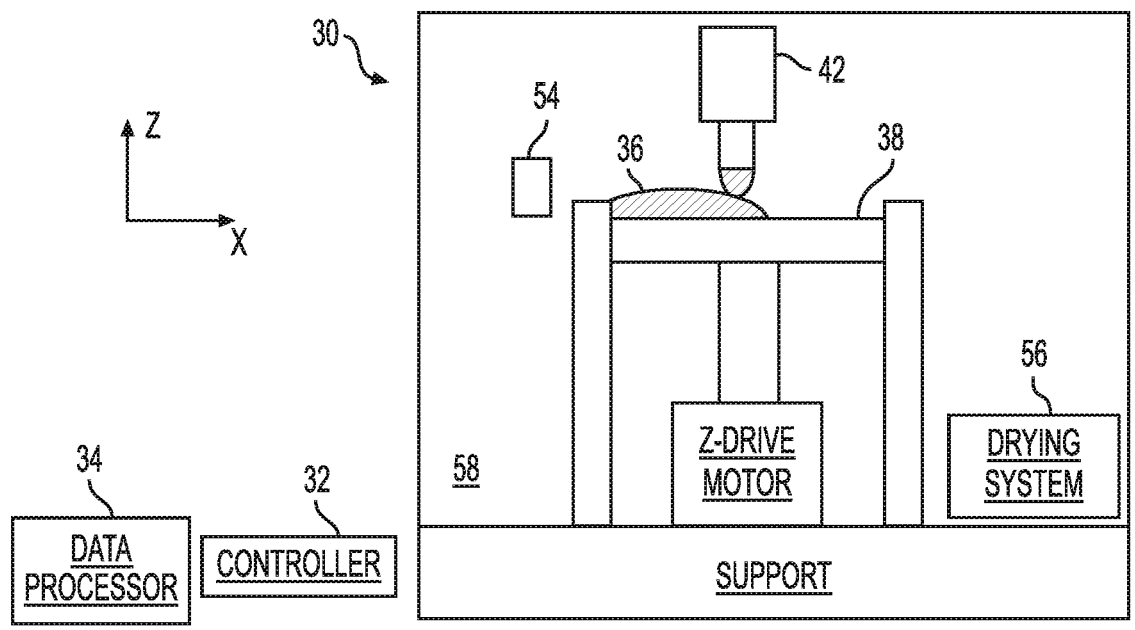
Figure 2B:
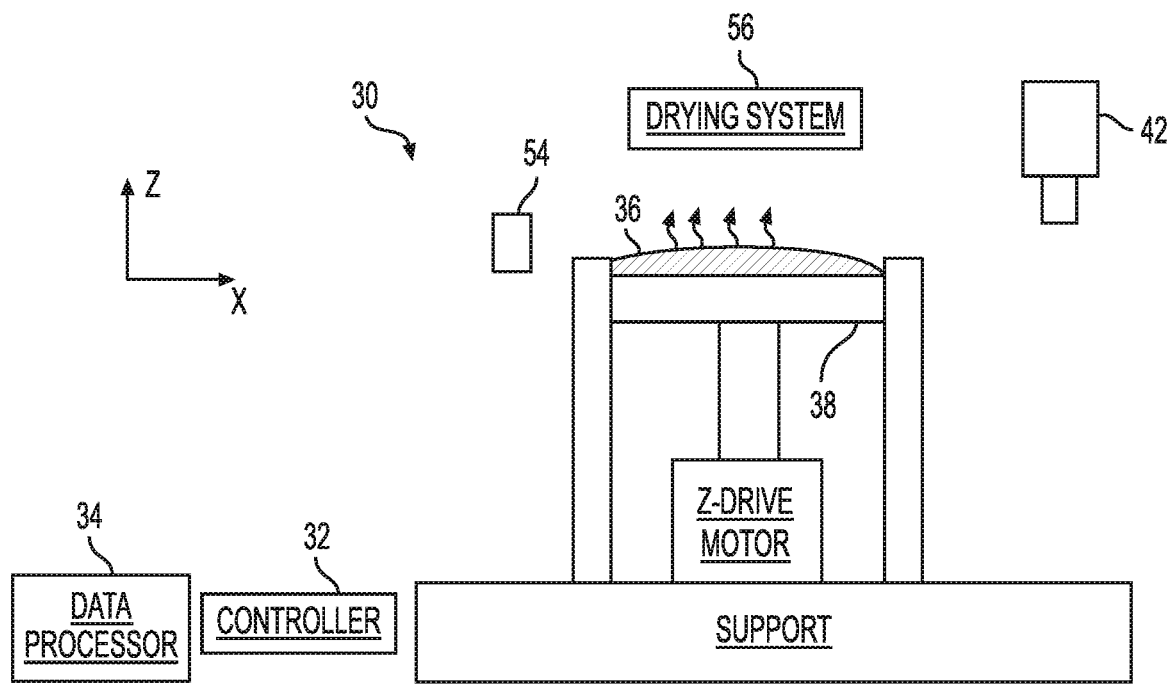

The method proceeds to 12 at which a building material 36 is dispensed on a receiving medium (FIG. 2A). The receiving medium can be a working surface 38 of the system 30, as illustrated in FIG. 2A, or a previously formed layer 40-1, 40-2, etc. . . . as illustrated, for example, in FIG. 2L. The building material 36 can be dispensed by a dispensing head 42 of system 30. The dispensing head 42 can scan the working surface 38 of system 30 along a scanning direction x (see Cartesian coordinate system in FIG. 2A) and dispense the material while scanning.

Any type of dispensing head suitable for SFF can be employed, including, without limitation, an inkjet head, an extruder head, a single nozzle head, and the like. The advantage of the additive-ablative process of preferred embodiments of the present disclosure is that even though the final object can have high in-layer resolution, the dispensing need not necessarily be at high resolution. Thus, for example, the dispensing head can operate at an in-layer resolution that is characterized by a voxel size of 1 cubic millimeter or more.

The method optionally and preferably proceeds to 13 at which solvent may be at least partially removed from the building material. This can be done, for example, by a drying system 56 that heats the dispensed material. The heating can be applied directly to the dispensed material, for example, by radiation (FIG. 2B), or it can be applied within a chamber 58 at which the dispensing is executed.

Figure 2C:
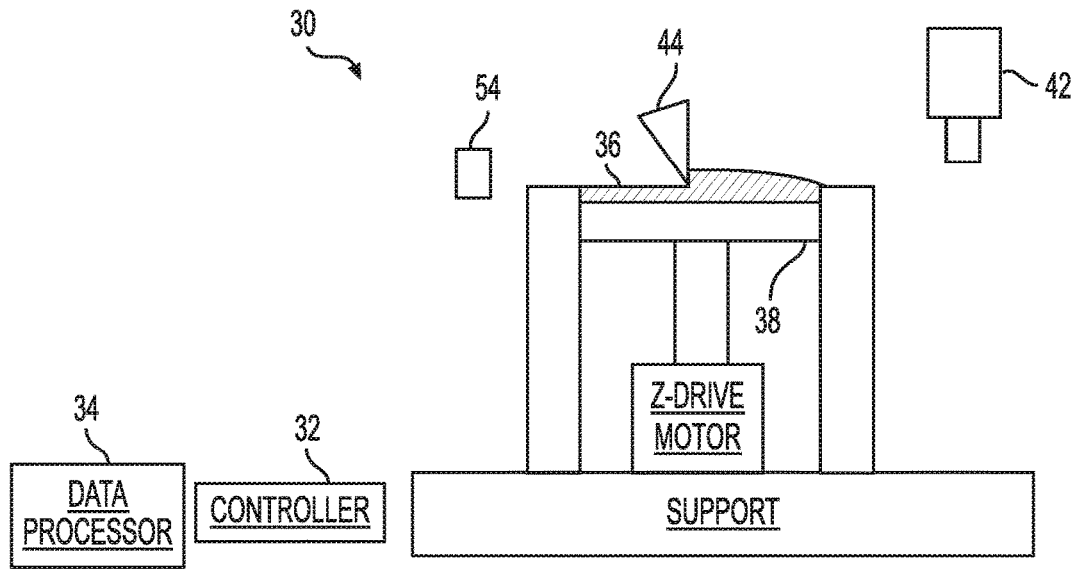

The method can then continue to 14 at which the dispensed building material is leveled/straightened/planarized (FIG. 2C). Preferably, only the most newly dispensed building material is leveled, but the present embodiments also contemplate leveling also previously dispensed building material (for example, building material beneath the newly dispensed building material). The leveling can be by a leveling device 44, such as, but not limited to, a blade, a squeegee, a roller or the like. Further, the leveling device may be provided as an "air knife" that, for example, allows controlling the resolution/thickness of the building material 36 by adjusting the gas pressure at an output of air knife. Another advantage is that it eliminates the need to clean or replace a blade, a squeegee, a roller or the like.

Figure 15A:
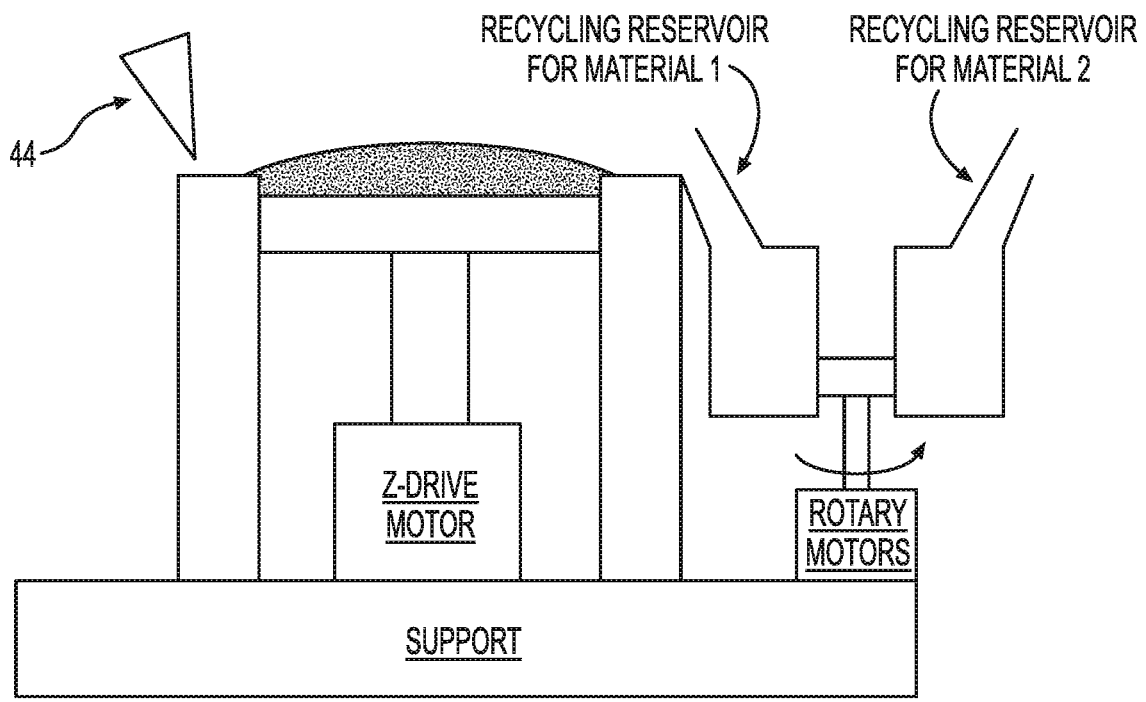
FIGS. 15A-E illustrate a recycling device for recycling excess material.
Figure 15B:
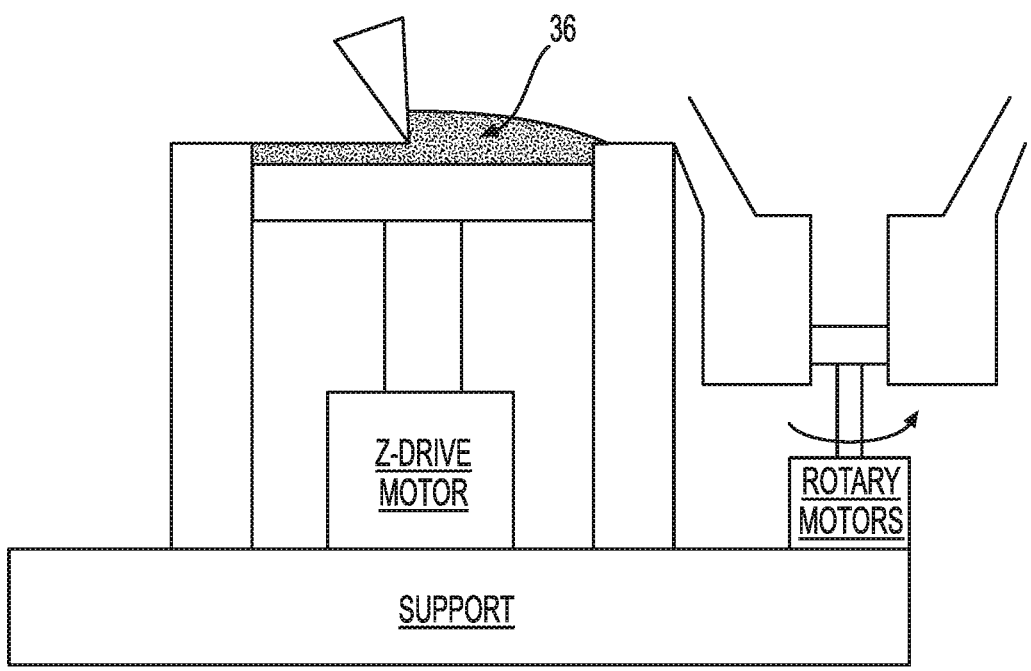
Figure 15C:
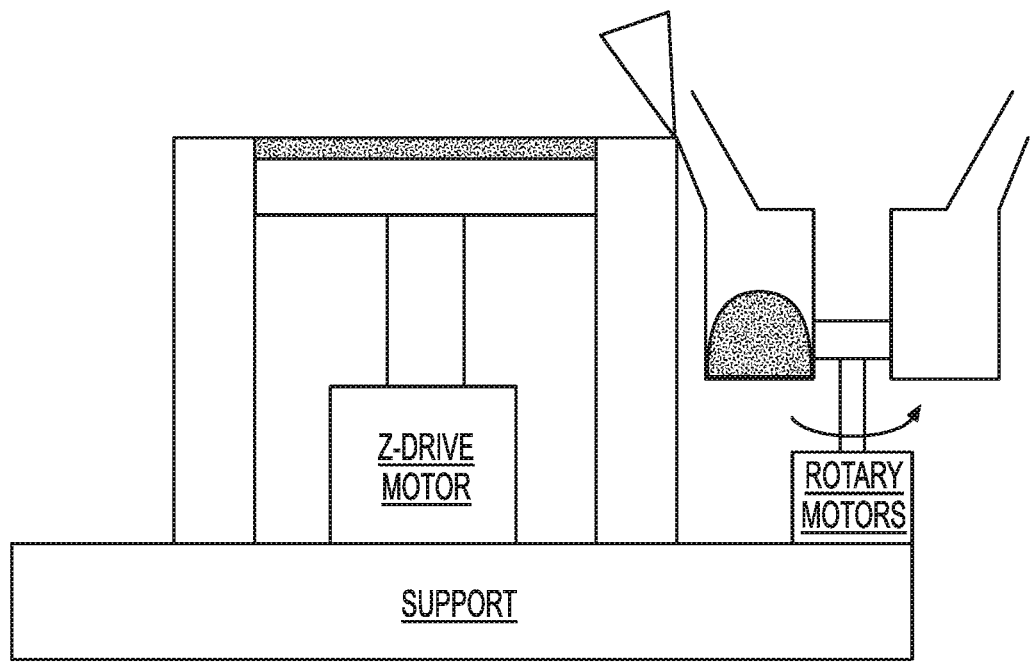
Figure 15D:
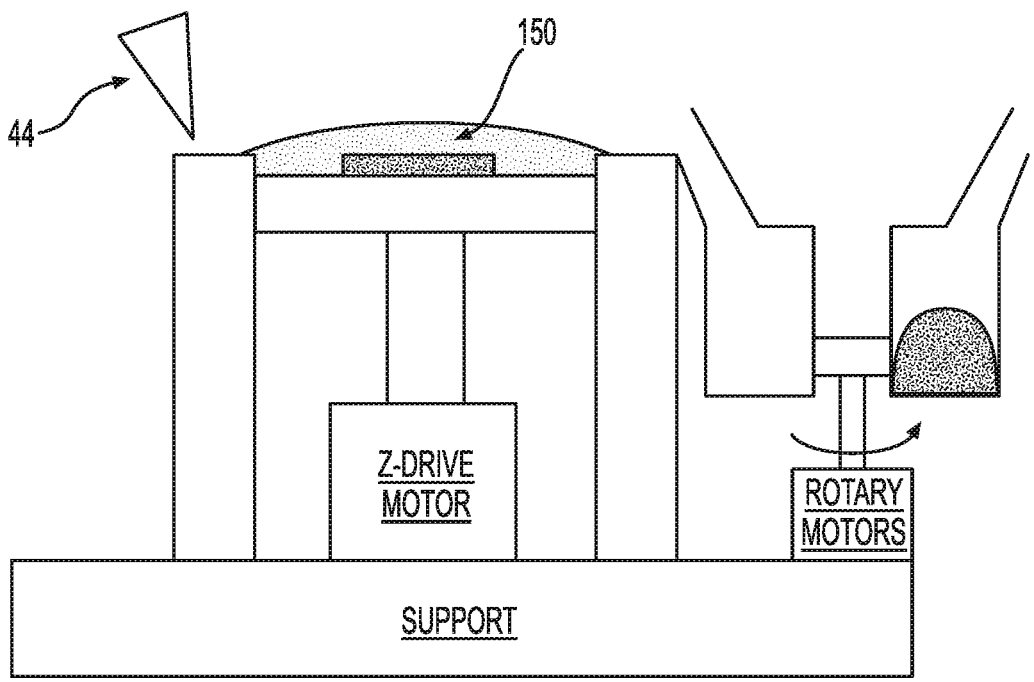
Figure 15E:
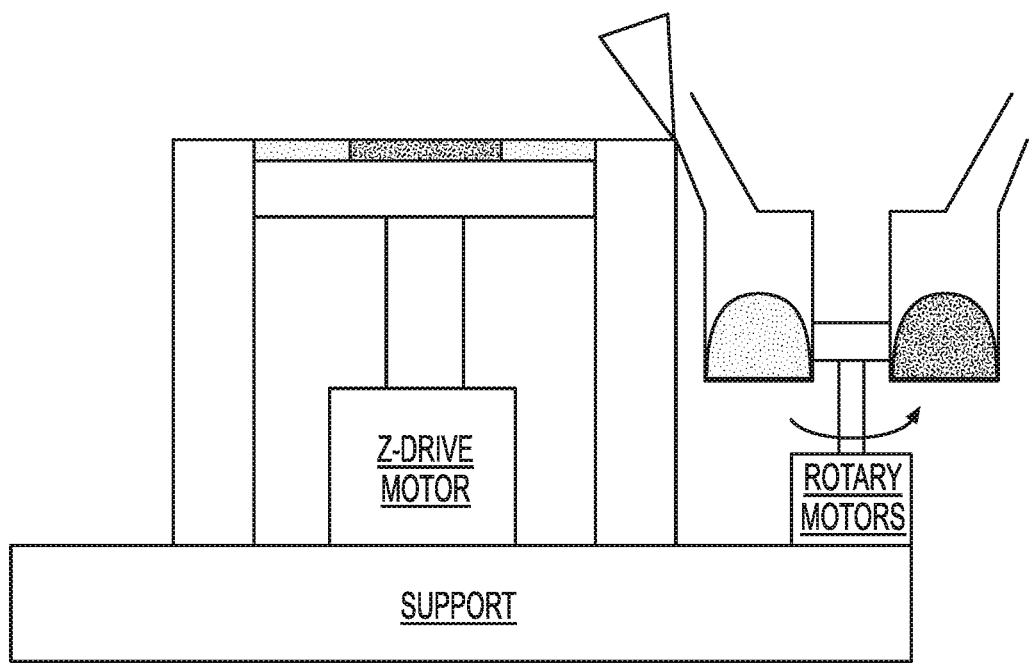

Furthermore, regardless of the type of leveling device, building material removed by the leveling device 44 may be recycled (if desired). For example, in order to recycle material that has been leveled (e.g., with a blade 44) a separate reservoir may be provided for each material. As illustrated in FIG. 15A, an excess first material may be directed into a first recycling reservoir as the excess first material is displaced during leveling. Similarly, an excess second material may be directed into a second recycling reservoir as the excess second material is displaced during leveling. See FIGS. 15D and 15E. Of course, as many recycling reservoirs as needed may be provided to separately contain different materials. Furthermore, the recycling reservoirs may be coupled together via a rotating mechanism (e.g., a rotary motor) configured to selectively position a corresponding one of the recycling reservoirs so as to separately receive the corresponding excess material that is removed during leveling. See FIGS. 15A-15E. It should be appreciated that leveling is not limited to providing a planar surface, but rather should be understood to encompass flattening, smoothing or shaping a surface to a desired form or profile.

Figure 2D:
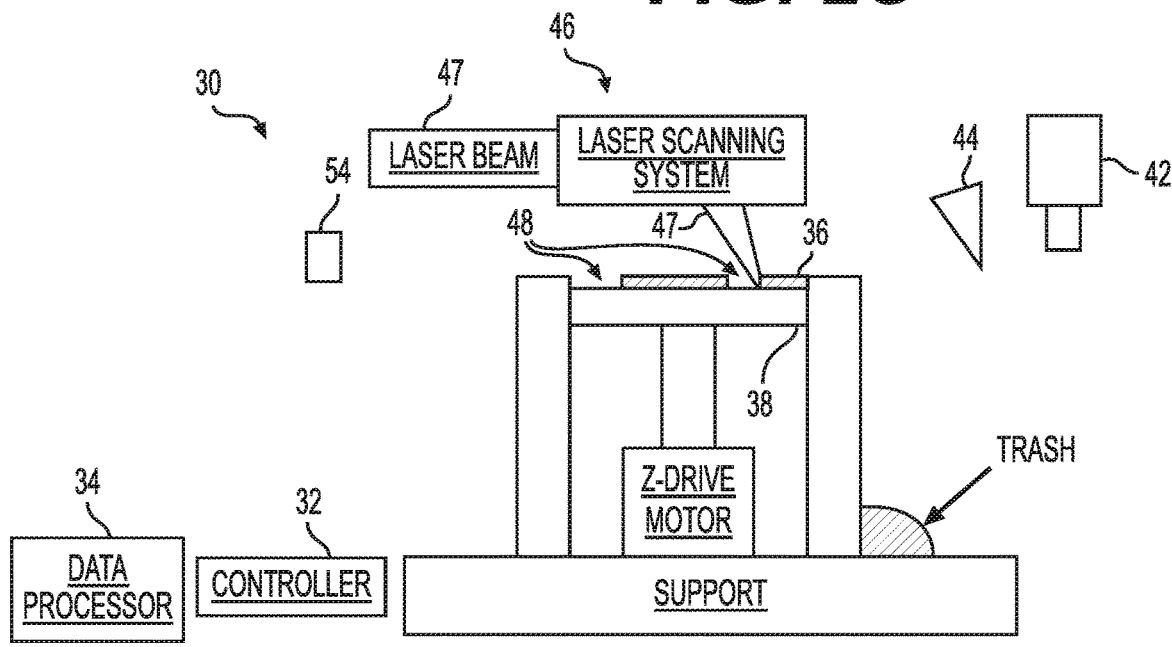

The method may continue to 15 at which the building material may be selectively ablated (FIG. 2D). The ablation may be accomplished by any suitable ablation system 46. FIG. 2D illustrates an embodiment in which system 46 comprises a laser scanning system that horizontally scans a laser beam 47 over the building material. For example, a pulsed laser beam may perform the laser ablation. In some embodiments, the data processor may optionally, and preferably, receive input pertaining to a type of the building material, access a computer readable medium storing pulse energy data corresponding to the type of building material, and signal the controller to set the pulse energy for the pulsed laser ablation based on the pulse energy data. Also contemplated are embodiments in which system 46 is a Computer Numeric Controlled (CNC), or any other system, which may selectively ablate the building material. In the present disclose, reference to "ablation" or "ablation system" in the context of a Computer Numerical Controlled (CNC) system or any other system may refer to removal of material by cutting or otherwise machining.

The ablation may be excited or otherwise operated to form a two-dimensional ablation pattern according to the slice data of the respective layer. Thus, pre-determined or specified horizontal locations in the layer (which according to the slice data is to be unoccupied by the building material) may be ablated at an appropriate stage after the building material is dispensed. As illustrate in FIG. 2D, the ablation results in a layer having vacant regions 48 that are devoid of building material.

Figure 2E:
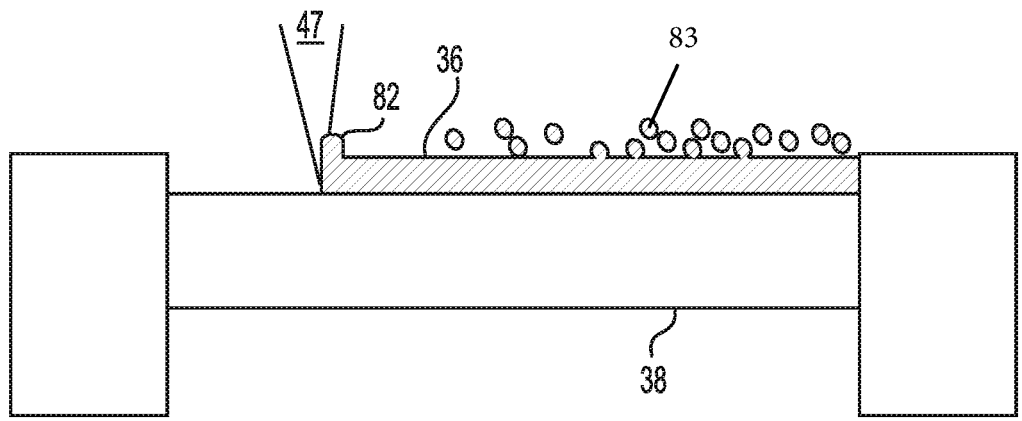
Figure 2F:
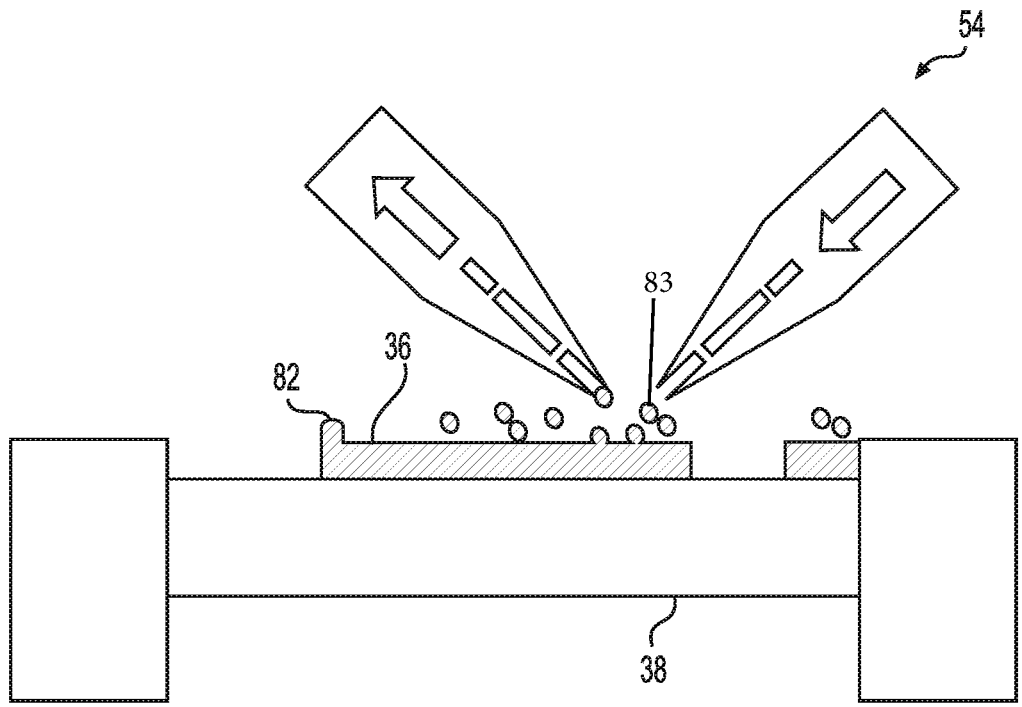

In some embodiments of the present disclosure, the method proceeds to 16 at which a debris deposition of building material on non-vacant regions may be removed. The debris deposition is typically formed by the ablation 15, and/or due to imperfectness of the straightening (or leveling) 14. The debris deposition can be removed, for example, by a laser beam. For example, when ablation system 46 comprises a laser scanning system, the laser scanning system can be used also for the removal of the debris deposition. Typically, the laser is applied at a different set of parameters for the removal of the debris deposition than for the ablation. The debris deposition can alternatively or additionally also be removed by gas flow (e.g., airflow), for example, by means of a gas flow generator 54, as will now be explained with reference to FIG. 2E and FIG. 2F, which are magnified views of the dispensed building material 36. The ablation system may generate (by means of laser beam 47, in the present example) a bulge 82 at the point of contact with the building material 36, due to a heat zone generated and/or applied at the contact (FIG. 2E). In addition, debris deposition 83 may also be generated away from the heat zone. Gas flow generator 54 generates a gas flow that removes, at least partially, the debris deposition 83. The bulge 82 may be removed by the straightening of the next layer.

Figure 2G:
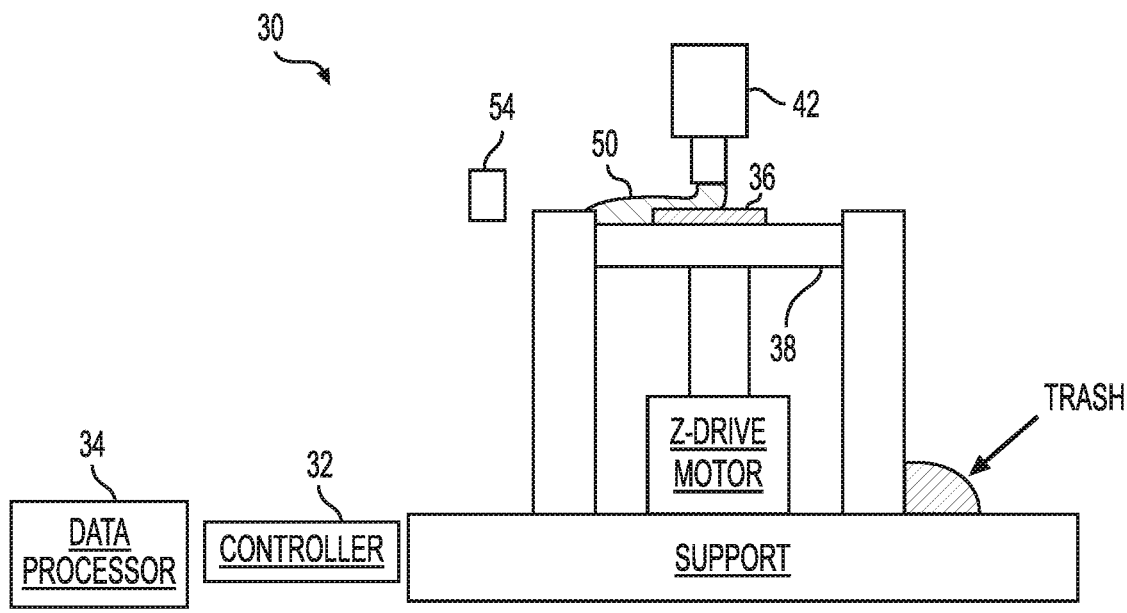
Figure 2H:
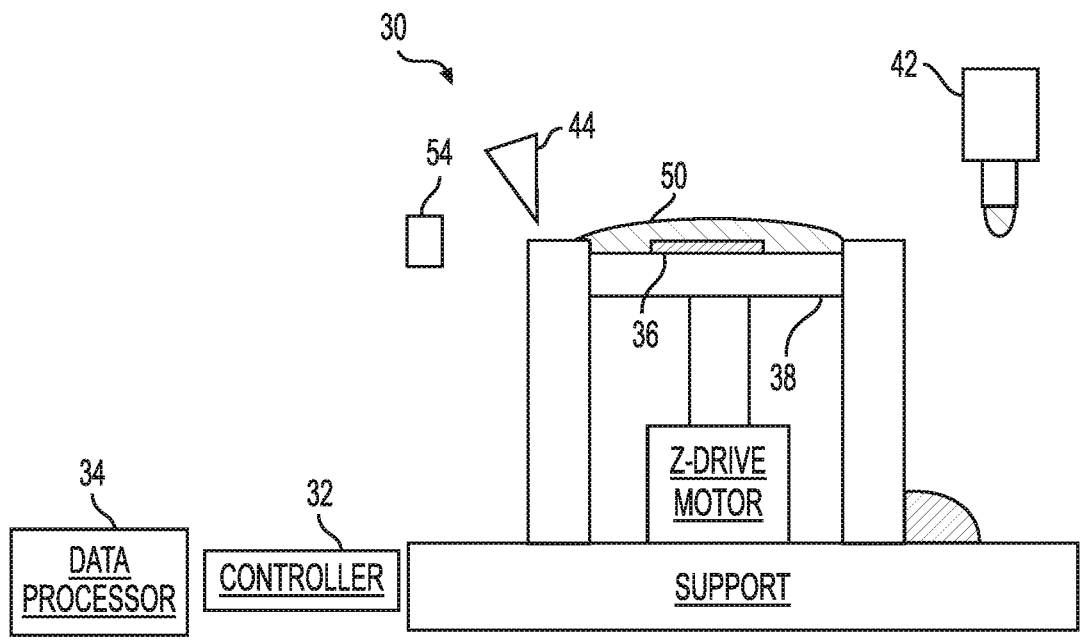
Figure 2I:
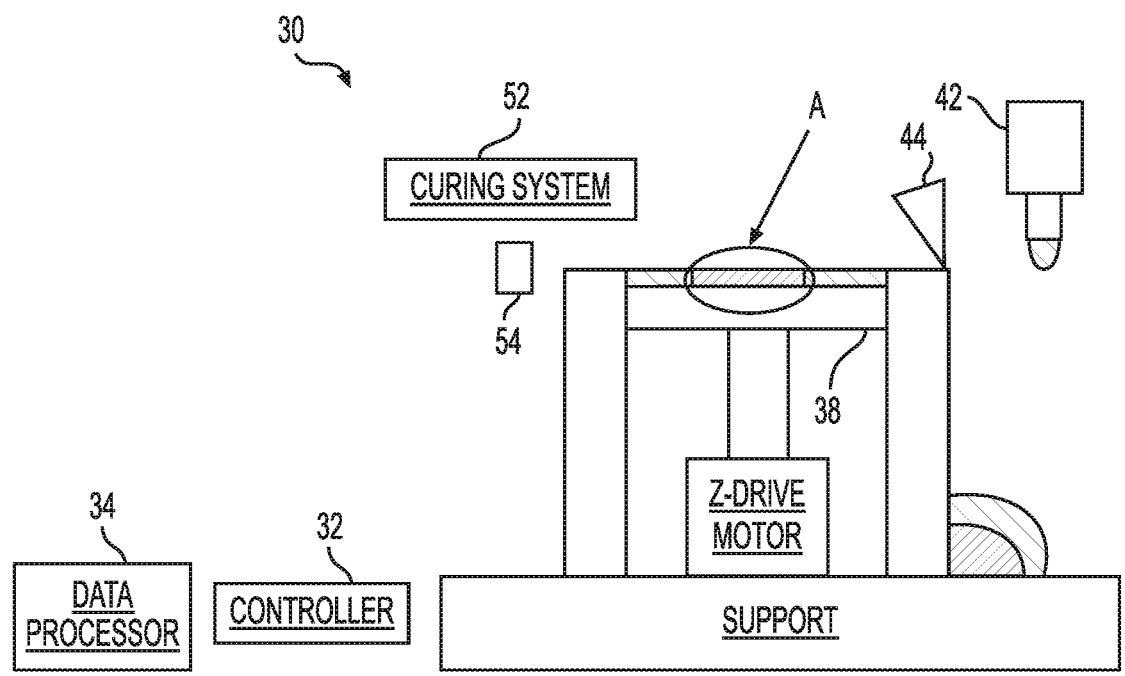

The method optionally and preferably continues to 17 at which an additional building material 50 is dispensed onto building material 36 to fill vacant regions 48 (FIGS. 2G and 2H). The in-layer resolution of the dispensing 17 is optionally and preferably less than the resolution of the selective ablation 15. In other words, the material 50 is dispensed to form a continuous region of material 50 that encompasses at least one of vacant regions 48 by its entirety, and that is laterally larger than that vacant region(s). This ensures that material 50 fills the vacant region(s) created by the ablation. In some embodiments of the present disclosure, the dispensing of building materials 36 and 50 provide the same lateral coverage (e.g., both materials are dispensed over the entire layer, irrespectively of lateral slice data), and in some embodiments of the present disclosure, the dispensing of material 36 and/or material 50 is/are selective.

For example, the building material 36 may be deposited as viscous material dropped from a dispensing head of nozzle or by continuous dispensing. For example, the deposit resolution may be more than 200 µm. Further, the "ablated" resolution may be on the order of a laser spot size which may be tuned from about 5 to 40 µm. Also, in certain applications, the ablated resolution may be below 2 µm.

While the embodiments below are described with a particular emphasis to two materials 36 and 50, it is to be understood that the method can be executed also with one building material or more than two building materials.

Each of the materials 36 and 50 can serve as a modeling material from which the final object, once fabricated, is made, or as a sacrificial support material that supports parts of the object during fabrication but is subsequently removed and does not form parts of the final object. Typically, one of the dispensed materials is a support material and all other materials are modeling materials, but this need not necessarily be the case, since, for some applications, it may be desired to have more than one type of support material or to fabricate an object without a support material.

The dispensing 17 can be by the same dispensing head 42, except with different material, or, more preferably by a different dispensing head containing material 50. The dispensing heads that dispense the different materials can be of the same or different types, as desired. A representative example of a dispensing system having a plurality of dispensing heads is described below.

Figure 2J:
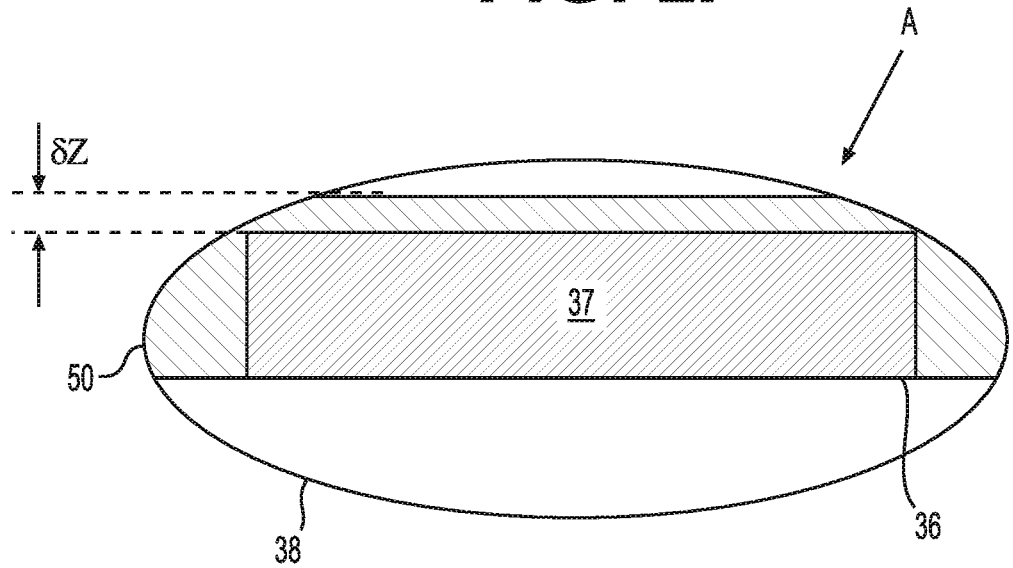
Figure 2K:
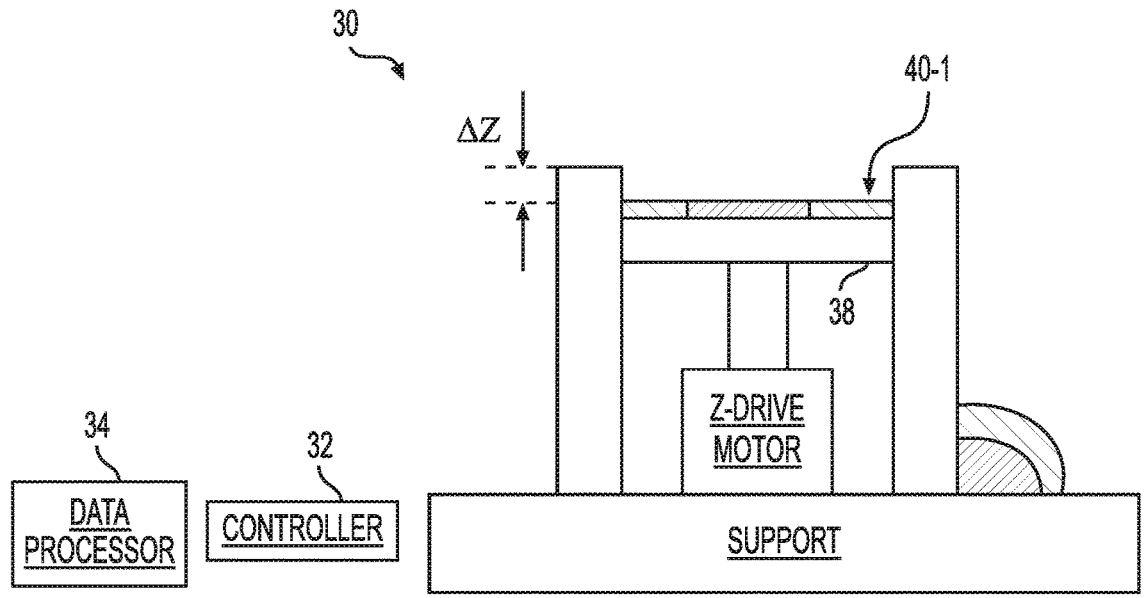

In some embodiments of the present disclosure, the method continues to 18 at which the additional building material 50 is leveled (or straightened) (FIG. 2I), as further detailed hereinabove. Preferably, the working surface 38 is elevated prior to the dispensing 17 or prior to the leveling (or straightening) 18, to ensure removal of material 50 during leveling (or straightening) 18, substantially from all on non-vacant regions. This embodiment is illustrated in FIG. 2J which is a magnified view of section A in FIG. 2I. As illustrated in FIG. 2J, there may be a residue of material 50 over a non-vacant region 37 of material 36. Elevation of the working surface 38 at amount of δz prior to the dispensing 17 or leveling (or straightening) 18, ensures removal of this residue, or at least reduces the amount of the residue. The extent δz of the elevation is preferably less than the thickness Δz of a single layer (e.g., 0.1 Δz). Optionally and preferably, the method executes 16 following the leveling (or straightening) 18, to remove debris dispensing of material 50 on non-vacant regions occupied by material 36.

Material 36 and/or 50 is optionally and preferably a curable material. In these embodiments, the method proceeds to 19 at which material 36 and/or 50 is/are cured, at least partially. The curing can be by heat or, more preferably, by radiation, and may be executed by a curing system 52 (see FIG. 2I) that is optionally and preferably included in system 30. In a preferred embodiment, the curing may be by laser radiation. These embodiments are particularly useful when ablation system 46 comprises a laser scanning system, in which case the same laser scanning system can be used both for the ablation 15 and for the curing 19, wherein a different set of operation parameters is used for the ablation and for the curing. The set of operation parameters can include any of laser power, laser focal spot size and laser wavelength, as well as radiation protocol, e.g., continuous wave (CW) or pulsed radiation, wherein when the radiation protocol is pulsed radiation, the set of parameters may include at least one of pulse duration, and pulse repetition rate. Alternatively, the ablation and curing can be executed by different systems, in which case system 30 may comprise both ablation system 46 and curing system 52.

Material 36 and/or 50 can alternatively be in, for example, a powder form, a metal colloid, a ceramic colloid, a semiconductor particle ink colloid, a paste, etc., in which case sintering and de-binding (e.g., laser sintering) may be applied instead of curing.

Figure 2L:
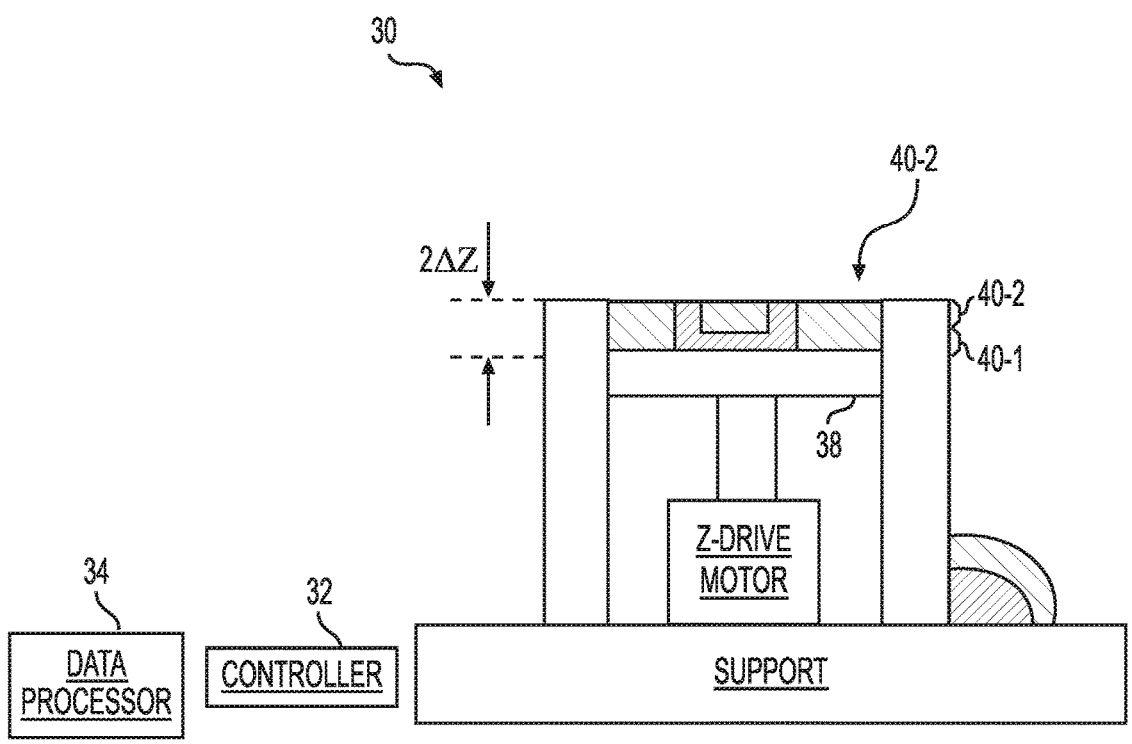

Once a layer is completed (see, e.g., FIG. 2K, layer 40-1), the vertical distance between the working surface 38 and the dispensing head 42 may optionally and preferably be increased (e.g., by lowering the working surface 38, see FIG. 2K) by an amount that is equal or approximately equal to the thickness of the layer, and the method may loop back to 11 or 12 to begin the formation of the subsequent layer (see FIG. 2L, layer 40-2, and FIG. 2M, layer 40-3).

The method ends at 20.

Figure 3:
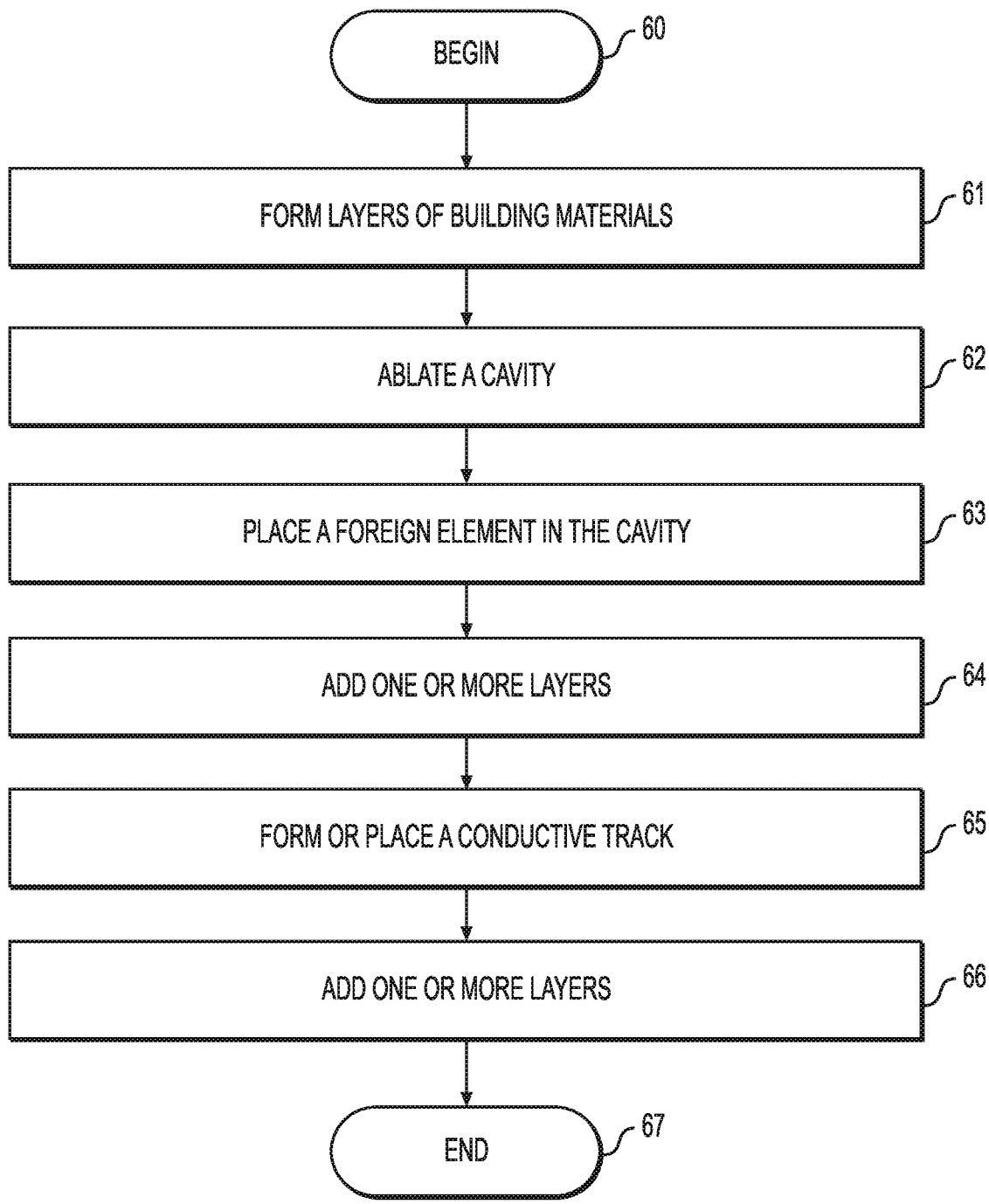
FIG. 3 is a flowchart diagram of a method suitable for SFF of a functional object, according to some embodiments of the present disclosure.

FIG. 3 is a flowchart diagram and FIGS. 4A-I are process illustrations of a method suitable for SFF of a functional object, according to various exemplary embodiments of the present disclosure. At least some of the operations described below can be executed by system 30.

Figure 4A:
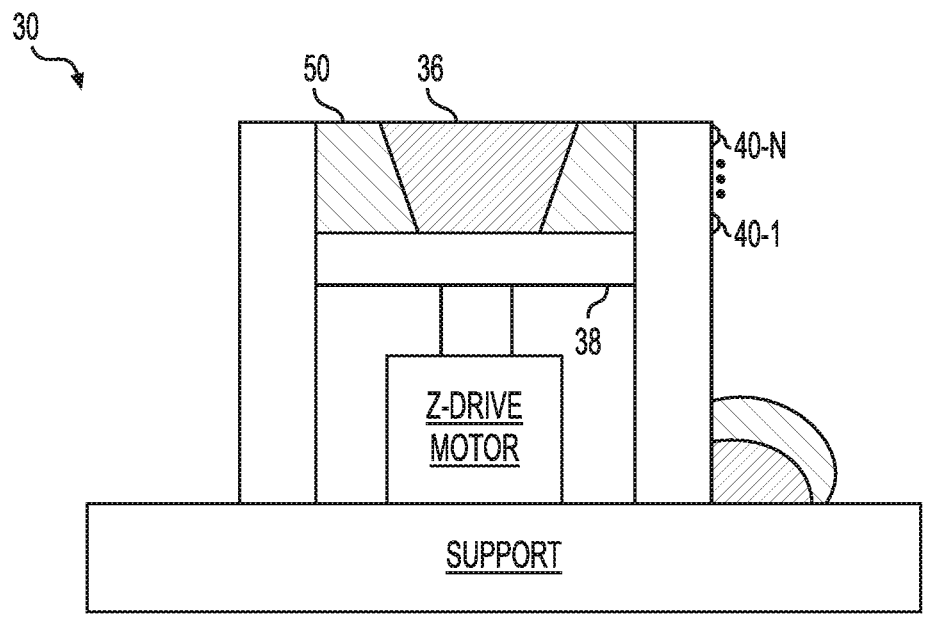
FIGS. 4A-I are process illustrations of the method of FIG. 3, according to various exemplary embodiments of the present disclosure.
Figure 4B:
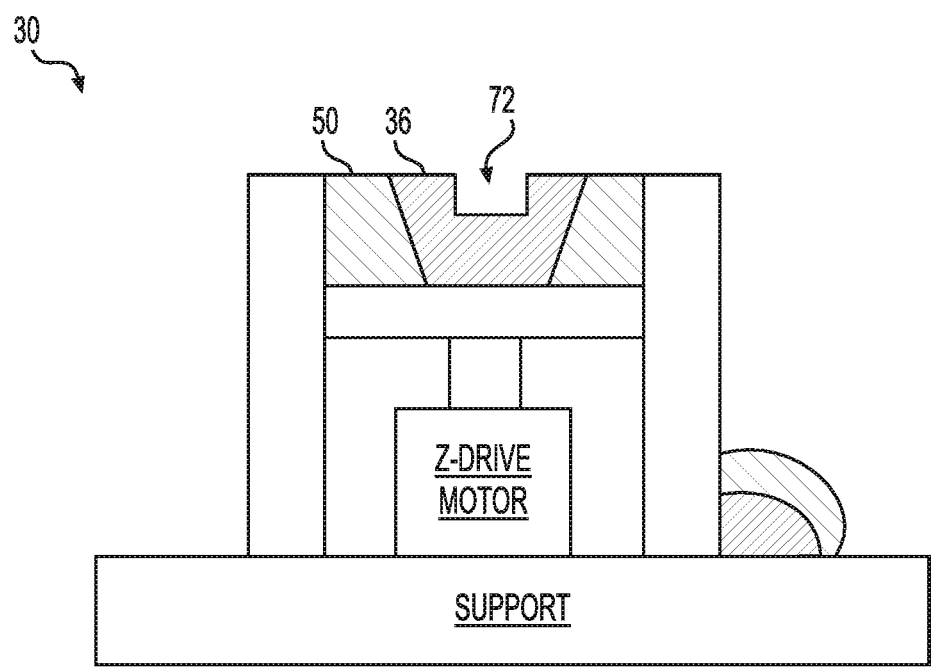
Figure 4C:
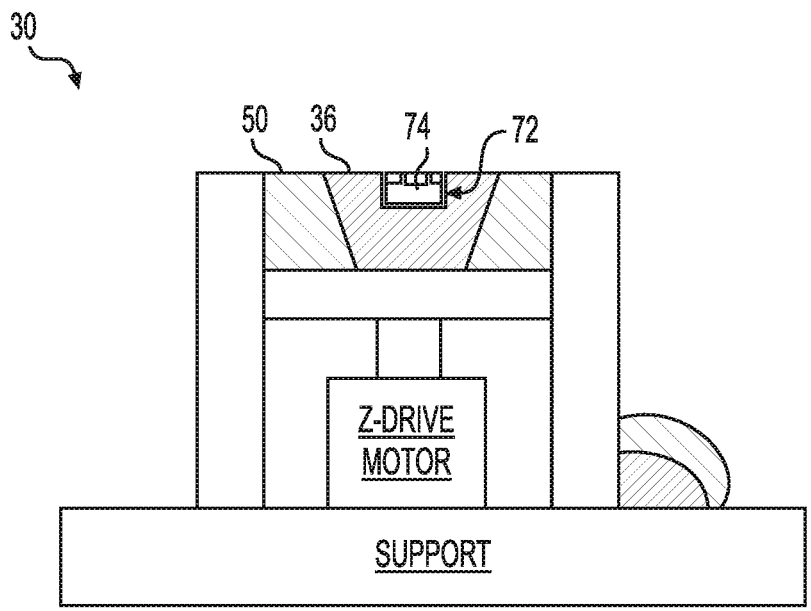
Figure 4D:
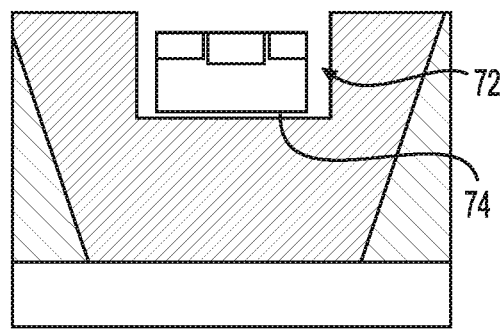
Figure 4E:
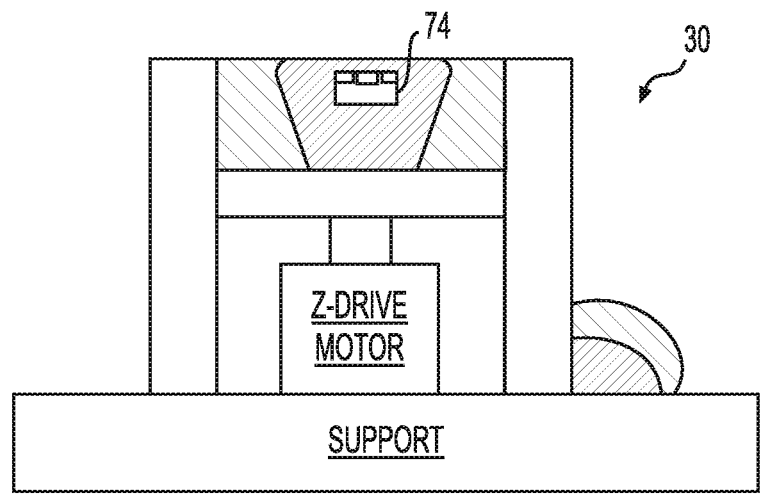

The method begins at 60 and continues to 61 at which one or more layers 40-1, . . . , 40-N of building materials are formed (FIG. 4A). This is optionally and preferably achieved by executing one or more of the operations of method 10 described above with respect to FIGS. 1 and 2A-I. The method continues to 62 at which a cavity 72 is ablated in at least one of the layers (FIG. 4B). The cavity is preferably ablated in regions in the layer(s) that contain a modeling material and not in regions of the layer(s) that contain support material. The ablation 62 can be done using ablation system 46 of system 30. The method continues to 63 at which a foreign element 74 is placed in cavity 72. The size and shape of cavity 72 is preferably selected to be compatible with the size and shape of foreign element 74 so as to allow foreign element 74 to fit into cavity 72, as illustrated in FIG. 4C, and FIG. 4D which is a magnified view of cavity 72 and foreign element 74. The placement is optionally and preferably by a robotic arm (not shown, see FIG. 5D), which can be also part of system 30.

The foreign element 74 can be of any type. Preferably, the foreign element is not fabricated by system 30. Optionally, the foreign element is fabricated by a method other than SFF. Representative examples of types of foreign elements suitable for the present embodiments including, without limitation, electronic components (e.g., a diode, a transistor, an inductor, a capacitor), electronic devices (e.g., a light source, a camera, a sensor, a radiation transmitter, a radiation receiver, a radiation transceiver, an electronic circuit, a processor), mechanical devices (e.g., a wheel, a transmission gear, a MEMS), a transmission line (e.g., an electrically conductive track, a heat conduction element, a waveguide), and the like.

It is to be understood that while FIGS. 4C-I illustrate a single foreign element placed in a single cavity, this need not necessarily be the case, since, for some applications, it may be desired to form a plurality of cavities and place a respective plurality of foreign elements in the cavities. Also contemplated are embodiments in which more than one foreign element is placed in the same cavity. When a plurality of foreign elements are placed, either in separate cavities or in the same cavity, they can be of the same type (e.g., replicas of each other) or of different types.

Once the foreign element is placed in the cavity, the method optionally and preferably proceeds to 64 at which one or more additional layers of building material are formed, for example, by dispensing building material, leveling (or straightening) the dispensed building material and optionally and preferably selectively ablating the dispensed building material, as further detailed hereinabove. In some embodiments of the present disclosure, the method forms or places 65 a conductive track 76 in electrical contact with element 74. This is particularly useful when element 74 is an electronic device or electronic component.

Figure 4F:
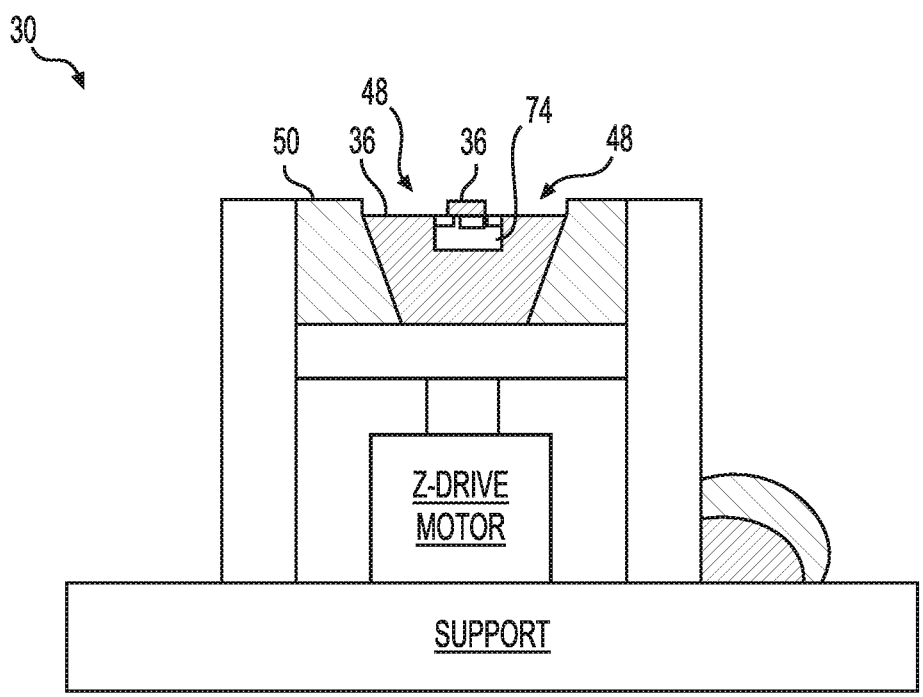
Figure 4G:
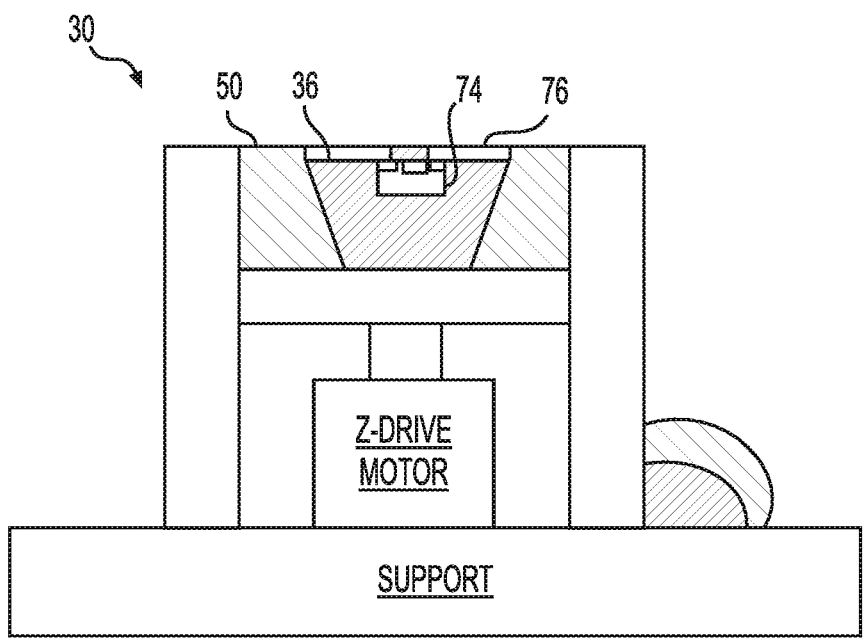
Figure 4H:
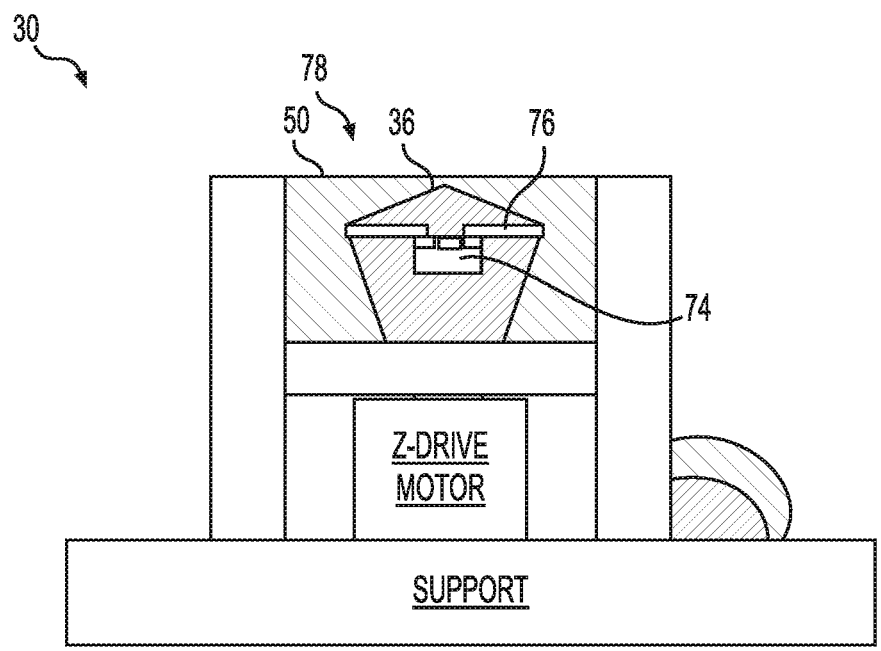
Figure 4I:
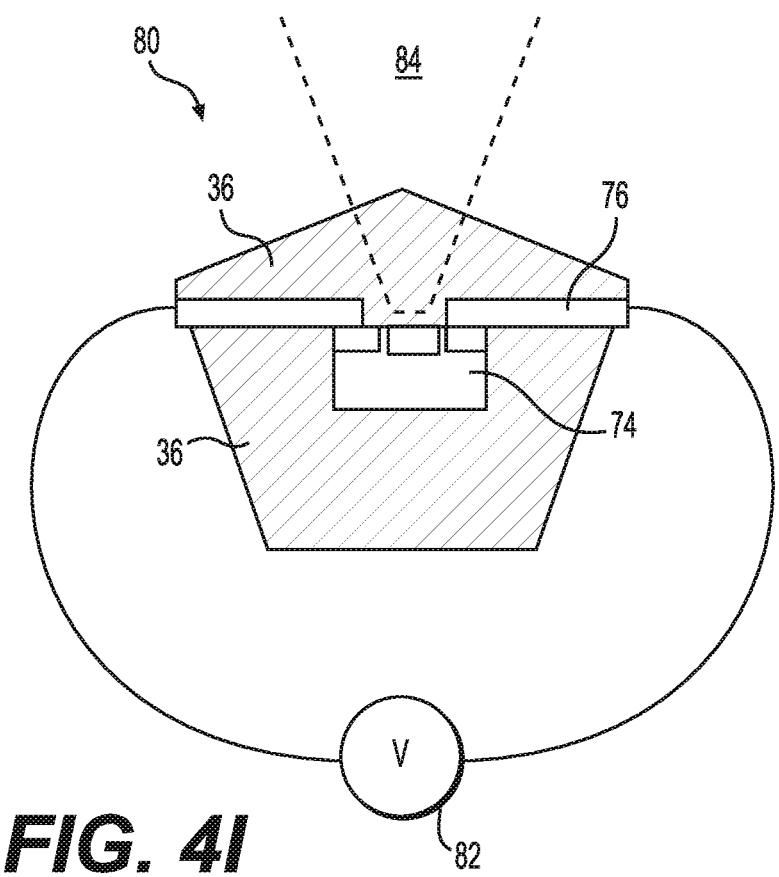

A preferred procedure for forming conductive track 76 according to some embodiments of the present disclosure is illustrated in FIGS. 4F-4H. A building material (which can be the same as material 36 or of a different type) is dispensed over element 74 and is then leveled (or straightened) and ablated as further detailed hereinabove to form vacant regions at one or more sides of element 74 (FIG. 4F). A conductive building material is then dispensed as an additional building material that fills the vacant regions 48, as further detailed hereinabove. The conductive building material is then leveled (or straightened) as further detailed hereinabove, thereby forming conductive track 76 within vacant regions 48 (FIG. 4G). Additional layers 78 can be formed 66 on top of track 76 (FIG. 4H). Once the support material 50 is removed (FIG. 4I) a functional object 80 is formed. When a conductive track 76 is formed, the removal of support material preferably exposes the ends of the conductive track, to allow their connection to an external device. In the example of FIG. 4I, element 74 is a radiation source (e.g., a light emitting diode), which is powered by a voltage source 82 connected to the ends of the conductive track 76 to emit radiation 84.

The method ends at 67.

FIGS. 5A-D are schematic illustration of an SFF system 30 according to some embodiments of the present disclosure. System 30 comprises a working surface 38 and a dispensing system 92 for dispensing a building material on the working surface. System 30 can additionally comprise a vertical drive 94 configured to vary a vertical distance (along the vertical direction z, see Cartesian coordinate system in FIG. 5A) between working surface 38 and dispensing system 92. In the representative example illustrated in FIG. 5A, which is not to be considered as limiting, drive 94 establishes a vertical motion of working surface 38, by means of a Z-stage 96.

Figure 5A:
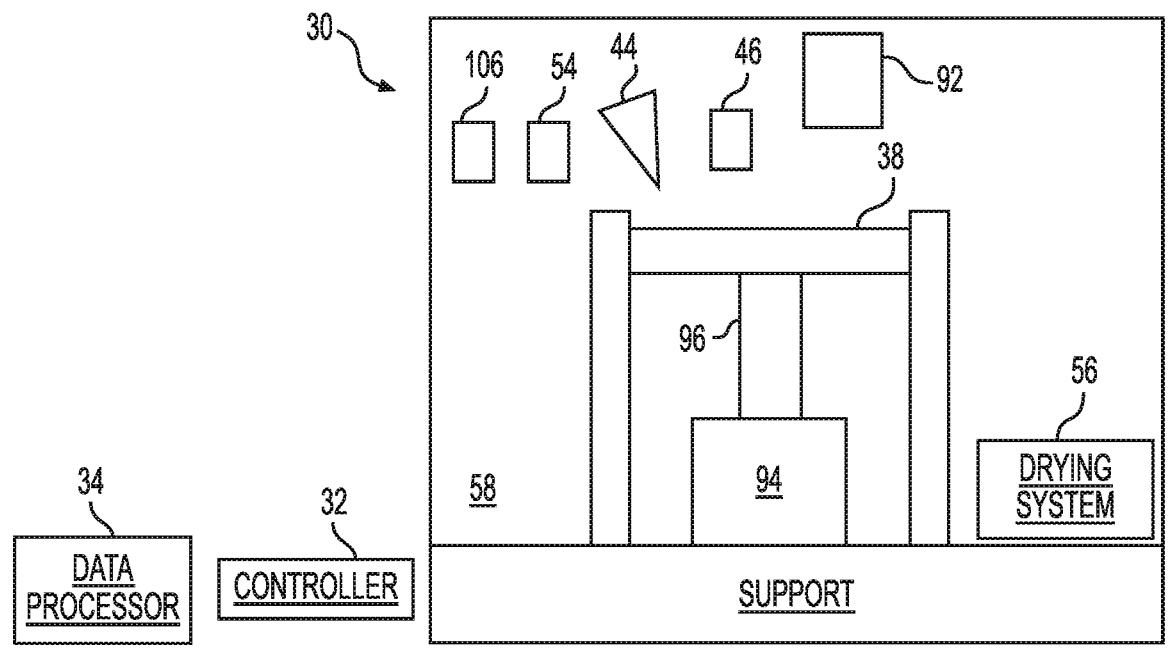
FIGS. 5A-D are schematic illustration of an SFF system according to some embodiments of the present disclosure.
Figure 5B:
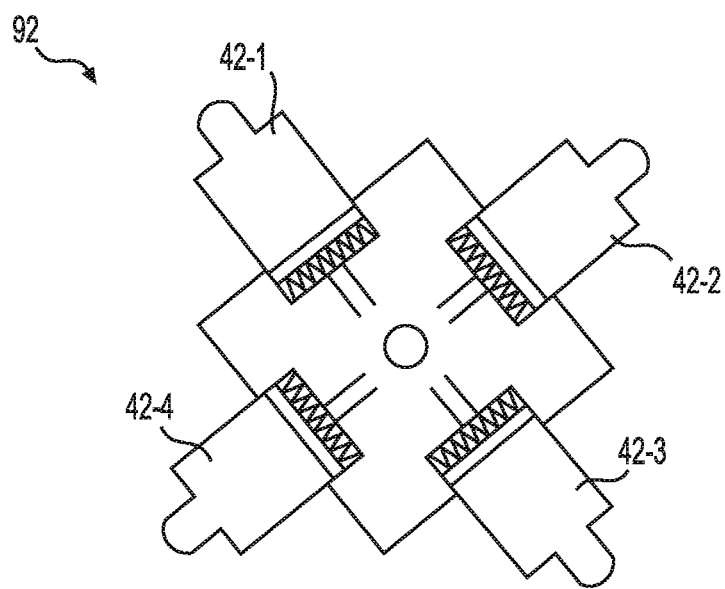

System 92 can comprise one or more dispensing heads, such as, but not limited to, head 42 described above. FIG. 5B illustrates a representative example of system 92. In the illustrated embodiments, system 92 comprises four dispensing heads 42-1, 42-2, 42-3 and 42-4, but this need not necessarily be the case since any number of dispensing heads can be employed. Each of the dispensing heads of system 92 can dispense a different building material. Alternatively, two or more of the dispensing heads, can dispense the same material, for example, to increase the throughput. Preferably, at least one of the dispensing heads dispenses a modeling material and at least one of the dispensing heads dispenses a support material.

System 30 optionally and preferably comprises a leveling device 44 for leveling (or straightening) the dispensed building material, as further detailed hereinabove. Leveling device 44 can be, for example, a blade, a squeegee, a roller or the like. The vertical distance between the leveling device 44 and the working surface 38 is preferably selected in accordance with the desired thickness of the layer. For example, when it is desired to fabricate a plurality of layers, each of height h, then, for the nth layer, the vertical distance between the leveling device 44 (or the press 144 or 244, to be discussed later) and the working surface 38 can be set to nh.

Figure 5C:
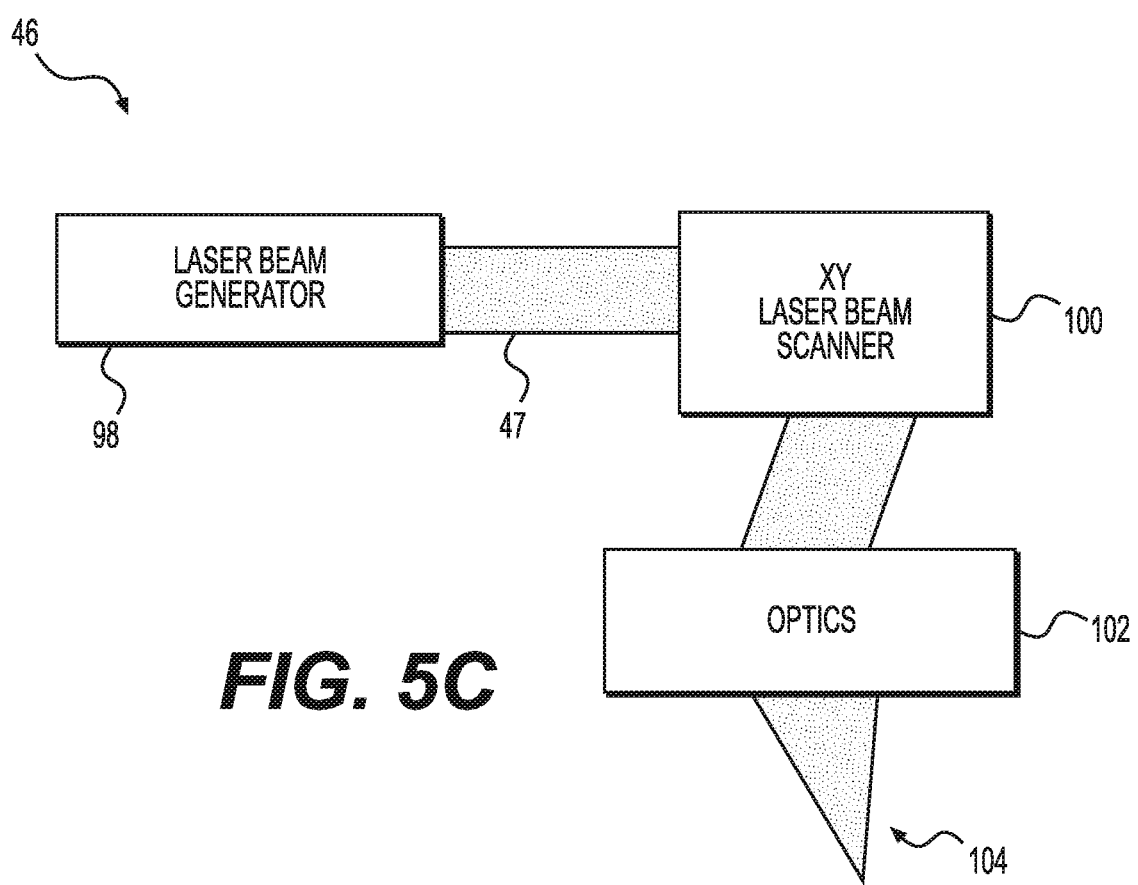

System 30 preferably also comprises an ablation system 46 that selectively ablates the dispensed material as further detailed hereinabove. Ablation system 46 can be of any type, including, without limitation, a laser scanning system, a CNC or the like. FIG. 5C illustrates a representative example of system 46, in the embodiment in which system 46 comprises a laser scanning system. In these embodiments, system 46 can comprise a laser beam generator 98 [any suitable laser may be used, e.g., "a diode pumped solid state laser" (DPSS), a fiber laser, etc.] that generates laser beam 47, an X-Y scanner 100 that scans beam 47 along the horizontal directions x and y (both perpendicular to the z direction shown in FIG. 5A), and optics 102 that generates a focal spot 104 on the dispensed building material.

System 30 can further comprise a controller 32, and optionally and preferably also a data processor 34, that control the operation of system 30. Alternatively, controller 34 can have electronic computing capability in which case it is not necessary for system 30 to include a processor separately from the controller. Controller 32 and/or processor 34 are optionally and preferably configured for controlling system 30 to execute any of the operations described above.

In some embodiments of the present disclosure, system 30 comprises a building material curing system 106 for curing the building material. Alternatively, the curing can be done by means of ablation system 46 except at a different set of operation parameters as further detailed hereinabove. System 30 can further comprises a gas flow generator 54 that generates gas flow over the formed layers following or during ablation, to remove building material debris and/or residue, as further detailed hereinabove. Optionally and preferably system 30 comprises a drying system 56 for at least partially removing solvent from building material, prior to the leveling (or straightening) by device 44, as further detailed hereinabove.

Figure 5D:
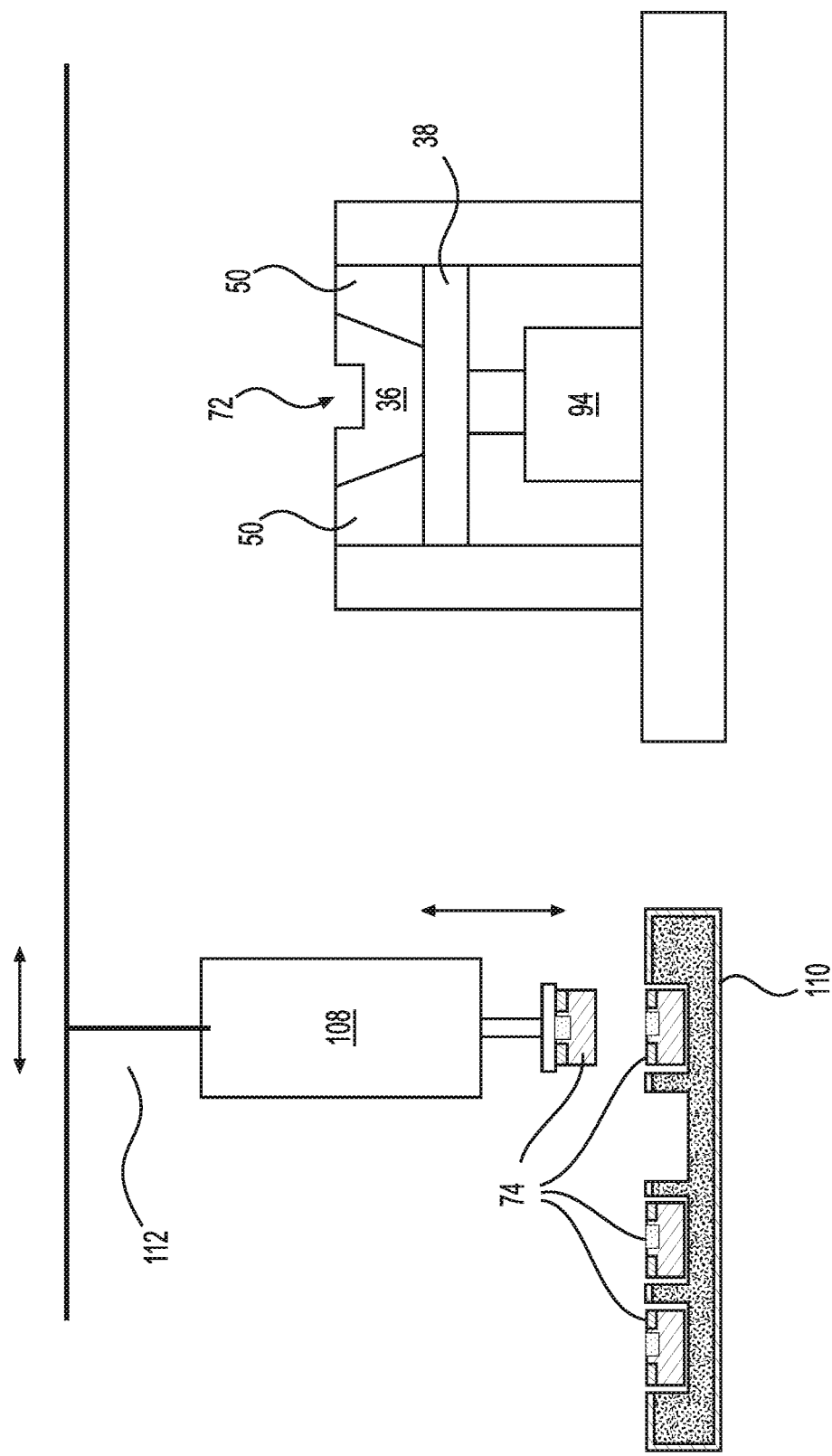

System 30 can further comprise a robotic arm 108 that places a foreign element in a cavity formed in the dispensed layers. This embodiment is illustrated in FIGS. 5D and 5E. FIG. 5E illustrates cavity 72 formed in building material 36. FIG. 5D illustrates robotic arm 108 that picks a foreign element 74 from an array 110 of foreign elements, for example, by means of temporary vacuum attachment. Arm 108 moves in the vertical and horizontal direction, for example, by means of an X-Y-Z stage 112. Arm 108 lifts the element 74 from array 110 moves the element 74 to cavity 72 and releases element 74 in cavity 72. Arm 108 and X-Y-Z stage 112 are optionally and preferably controlled by controller 32.

Further, when intense laser pulse energy is applied to a material, observation can be made based upon an energy function. For example, first a material may experience damage at energy ED ("the damage energy") and second, ablation of the materials occur at energy ETh ("the threshold energy").

Figure 17:
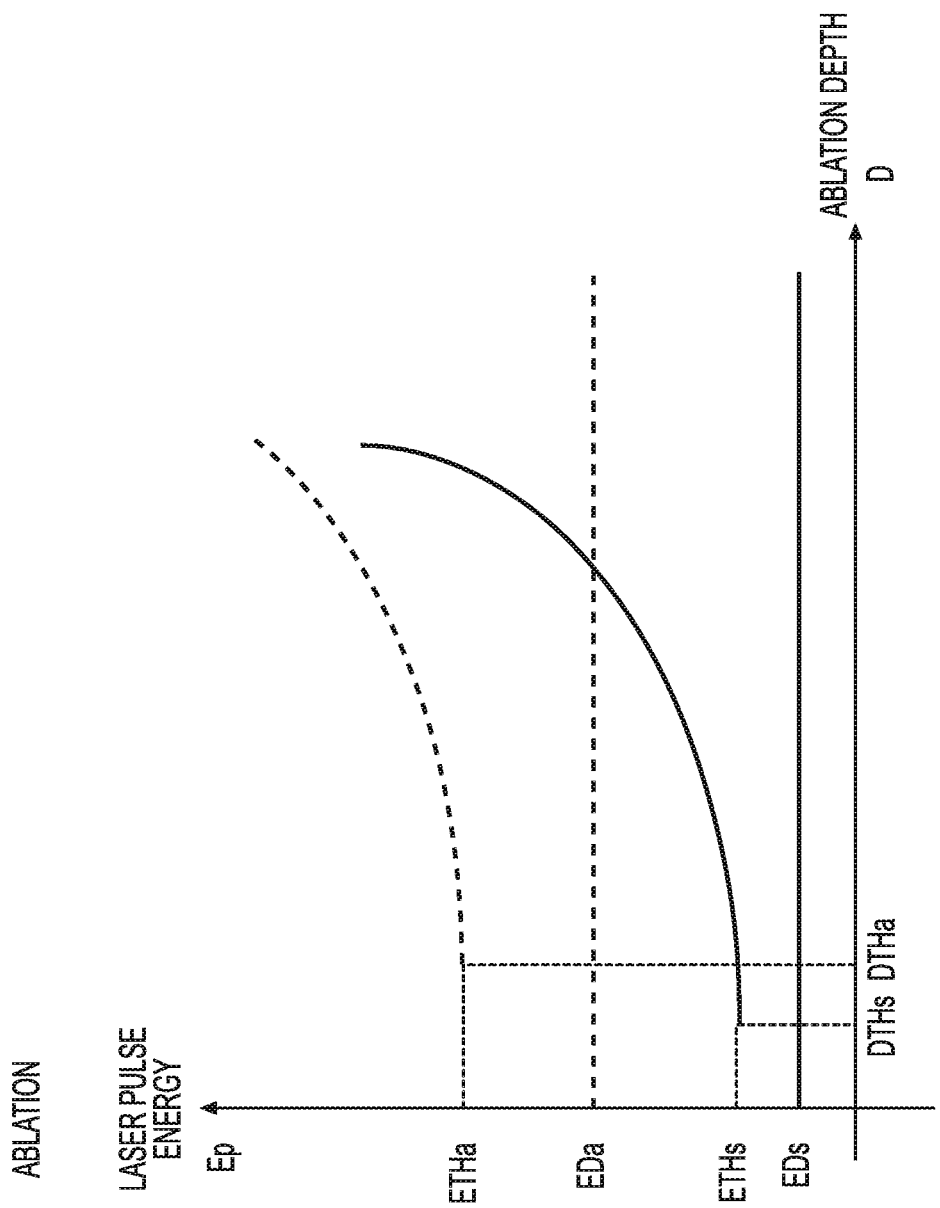
FIG. 17 is a graph illustrating material damage and ablation as a function of energy.

In the case of printing sensitive material, the threshold energy of the support EThs must be below the damage energy of the active materials EDa (i.e., EThs<<EDa). It is noted that the "active material" may refer to any building material, sensitive material, or any other material that may be un-ablated while subject other materials (e.g., a support material) to energy sufficient to cause ablation or could be removable with CNC or other removable system. See FIG. 17. For example, the support material may be a low glass temperature polymer having an added absorber like pigment or dye exhibiting an adequate or predetermined wavelength. See FIG. 17. In certain circumstances there is a desire not to ablate sensitive or active materials such as a bio material, organic light emitting material, organic semiconductor, etc. In addition, high melting temperature materials like ceramic material for which the ablation requires high laser energy may also be provided as the active material. See FIG. 17. In accordance with the above, a method for solid free form fabrication may include dispensing a support material 150 having an intrinsic "support material energy damage level" ($ED_s$) at which exposure to a first amount of energy, exceeding the support material energy damage level ($ED_s$), alters the support material 150. See FIG. 8A. This "altering" may refer to any irreversible change, e.g., a partial deformation or partial sintering that may take place within the support material 150.

Additionally, the support material 150 may have an "intrinsic support material energy ablation threshold" (EThs) at which a second amount of energy, which is higher than the first amount of energy and exceeds the "support material energy ablation threshold" (EThs), ablates the support material. The method further includes dispensing an active material having an "intrinsic active material energy damage level" (EDa) at which exposure to a third amount of energy, exceeding the "active material energy damage level," (EDa) alters the active material 136. See FIG. 17.

Further, the active material 136 may have "an intrinsic active material energy ablation threshold" (ETha) at which a fourth amount of energy, which is higher than the third amount of energy and exceeds the "active material energy ablation threshold" (ETha) ablates the active material 136. Further, the "active material energy damage level" (EDa) may be higher than the "support material energy ablation threshold" (EDs). Further, in accordance with the method, the active material 136 and the support material 150 may be deposited to form a combined material and exposing the combined material to the second amount of energy may ablate the support material 150 without altering the active material 136. See FIG. 17 and FIGS. 8B and 8C. It is noted that the reference/mention of "combined material" in the present disclosure generally refers to, for example, an overall material that may include any of a number of layers and/or regions that may have portions or segments made of more than one material. For example, an individual layer or region may have a first portion made of one material (e.g., an active material) and a second portion made of a second material (e.g., a support material). Additionally, to form multiple layers of an overall material individual layers could be stacked or formed on top of each other; in which case, for example, one of the layers could be defined entirely or partially by a first material region, and another of the layers could be defined entirely or partially by a second material region.

Further, the active material 136 and/or support material 150 may be provided in any suitable number depending upon the desired application. For example, active material 136 may include a plurality of different active materials, and the "active material energy damage level" of each of the different active materials may be higher than "the support material energy ablation threshold." Additionally, if desired, more than one different support material may also be deposited/dispensed to form the combine material.

Further, the processing amount of energy that the combined material is exposed to may be at least equal to the first amount of energy and less than the second amount of energy so as to alter the support material without ablation. That is, it is possible to subject the support material to an amount of energy that does not ablate the support material or alter the active material at all. In yet another feature, the processing amount of energy that the combined material may be exposed to may be at least equal to the second amount of energy and less than the third amount of energy so as to ablate the support material without altering the active material.

In addition, the processing amount of energy that the combined material may be exposed to may be at least equal to the third amount of energy and less than the fourth amount of energy so as to alter the active material without ablation. For example, it may be possible to ablate the support material and, at the same time, alter the active material without ablation. That is, it is possible to subject the combined material to an amount of energy that ablates any desired portion of the combined material. In other words, since the processing amount of energy can be set to exceed the active material energy ablation threshold, any desired portion of the combined material may be ablated so as to, e.g., shape, profile, or penetrate any desired portion of the combined material.

Additionally, the processing amount of energy that the combined material may be exposed to may be at least equal to the fourth amount of energy so as to ablate the active material.

In order to control a depth of the ablation, for example, a duration or intensity of the laser source may be adjusted accordingly. For example, the laser source may be configured to scan a surface of the three dimensionally shaped object or layers thereof at a slower scan rate in order to ablate the three dimensionally shaped object at a greater depth. Similarly, increasing the scan rate may cause the three dimensionally shaped object to be ablated at a much finer (e.g., smaller or high resolution) depth. In addition to adjusting a scan rate of the laser, an intensity of the laser source may also be adjusted to control the depth at which a material is ablated. Further, the intensity of the beam and the laser scan rate may both be adjusted in order to obtained a desired ablation depth.

Additionally, it should be appreciated that "leveling" as referred to in the present disclosure may also include flattening, profiling or otherwise shaping a surface of a layer of material(s) to a desired profile by using a laser source. Such leveling can also be performed by controlling the ablation depth of the laser source.

Another feature may include emitting a laser beam at differing intensities to expose the combined material to varying amounts of energy. For example, a feature of the present disclosure may include emitting the laser beam at an intensity corresponding to the second amount of energy, thereby resulting in vacant regions within the support material 150. See FIG. 8C. In addition, a feature of the present disclosure may include depositing the active material and the support material in layers according to slice data corresponding to formation of each of the layers (i.e., as similarly discussed with respect to FIGS. 1 and 2 above).

Figure 8A:
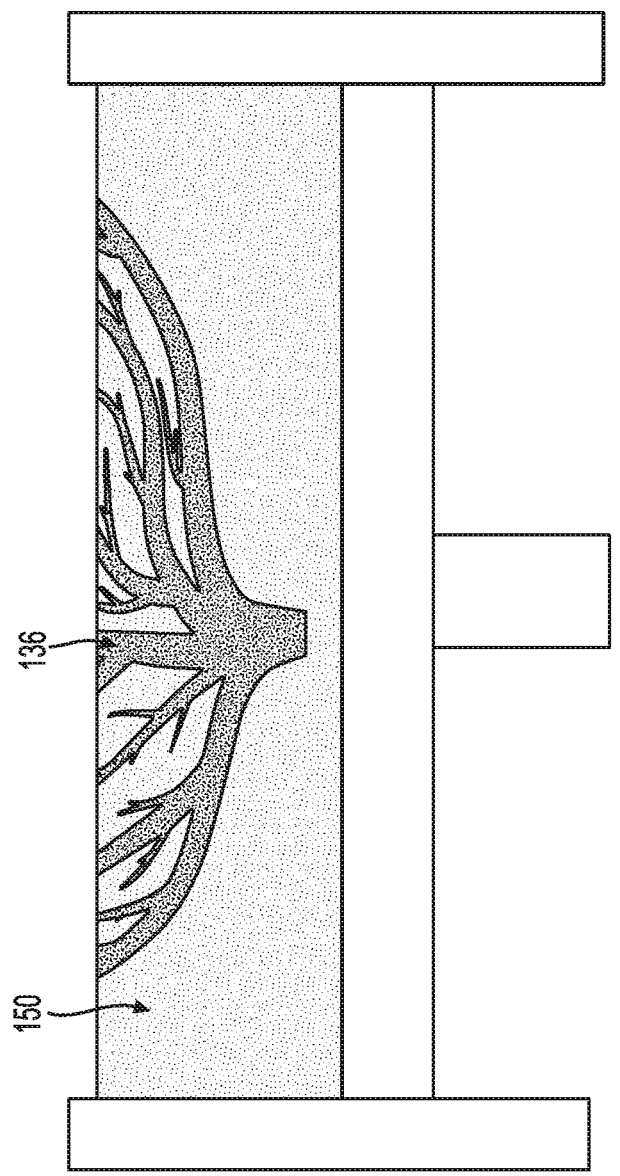

Further, a feature of the present disclosure may include depositing an uppermost support material layer $150u$ (e.g., deposited as part of the combined material) that is entirely made of the material of the support material 150. Further, by emitting the laser beam from the laser source (e.g., a laser source as described in FIG. 2D) to subject selected regions of the uppermost support material layer $150u$ to the second amount of energy, selective ablation of the uppermost support material layer $150u$ may be accomplished (e.g., creating vacant regions as illustrated in FIG. 8C). As a result, the uppermost support material layer $150u$ may have vacant regions formed therein; thereby, uncovering regions of the active material 136 that were once covered by the selectively ablated regions of the uppermost support material layer $150u$. See FIGS. 8A-8C.

It should be understood that the laser ablation mentioned in relation to the aforementioned feature can be carried out, where applicable, in accordance with processes and operations described with respect to FIGS. 2A-2M as discussed in detail above.

Figure 12A:
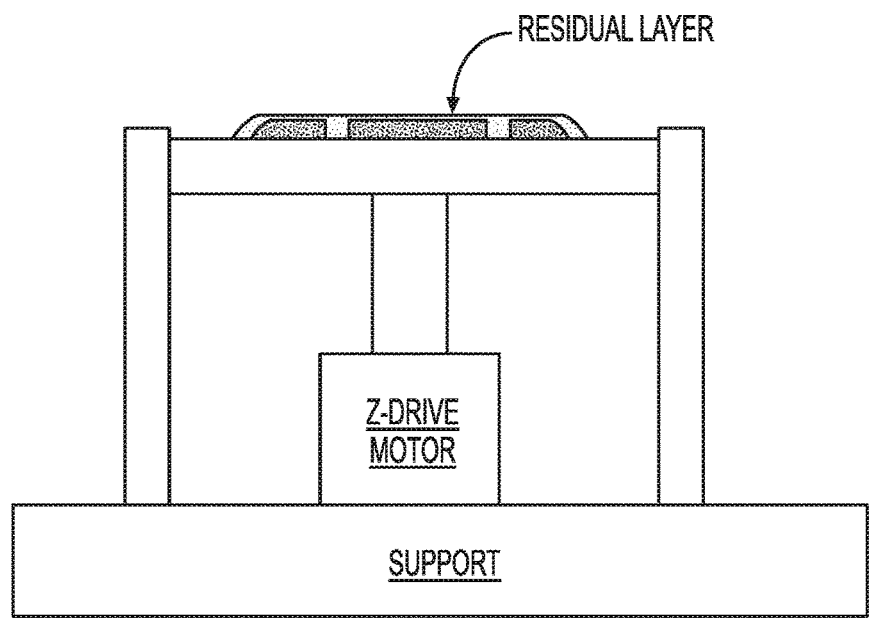
FIGS. 12A-C illustrate a method for removing (or partially cleaning) residue from, for example, an outer surface of a material by using low energy ablation.
Figure 12B:
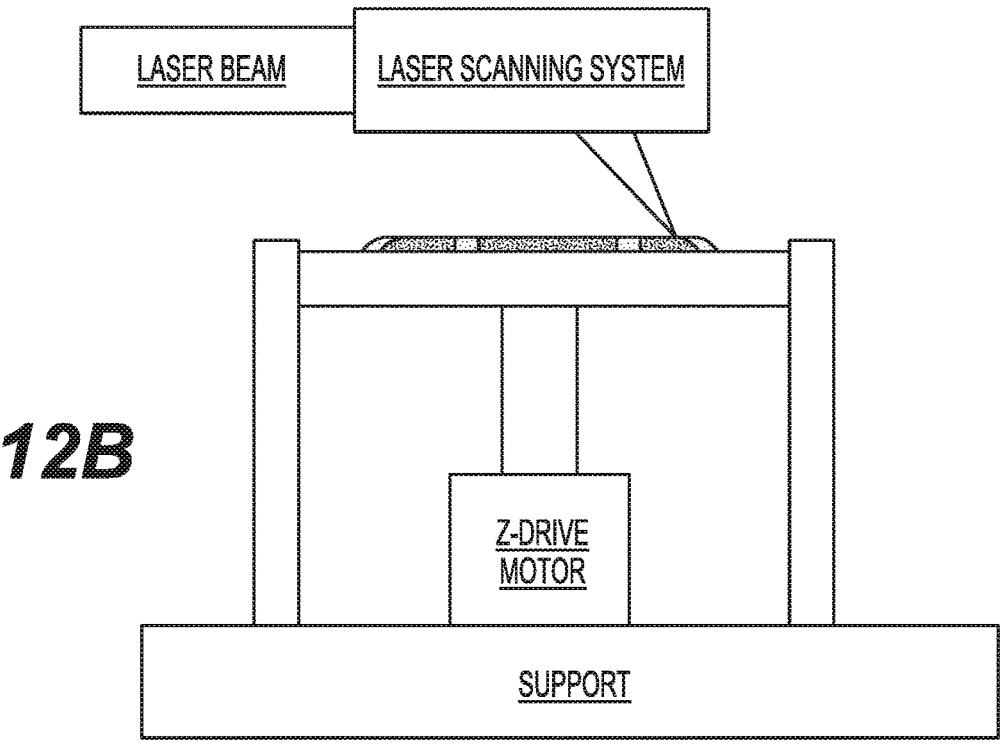
Figure 12C:
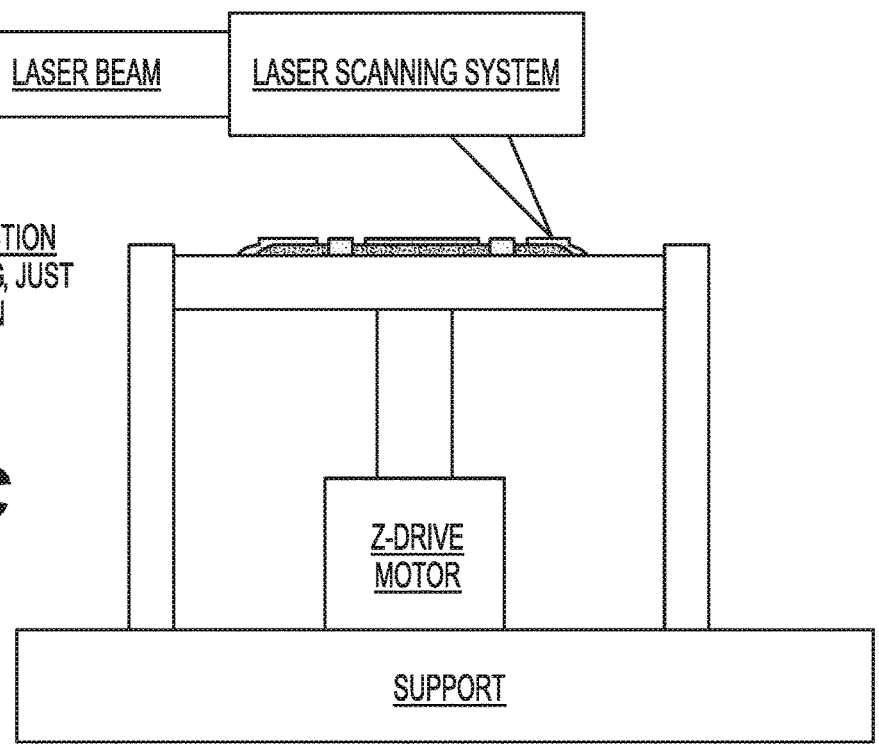

Additionally, a feature of the present disclosure may include depositing an uppermost active material layer $136u$ on top of un-ablated portions of the uppermost support material layer and within the vacant regions. See FIG. 8D. The uppermost active material layer $136u$ may be entirely made of the material of the active material 136 and leveled. Further, yet another feature may include ablating the leveled uppermost active material $136u$ layer to remove residue. See FIG. 8E and FIG. 12B.

That is, after leveling or "planarization" of the material layer it may be necessary to clean residue from the material. In order to clean such residue from the material layer a laser ablation with low energy may be applied to the material layer. See FIGS. 8E and 12A-C.

Such an ablation of residue material may also be beneficial, for example, in an application where the residue material may be electrically conductive and otherwise form an unintended or undesirable electrical pathway between other conductive regions of, for example, a combined material. For example, a laser source may ablate the residue layer with precision by controlling an ablation depth of the laser as disclosed in the present disclosure. Therefore, the residue layer may be entirely ablated or only partially ablated at predetermined portions so as to create a discontinuity in the residue layer and prevent, for example, and electrical pathway between conductive regions that should be electrically isolated from one another.

Figure 8H:
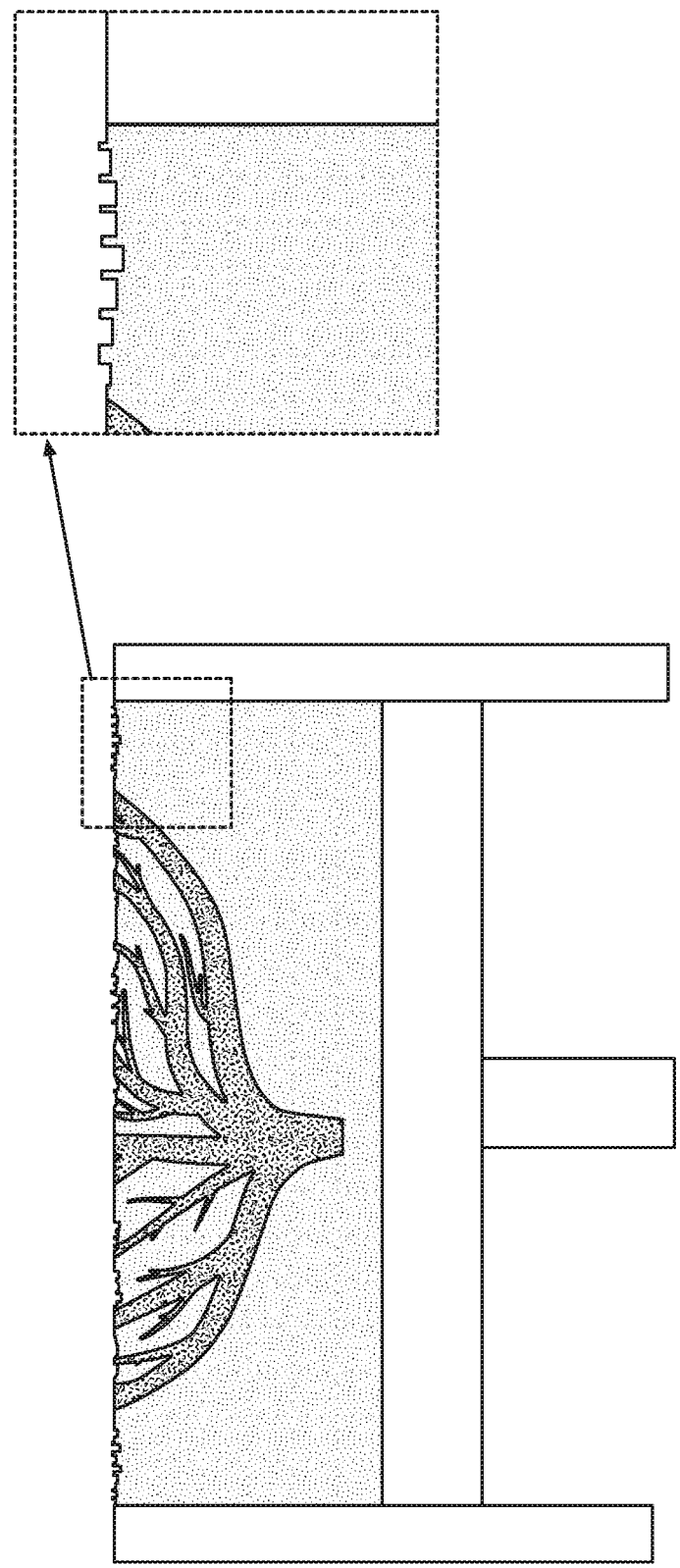

Further, another feature may include ablating the leveled uppermost active material layer $136u$ to provide a texturized surface, for example, in order to improve adhesion of a subsequent layer to-be-deposited on the texturized surface. Additionally, random or periodic texturing of the surface may improve the adhesion of the next layer. See FIGS. 8G and 8H.

Figures 9, 10:
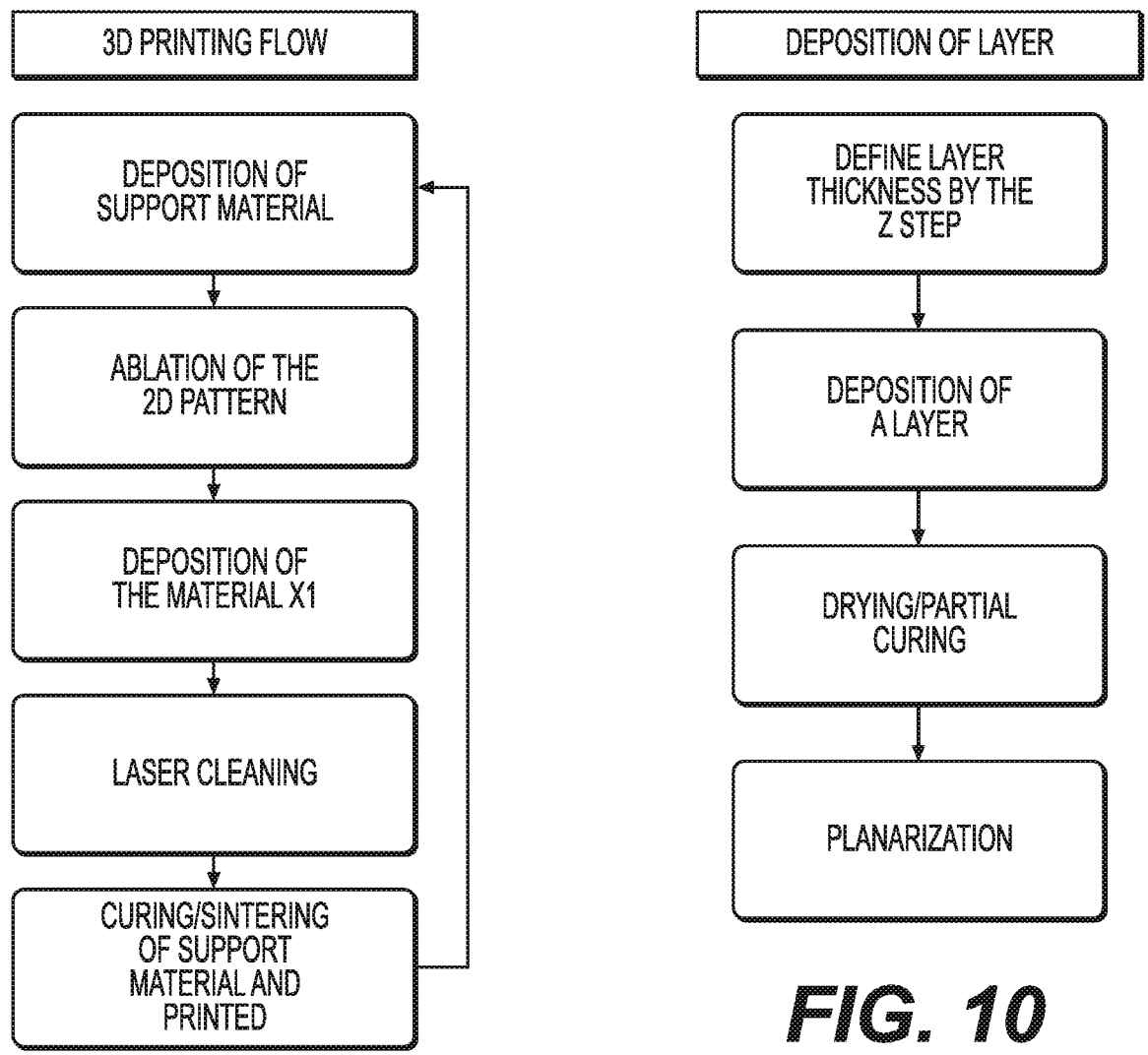
FIG. 9 is a flow chart diagram describing a representative process for depositing/dispending first and second materials.
FIG. 10 is a flow chart diagram describing an exemplary process for setting a predetermined thickness for a material that may be subsequently cured and leveled.
Figure 11A:
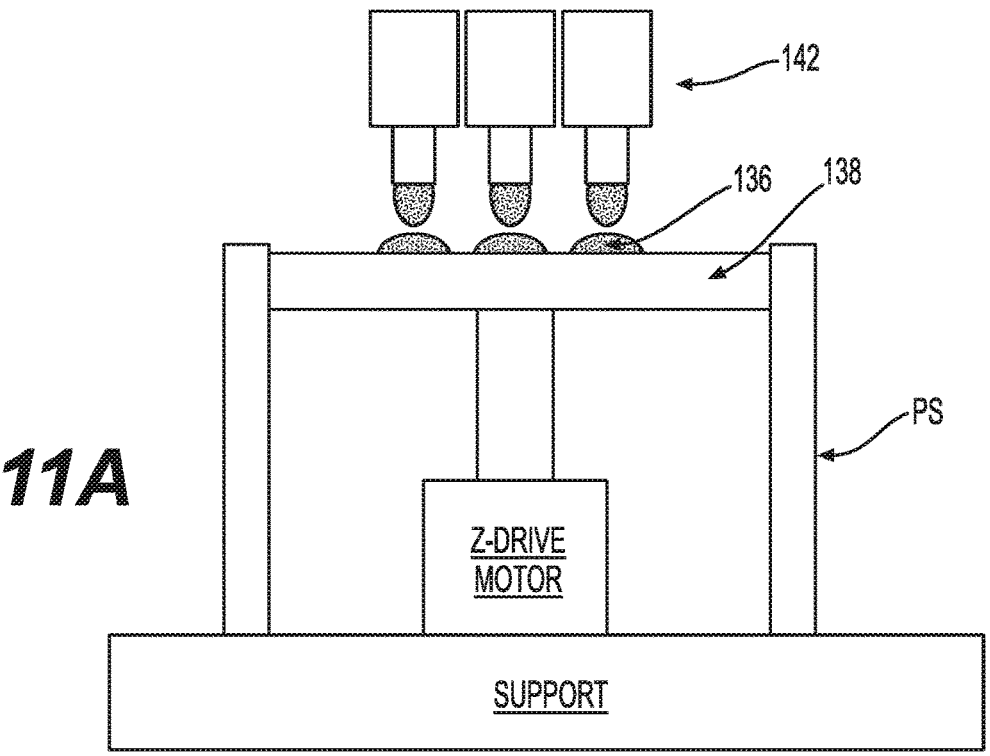
FIGS. 11A-G illustrate a pressing apparatus and various method features for forming material layer(s) of, for example, a three dimensionally shaped object.
Figure 11B:
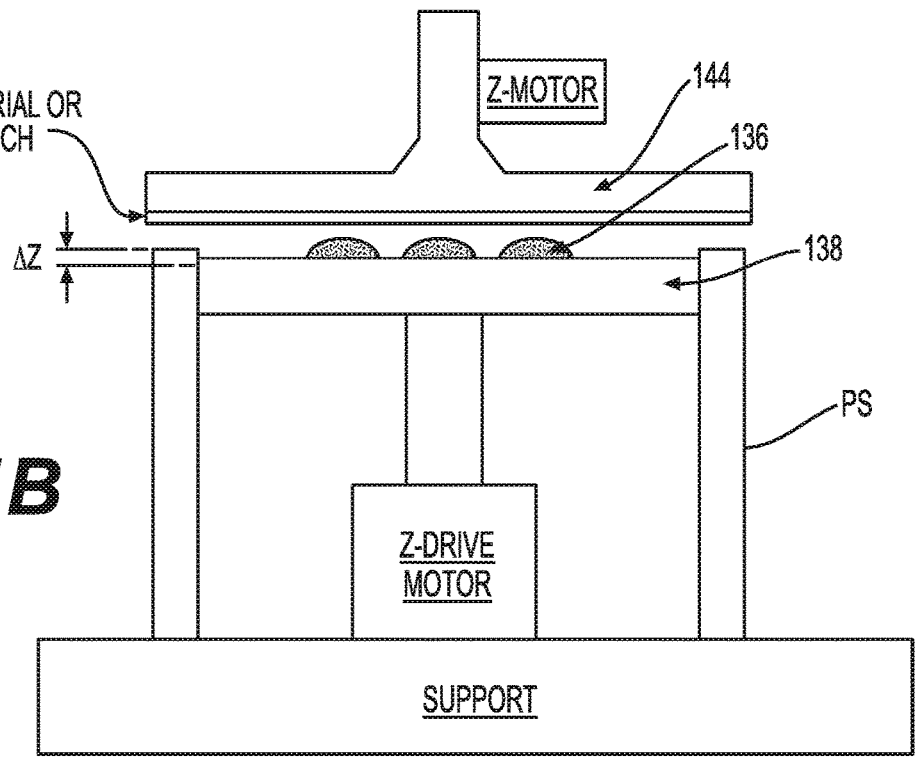
Figure 11C:
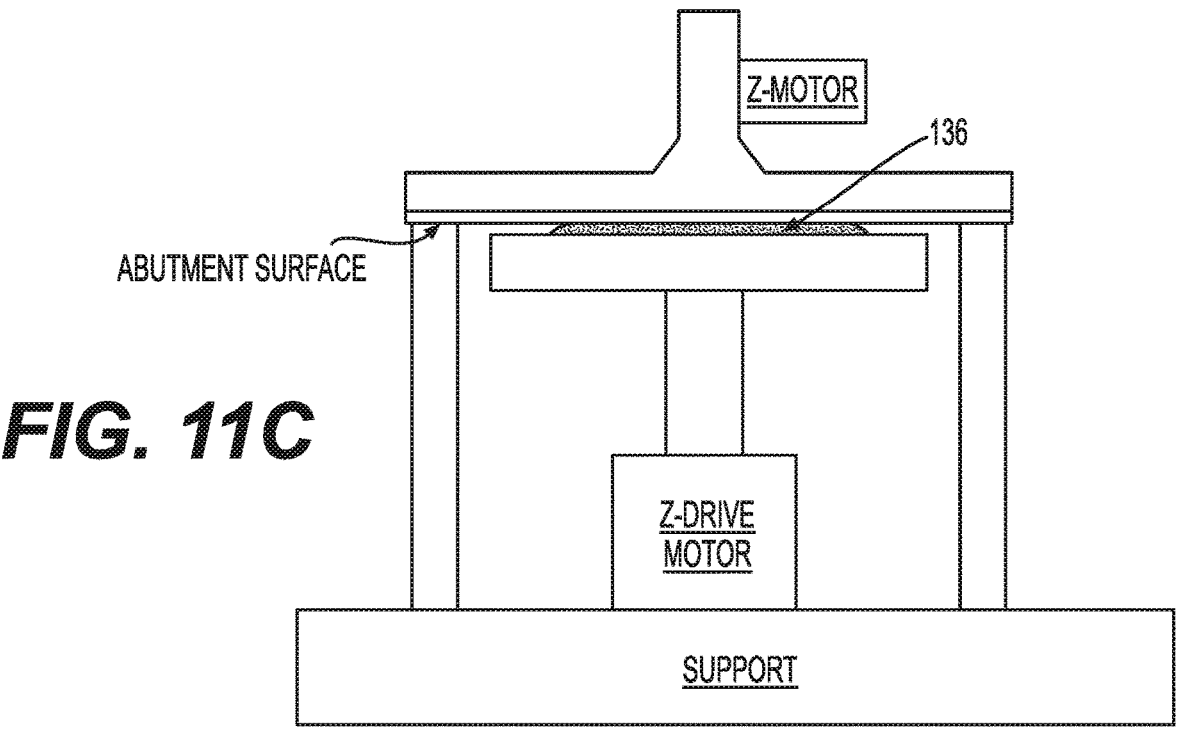
Figure 11D:
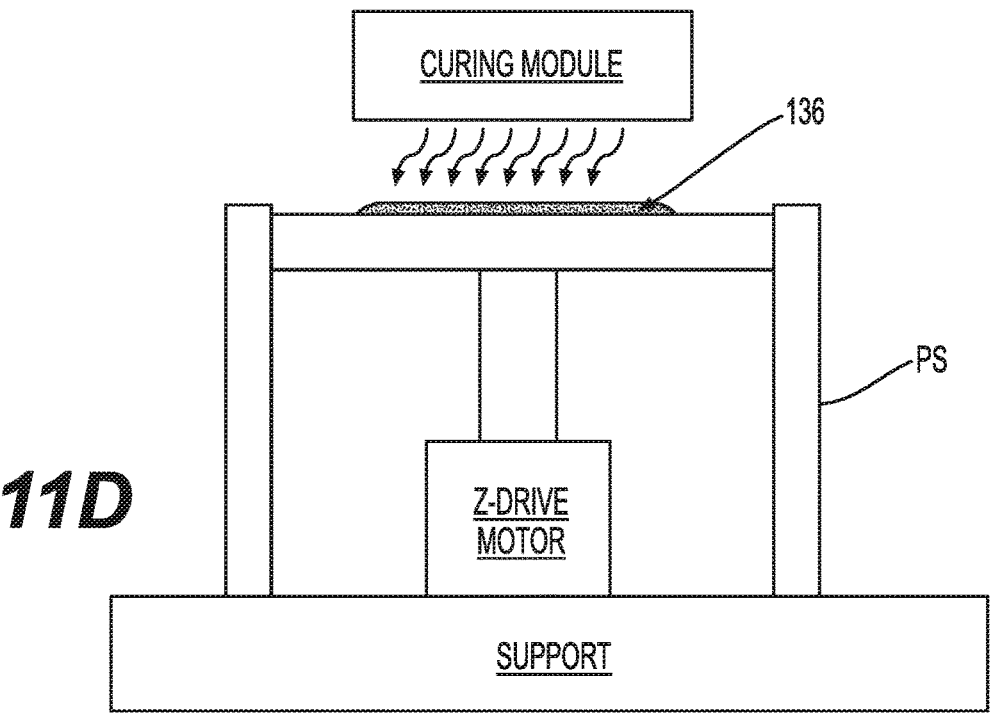

Therefore, in accordance with a 3D printing process, generally, a support material may be deposited or dispended (e.g., from a nozzle), a pattern may be ablated into the support material, an active material or a subsequent material may be deposited so as to fill the vacant regions defined by the ablated material. After leveling (or planarization of) the active material or a subsequent material any remaining residue may be removed by laser cleaning. For example, by subjecting the residue to a low energy laser beam generated by the laser source and having a sufficient energy to ablate the residue layer. See FIG. 9. Further, partial or complete curing of the support material and/or active material may take place at any desired stage within the process, i.e., after the materials are dispensed. See, for example, FIG. 11D.

In addition, a material layer thickness may be defined by setting a predetermined distance between, for example, the support surface that the material is deposited on and a surface of the press and/or by setting a distance between a press stop and the support surface that the material is deposited on. After setting the predetermined distance, which corresponds to a predetermined thickness of the material layer, partial curing or drying may take place prior to, or after, leveling or planarization. See FIG. 10.

Another feature of the present disclosure may include providing a printer pressing assembly for forming material layers. See FIGS. 11A-11D. The printer pressing assembly may include a support surface 138, a driver (e.g., a motor capable of elevating and lowering a support surface) and a press stop PS.

The driver may change an elevation of the support surface 138 relative to an elevation of the press stop PS (e.g., similar to the operation discussed with respect to FIGS. 2K, 2L and 2M) to define a predetermined distance or thickness $\Delta z$. See FIG. 11B. Further, the printer press assembly may include a nozzle 142 configured to dispense a material 136 onto the support surface 138. The nozzle may be a single or array of nozzles providing a "drop on demand" (DOD) printing system for high/low viscous material. See FIG. 11A. Further, the press 144 may be configured to be positioned opposite to the support surface 138 and move relative to the support assembly. In addition, a hydrophobic material or coating layer of hydrophobic material may be provided as the contact surface of the press 144 in order to prevent sticking between the press 144 and material deposited on the support surface 138. See FIGS. 11B and 11C. Also, the press 144 may be provided on or coupled to an ultra-sonic vibrator (not shown) to avoid sticking during press release (i.e., from the material).

In addition, the press stop PS may be configured to be elevated above the support surface 138 to engage an abutment surface of the press 144, thereby setting the predetermined distance Δz between contact surface of the press 144 and the support surface 138. Further, the press stop PS may include a wall surrounding the support surface (e.g., an annular wall extending vertically from a base of the support).

As an alternative, the press stop PS may include a plurality of elongated stops (e.g., rods, shafts, support pins, etc.) arranged, for example, at intervals, about an outer periphery of the support surface 138. It is important to note that the press stop PS is not particularly limited in that any suitable mechanism form setting a reference distance between the support surface 138 and the press 144 may be provided as a "press stop." Further, the press 144 may have a plate-shaped surface (e.g., planar surface) provided with the contact surface and configured to be positioned opposite to the support surface 138. See FIG. 11C.

In another feature of the present disclosure, the press may include a roller assembly 244 configured to level a material 136 deposited on the support surface 138 by translating in a direction parallel to the support surface 138. See FIGS. 13A-13E. The roller assembly 144 may include a stationary rod Rs and a movable rod $R_M$, wherein the stationary rod Rs engages at least a portion of the press stop PS and the movable rod $R_M$ translates in the direction parallel to the support surface 138 to level the material deposited on the support surface. See FIGS. 13A-13E.

In yet another feature, a foil may extend around outer peripheries of the stationary rod Rs and the movable rod $R_M$ to come into direct engagement with the material 136 deposited on the support surface 138 as the movable rod $R_M$ translates in the direction parallel to the support surface 138. See FIGS. 13A-13E. Further, the foil extending around the outer periphery of the movable rod $R_M$ may be oriented at an acute angle with respect to the support surface 138 as it separates from contact with the outer periphery of the movable rod $R_M$. As a result, an abrupt angle is defined between the foil wrapping around the movable rod $R_M$ and the surface of the material 136 deposited on the surface to avoid sticking. See FIG. 13G.

Additionally, a first end of the foil may be wound around a first roll (or spool) and a second end of the foil may be connected to a second roll (or spool) such that the foil is released from one of the first and second rolls as the movable rod $R_M$ translates. See FIG. 13A-13E and 13G. The press may use a plastic foil which can be replaced during the printing procedure. Further, the stationary rod Rs and movable rod $R_M$ may serve to direct the foil and be connected or coupled together in the z direction (e.g., vertical or direction of elevation). The distance between stationary rod Rs and movable rod $R_M$ varies as the movable Rod $R_M$ translates in a direction parallel to a support surface. Further, at least one roll (or spool) may be motorized to ensure proper foil tension so that the foil is as flat as possible. In addition, the foil may be provided as a hydrophobic paraffin.

Figure 13A:
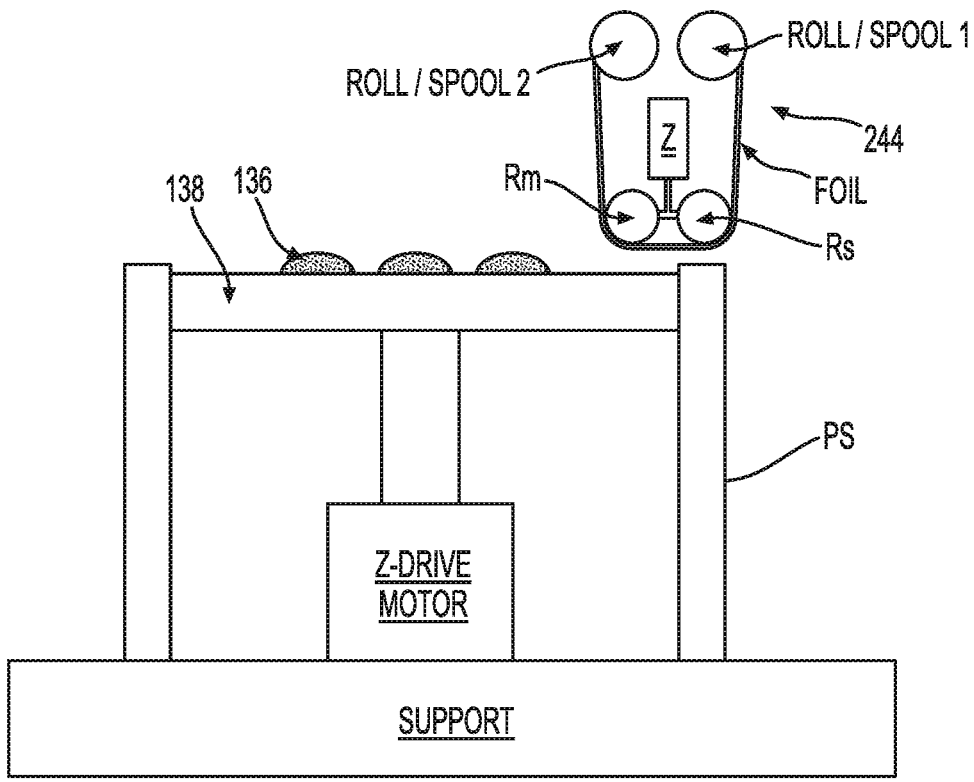
FIGS. 13A-G illustrate a pressing apparatus in the form of a rolling device and various method features for forming material layers of, for example, a three dimensionally shaped object.
Figure 13B:
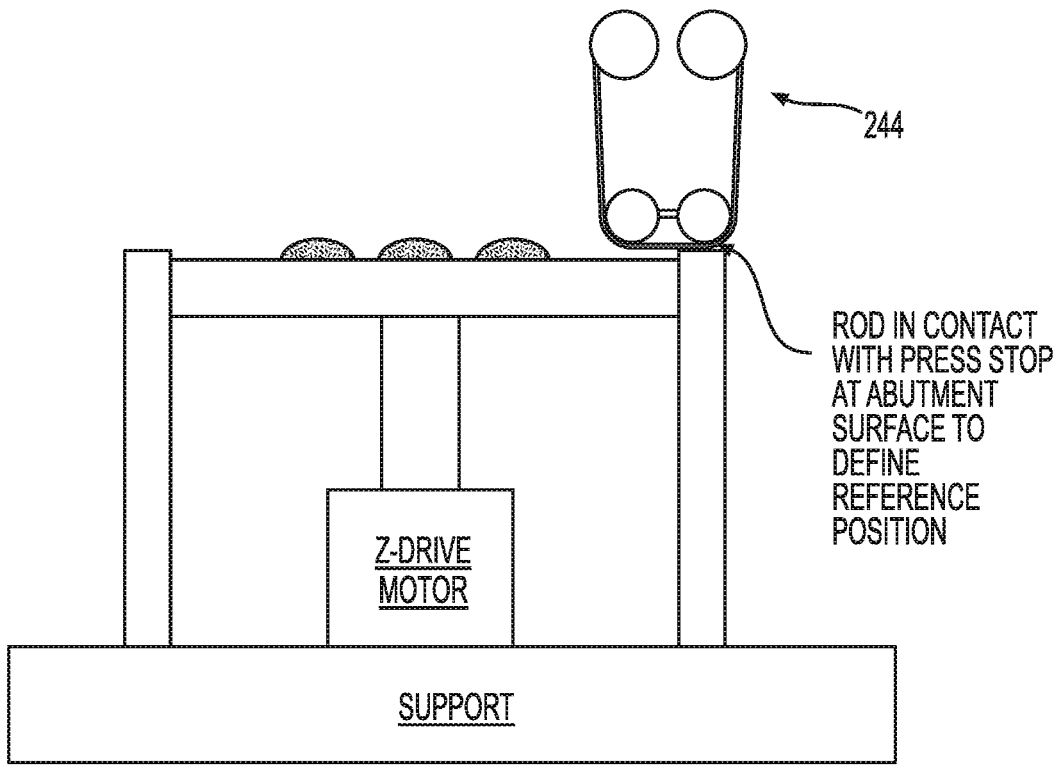
Figure 13C:
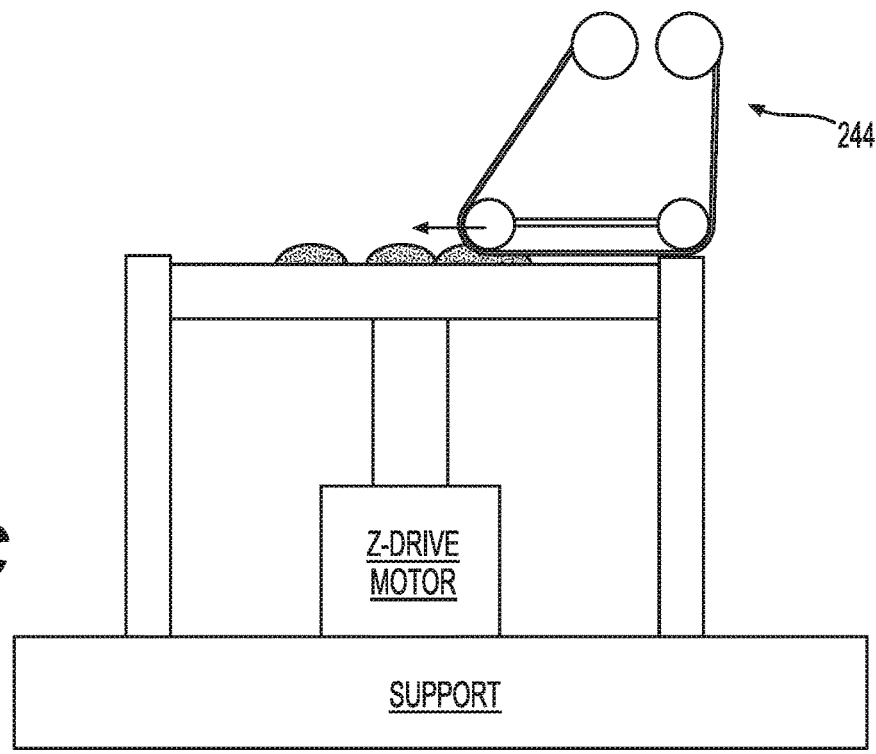
Figure 13D:
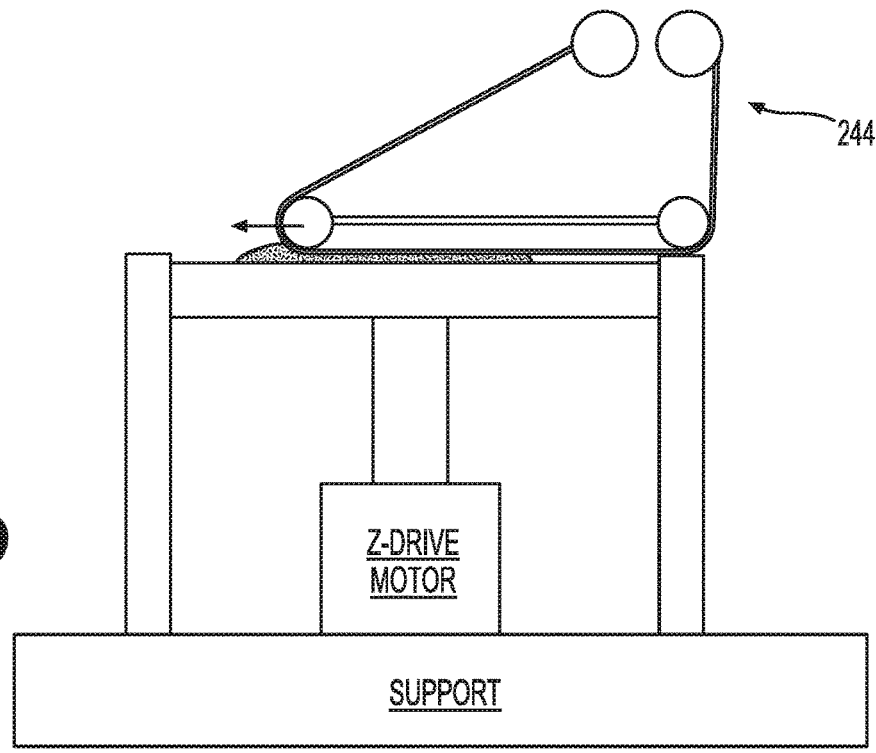
Figure 13E:
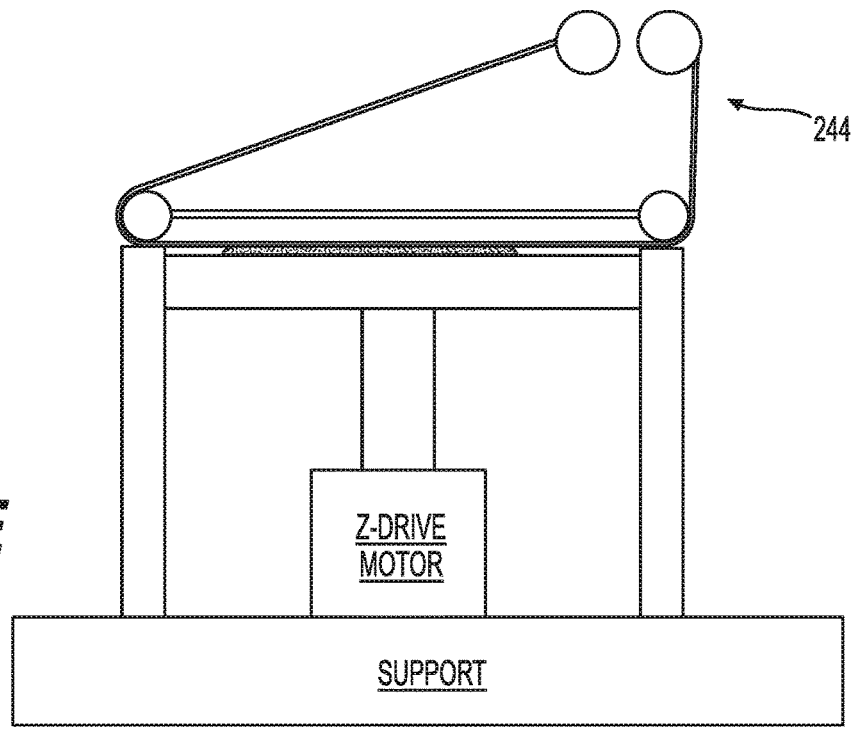
Figure 13F:
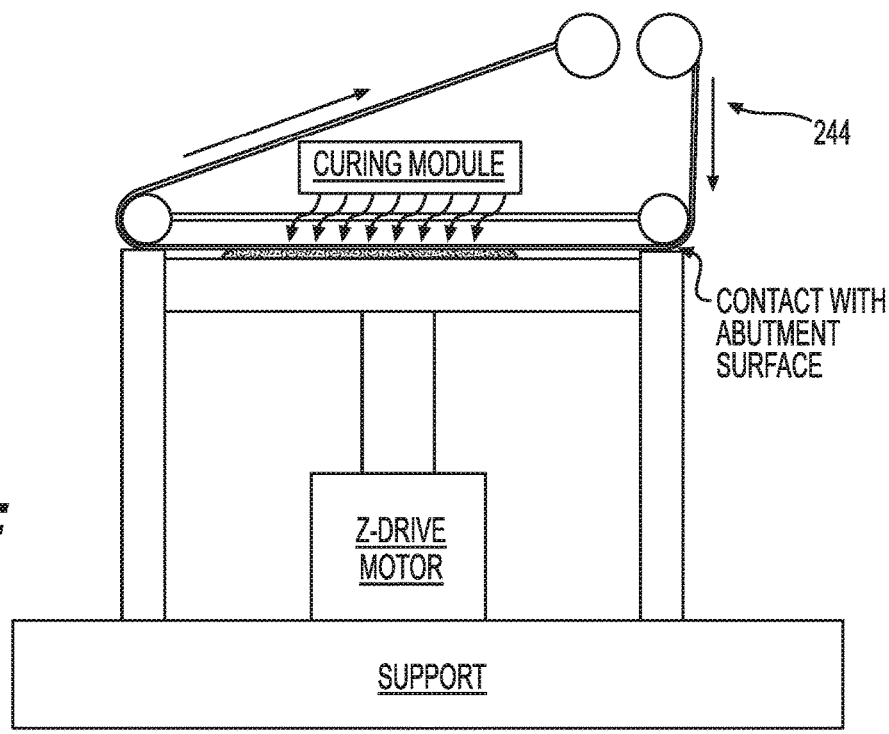
Figure 13G:
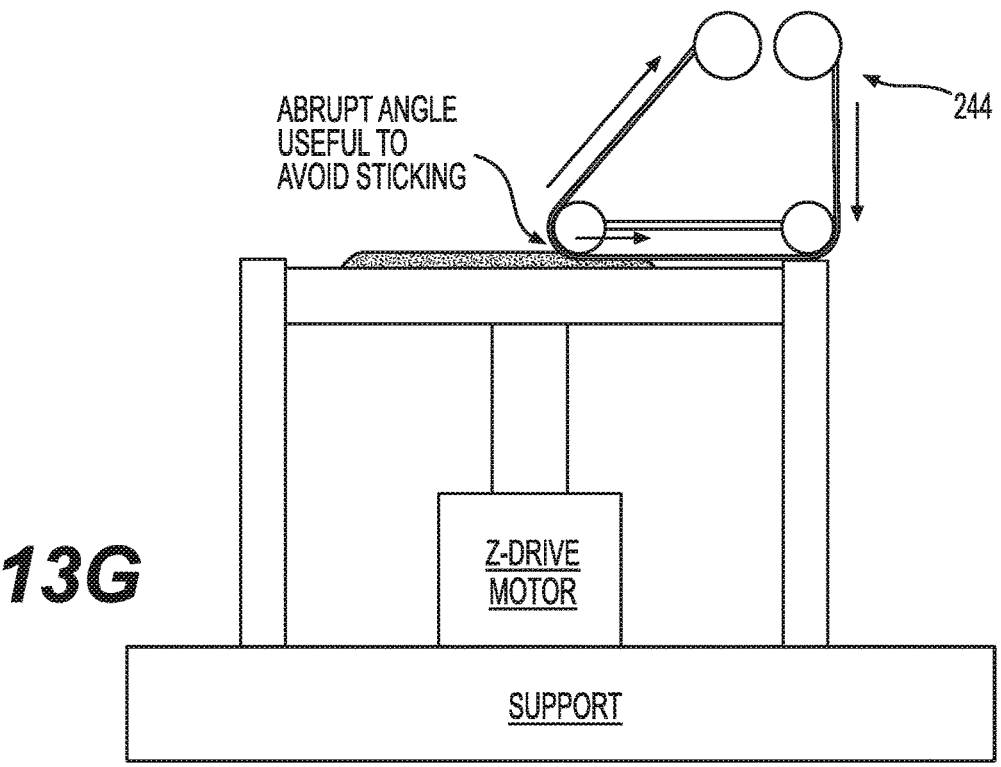

In another feature, a curing member may dry, cure or otherwise harden the material deposited on the support surface 138. FIG. 13F. Further, the curing may take place whether the foil is in place or not.

Figure 11E:
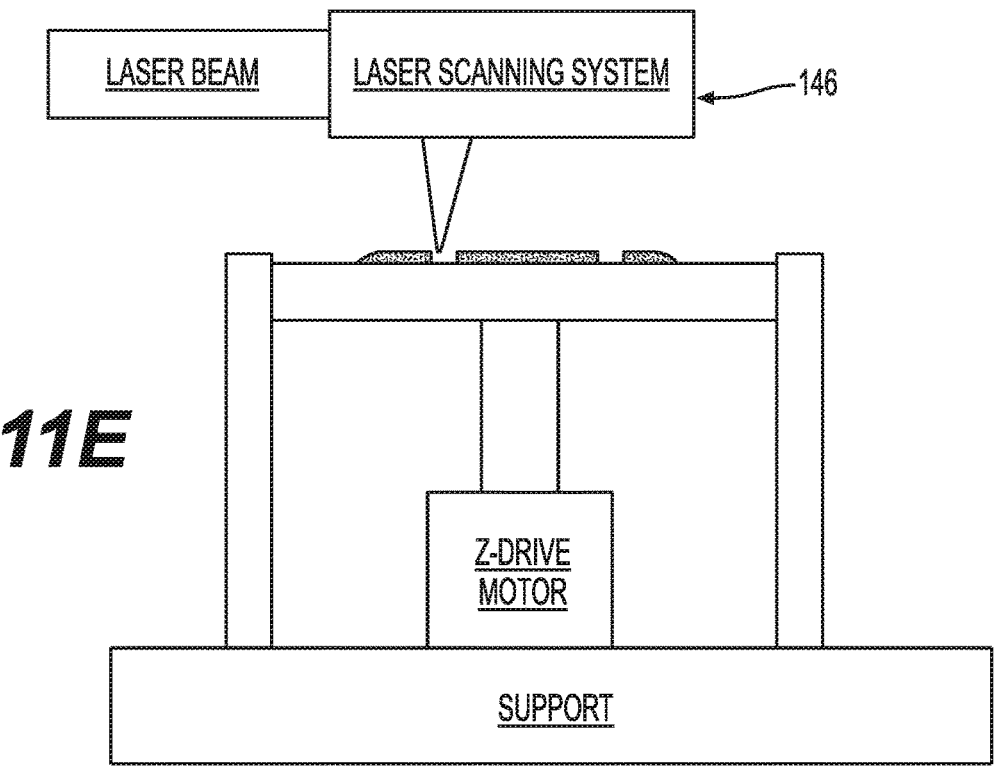
Figure 11F:
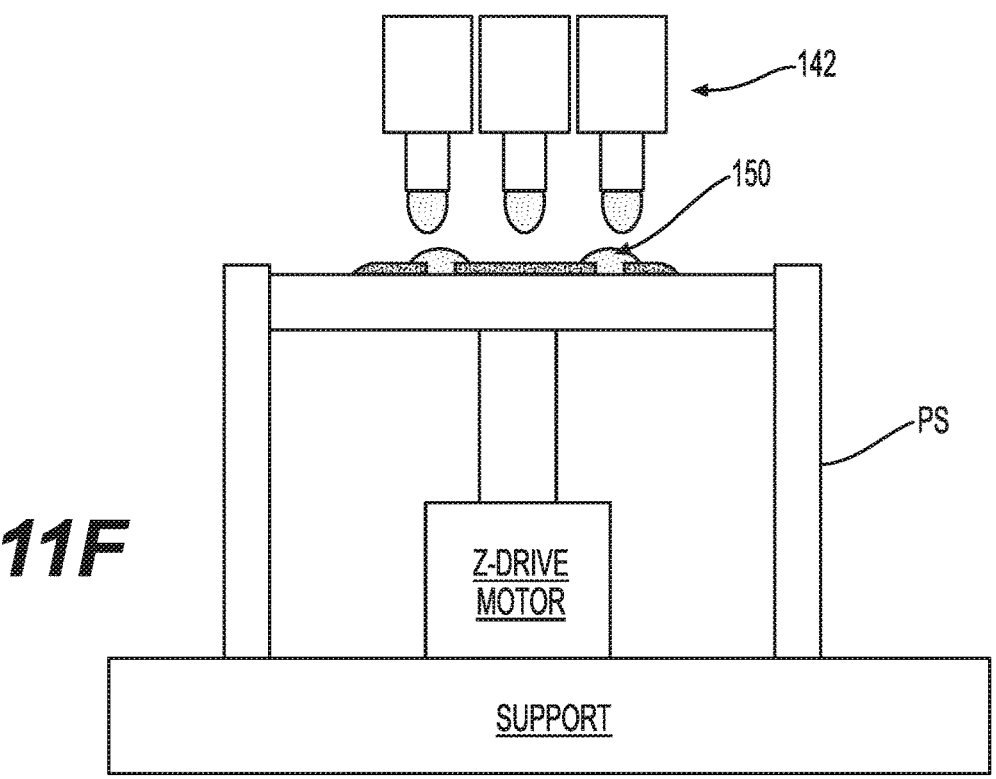
Figure 14A:
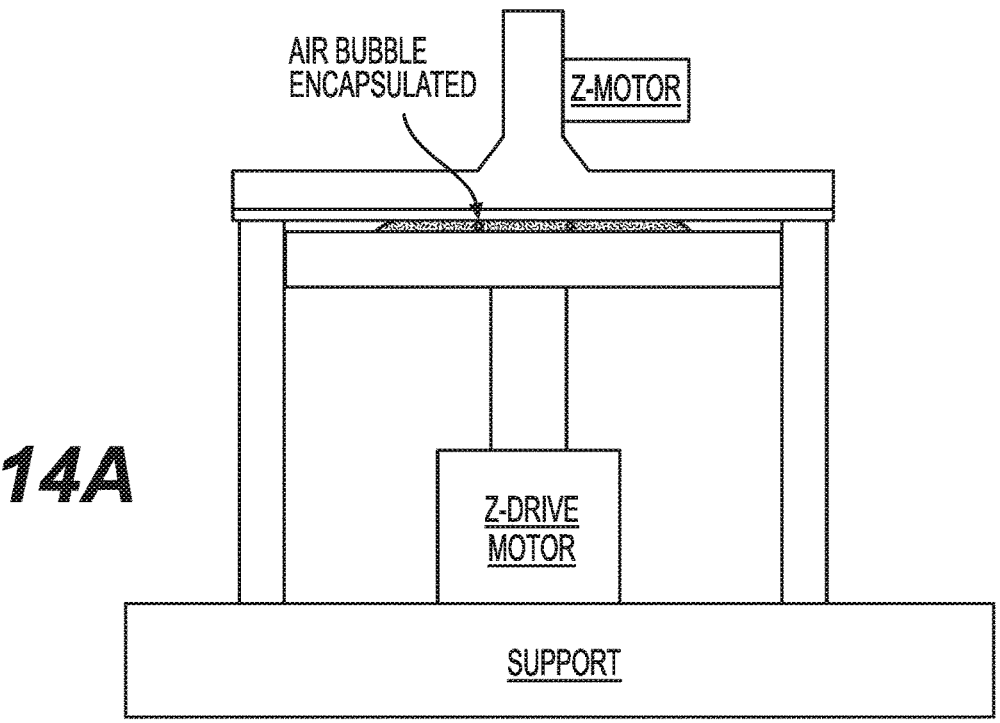
FIGS. 14A-E illustrate a pressing apparatus having first and second press stops that may be set at different elevations and various method features for forming material layers of, for example, a three dimensionally shaped object.
Figure 14B:
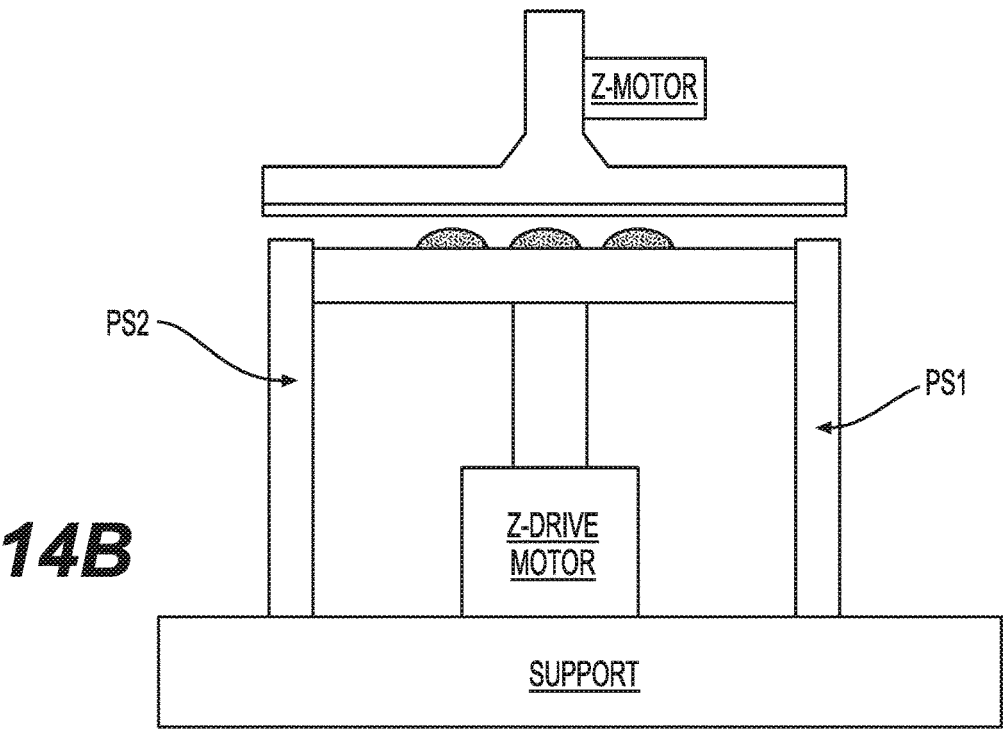
Figure 14C:
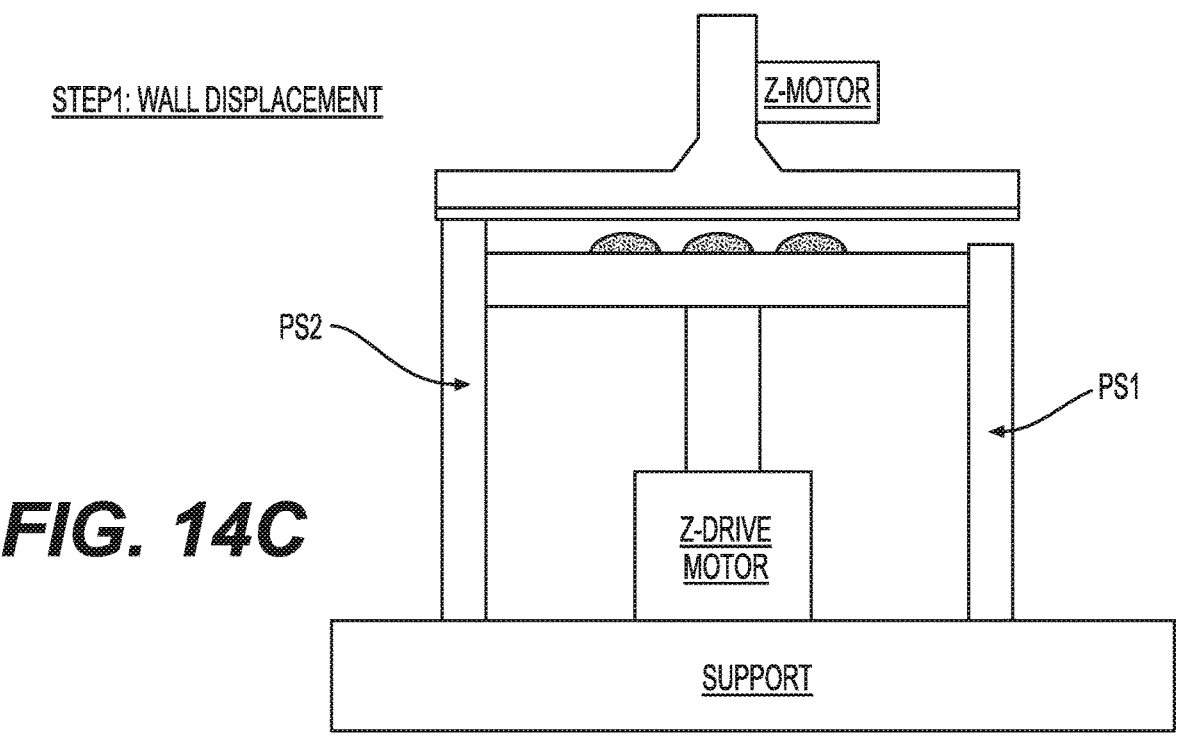
Figure 14D:
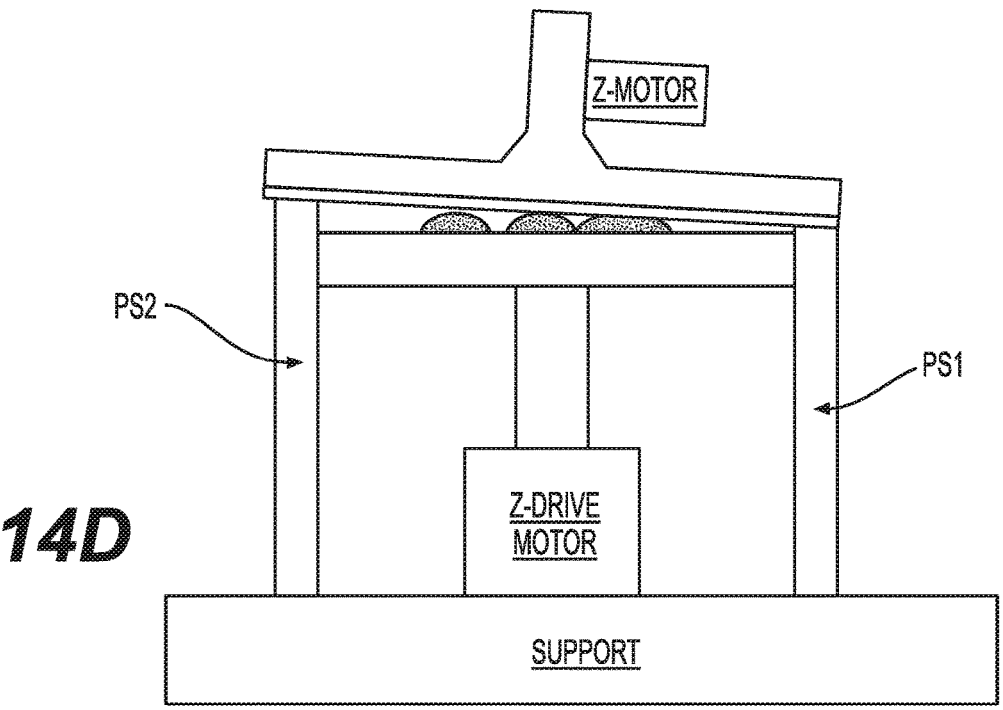
Figure 14E:
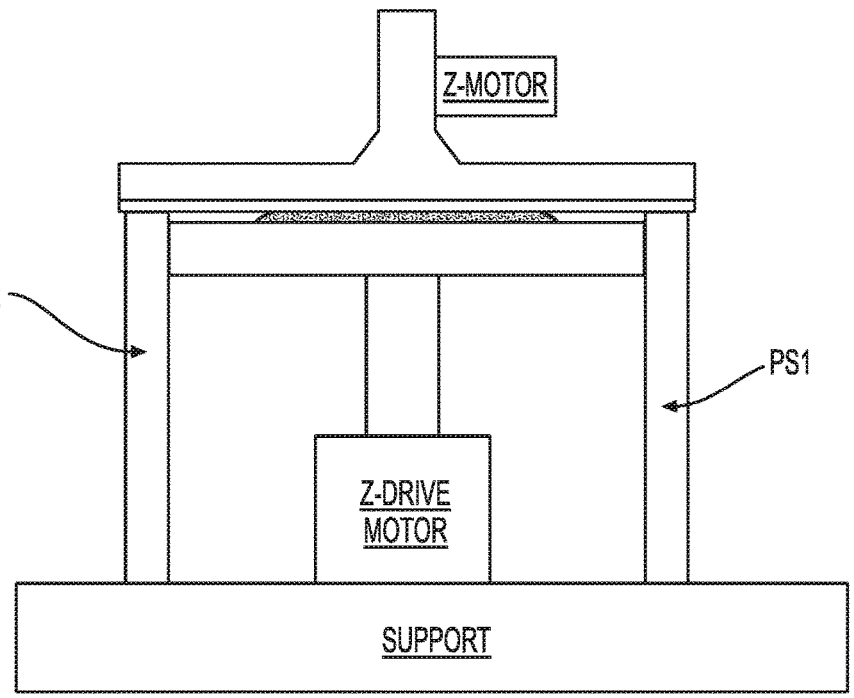

In another feature, the printing assembly may be provided with a laser source 146 configured to emit a laser beam to ablate the material 136 deposited on the support surface. See FIG. 11E. Further, the press stop PS may be provided as a wall that includes first $W_1$ and second $W_2$ walls. Additionally, in accordance with a feature of the present disclosure, the first wall $W_1$ (e.g., a motorized wall connected to a motor and configured to elevate the wall vertically above the support surface) may be configured to be elevated to a different height relative to the second wall $W_2$ to provide an inclined engagement surface that engages the abutment surface of the press 144. See FIGS. 14A-14C. It should be appreciated that the walls may be motorized by, for example, a motor configured to elevate the walls in a vertical direction.

Further, at least one of the first wall $W_1$ and second wall $W_2$ may be configured to be moved towards or relative to the press 144. It is important to note that the first wall $W_1$ and second wall $W_2$ are not particularly limited in that any suitable mechanism form setting a reference distance (or orienting an angle) between the support surface 138 and the press 144 may be provided in place of the first wall $W_1$ and second wall $W_2$. See FIGS. 14A-14E.

Further, the "motorized wall" may be actuated by a piezo Z translator or by a motorized actuator. It is noted that in a case where the layer is pressed substantially with the support surface and the contact surface of the press being parallel to each other, some air bubbles may accumulate within the layer. See FIG. 14A. By initially applying the pressure at an angle and slowly (e.g., gradually or progressing) orienting the support surface and the contact surface of the press to be parallel to each other, air may be squeezed out of the layer.

In accordance with another feature, a method of solid free form fabrication may include providing a press 144 and a support assembly having a support surface 138, a driver and a press stop PS. Further, the driver may be configured to elevate and lower the support surface 138 relative to the press stop PS. In addition, the method may include positioning the support surface 138 such that a predetermined distance is defined between a surface of the press stop PS, which is configured to engage an abutment surface of the press 144, and a support surface 138. Further, the method may include depositing a first material 136 onto the support surface, bringing the surface of the press stop PS and the abutment surface of the press 144 into contact with each other such that the first material 136 is pressed into a first material layer having a thickness corresponding to the predetermined thickness, separating the support surface 138 and the abutment surface of the press 144 from each other, and selectively ablating the first material layer 136 to form vacant regions within the first material layer. See FIG. 11E.

Figure 11G:
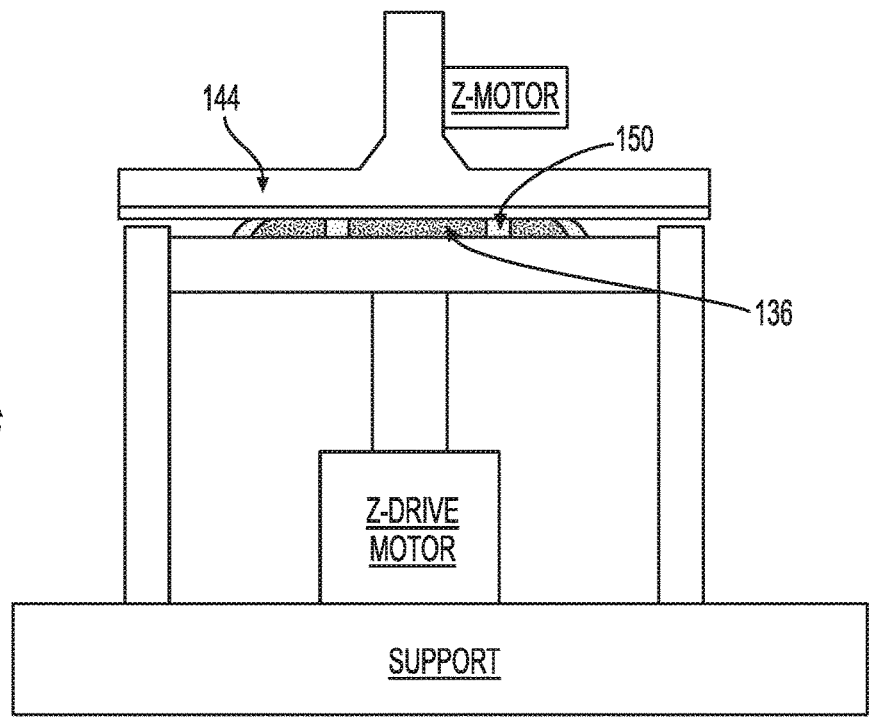

A further feature may include dispensing at least a second material 150 onto the first material layer to fill the vacant regions formed within the first material layer 136, and bringing the surface of the press stop PS and the abutment surface of the press 144 into contact with each other such that the second material 150 is leveled. FIG. 11G. Also, when a thin residue layer of the second material 150 remains after the second material 150 is leveled, the residue layer may be ablated to remove at least a portion of the residue layer. See FIGS. 12A and 12C. Further, the entire residue layer may be removed by ablation. See FIGS. 12A and 12B. In another feature of the present disclose, at least regions of the residue layer immediately surrounding the second material that fills the vacant regions of the first material are removed. See FIG. 12C. Also, the method may include at least one of an upper surface of the first material layer and a leveled surface of the second material being ablated to provide a texturized surface to improve adhesion of a subsequent layer deposited on the texturized surface (e.g., as discussed in relation to FIG. 8G). Also, as a further feature, the first material may be at least partially cured. Further, in accordance with another feature, at least one of the first material and the second material may be partially cured. See FIG. 11D.

Further, any desired material layer may be comprised of multiple different materials (e.g., any number of different active materials and support materials) that may be determined, for example, based upon slice data as discussed in the present disclosure. For example, multiple different materials may be dispensed from different dispensing heads based upon the slice data in order to form a predetermined layer(s) comprising the multiple different materials. Such dispensing could take place concurrently or in any desired order depending upon the desired application.

In yet another feature, a method of solid free form fabrication using the printer pressing assembly of the present disclosure may include providing the press strop PS with a first press stop $PS_1$ and a second press stop $PS_2$. See FIGS. 14A and 14B. Further, the method may include elevating the first press stop $PS_1$ to a different height relative to the second press stop $PS_2$ so as to provide an inclined engagement surface that engages the abutment surface of the press 144 such that the press 144 is oriented at angle with respect to the support surface 138. See FIG. 14C. Further, the method may include progressively lowering an elevation of one of the first press stop $PS_1$ and the second press stop $PS_2$ such that the first material 136 is progressively pressed by the press 144 in a direction from one end of the support surface towards another end of the support surface 138 (FIGS. 14C and 14D), thereby eliminating air bubbles within the first material as the contact surface of the press becomes oriented horizontal to the support surface. For example, by inclining and pressing the material, with the effects of gravity, air bubbles can be prevented and eliminated within the material(s).

In addition, it should be noted that the "support surface" may be a table, substrate, prior layer of material, or any other surface on which the material may be directly or indirectly deposited. For example, the support surface may be a printed circuit board "PCB" on which material(s) may be deposited and ablated in accordance with aspects of the present disclosure. For example, a material layer may be deposited on a PCB and ablated according to, for example, slice-data to form vacant regions within the material layer to delimit or define an electrically conductive pattern formed on the circuit board.

Figure 16:
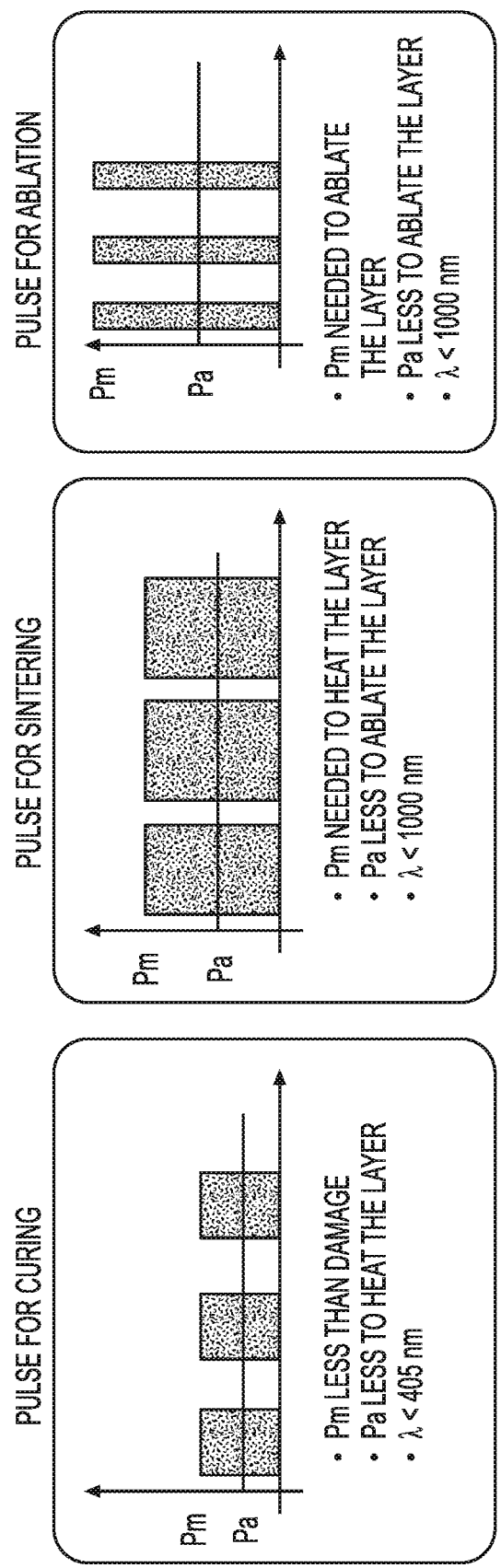
FIG. 16 illustrates different operation modes of the same laser capable of performing curing, sintering and ablation.

Further, in accordance with another feature, a solid free form fabrication system incorporating the printer pressing assembly of the present disclosure may include an ablation system (e.g., a pulse laser) configured to cure and ablate the material dispensed onto the support surface, and the curing and ablating is performed by the same ablation system, which is configured to operate at a different set of parameters. See FIG. 16. Further, the ablation system may include a pulse laser configured to emit a laser beam at different intensities.

Further, in accordance with yet another feature of the present disclosure, a solid free form fabrication system incorporating the printer pressing assembly may further include a curing member configured to cure the material dispensed onto the support surface and an ablation system configured to ablate the material dispensed onto the support surface. See FIG. 16. Further, the ablation system may include a Computer Numeric Controlled (CNC) system.

In another feature of the present disclosure, a system for solid free form fabrication may include a material deposited on a surface, and a laser source configured to emit a laser beam at different set parameters. Further, the laser source, when emitting the laser beam at a first setting of the different set parameters, may be configured to cure the material deposited on the surface. The laser source, when emitting the laser beam at a second setting of the different set parameters, may be configured to sinter the material deposited on the surface. The laser source, when emitting the laser beam at a third setting of the different set parameters, may be configured to ablate the material deposited on the surface. Further, the laser source may include an ultraviolet fiber laser. Further, a pulse duration of the laser may be adjusted in setting one of the first setting, the second setting and the third setting. Additionally, the pulse duration may be configured to be selected within a range of between 2-200 nanoseconds to perform a selected one of curing, sintering and ablating.

More particularly, when the laser source is provided as a ultraviolet (UV) laser fiber, it is possible to tune or adjust a number or parameters, e.g., a pulse width, a frequency, or an energy of the laser and (apply the laser source) without unintentionally damaging, e.g., a delicate or sensitive material (e.g., since the present laser source may be provided as a UV laser).

Therefore, the UV laser source of the present disclosure may be utilized in a multitude of free forming processes. For example, in a photo curing process, which may include the polymerization of an organic monomer, UV light generally below 405 nm with quasi continuous emission may be utilized. For example, during a photo curing process the material may be subjected or exposed to a large pulse width of ~200 ns at a relatively high frequency of 700 kHz and an energy level lower than the energy that would heat the material. See FIG. 16.

Further, in a sintering process, in which partial ablation of the material may occur (or is desired), it is necessary for the material to sufficiently absorb the UV light, i.e., in order to enable heating of the material. Accordingly, since UV light is absorbed well by most materials and a quasi-continuous emission is desired in the sintering process, a large pulse width of ~200 ns at high frequency of 700 kHz and a relative high level of energy to heat the materials may be provided.

Also, in an ablation process, in which the materials may be densified by exciting nano/micro particles within the material, light to heat the materials and enable evaporation in a the shortest time possible to avoid heat deformation of the materials is needed. In general, since UV light is absorbed well by most of materials, a short pulse emission is set in order to generate UV light suitable for the ablation process. For example, a short pulse width of ~<2 ns at high frequency of 10 kHz with and high energy level to evaporate the materials may be used. The densified material may be in any one of a powder form, a metal colloid, a ceramic colloid, a semiconductor particle ink colloid, a paste, etc.

Therefore, the same UV laser of the present disclosure may be used in at least three distinct processes (namely curing, sintering, and ablating).

As used herein the term "about" may refer to ±10%. Throughout this application, various embodiments of the present disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the present disclosure, which are, for brevity, described in the context of a single embodiment, may also be provided separately or in any suitable subcombination or as suitable in any other described embodiment of the present disclosure. Certain features described in the context of various embodiments are not to be considered essential features of those embodiments, unless the embodiment is inoperative without those elements.

Various embodiments and aspects of the present disclosure as delineated hereinabove and as claimed in the claims section below find support in the following examples.

EXAMPLES

Reference is now made to the following examples, which together with the above descriptions illustrate some embodiments of the present disclosure in a non-limiting fashion.

Exemplified SFF Process

Figure 6:
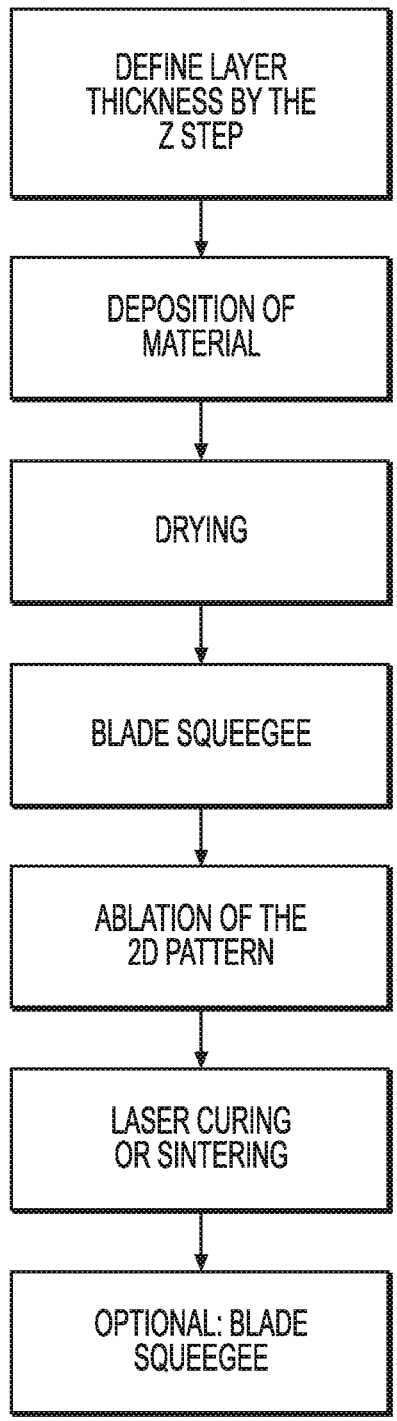
FIG. 6 is a flow chart diagram describing a representative example of an SFF process, according to some embodiments of the present disclosure.

FIG. 6 is a flow chart diagram describing a representative example of an SFF process, according to some embodiments of the present disclosure. A layer thickness is defined by vertical drive 94. Then, a material is dispensed, following by an optional drying operation. Stagnating is then applied, for example, by a blade squeegee. Thereafter, the leveled (or straightened) material is ablated to form a two-dimensional pattern. Optionally, the material is then cured or sintered. An additional straightening operation can optionally be executed following the curing or sintering. The process then loops to the first block for defining the next layer.

Exemplified Placement of Foreign Element

Figure 7:
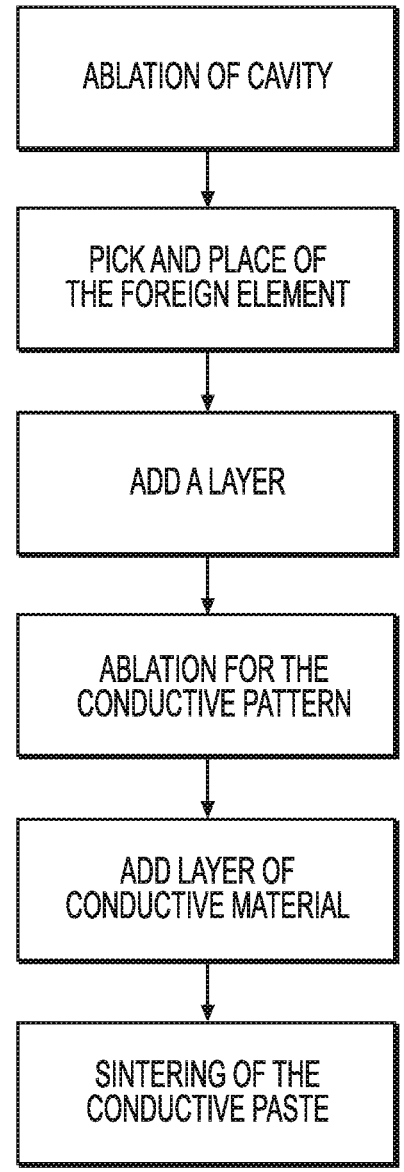
FIG. 7 is a flow chart diagram describing a representative example of a process for combining a foreign element with a solid freeform fabricated object, according to some embodiments of the present disclosure.

FIG. 7 is a flow chart diagram describing a representative example of a process for combining a foreign element with a solid freeform fabricated object, according to some embodiments of the present disclosure. Cavity 72 is abated in the dispensed building material. The foreign element is picked from the array 110 and placed in the cavity 72. An additional layer is then added, and a pattern for a conductive track is ablated. A conductive building material is then dispensed to fill the ablated pattern. Sintering, such as, but not limited to, laser sintering, is applied to the conductive building material.

Although the disclosure has been described in conjunction with specific embodiments thereof, it is evident that many alternatives, modifications and variations will be apparent to those skilled in the art. Accordingly, the disclosure is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A method for solid free form fabrication, the method comprising:
   printing, with a dispensing head, one or more support material layers;
   forming vacancies within the one or more support material layers;
   filling the vacancies within the one or more support material layers with a modeling material;
   straightening the modeling material with a leveler to form a layer of a three-dimensional object;
   removing at least a portion of the one or more support material layers from the three-dimensional object; and
   recycling the modeling material that is removed by the leveler from each layer of the three-dimensional object, wherein the recycling comprises:
   rotating with a rotating mechanism a first reservoir and a second reservoir about an axis of the rotating mechanism so as to position the first reservoir into a collecting position and the second reservoir away from the collecting position;
   collecting in the first reservoir a first type of the modeling material that is removed by the leveler;
   rotating with the rotating mechanism the first reservoir and the second reservoir about the axis of the rotating mechanism so as to position the second reservoir into the collecting position and the first reservoir away from the collecting position; and
   collecting in the second reservoir a second type of the modeling material that is removed by the leveler.

2. The method according to claim 1, wherein the three-dimensional object is formed by superimposing a plurality of layers on top of each other.

3. The method according to claim 1, wherein the dispensing head comprises an inkjet head.

4. The method according to claim 1, wherein the vacancies of the one or more support material layers are formed based upon slice data.

5. The method according to claim 1, wherein at least one of (i) the one or more support material layers and (ii) the modeling material are formed by one of fused deposition modeling (FDM) and nozzle head printing.

6. The method according to claim 1, further comprising curing the modeling material.

7. The method according to claim 4, wherein the vacancies are formed in the one or more support material layers by ablation.

8. The method according to claim 1,
   wherein forming the vacancies comprises selectively ablating, with an ablation system, each of the one or more support material layers according to slice data corresponding to each of the one or more support material layers,
   wherein filling the vacancies comprises dispensing the modeling material to fill the vacancies formed in each of the one or more support material layers, and
   wherein a resolution of the modeling material is less than a resolution of the selective ablation.

9. The method according to claim 1, wherein the modeling material is cured using a material curing system.

10. The method according to claim 8, wherein the ablation system comprises a laser ablation system.

11. The method according to claim 10, wherein the laser ablation system is configured to provide laser pulses.

12. The method according to claim 10, wherein the ablation system comprises a Computer Numeric Controlled (CNC) system.

13. The method according to claim 1, wherein the dispensing head is part of a drop on demand printing system.

14. The method according to claim 1, wherein the leveler comprises a blade.

15. The method according to claim 1, wherein the leveler comprises a squeegee.

16. The method according to claim 1, wherein the leveler comprises a roller.

17. The method according to claim 1, wherein the leveler comprises an air knife.

18. The method according to claim 1, wherein the leveling of the modeling material includes at least one of: flattening, smoothing and shaping a surface of the modeling material.

19. The method according to claim 1, wherein the modeling material comprises metal.

20. The method according to claim 1, wherein the dispensing head is one of a plurality of dispensing heads, each of the plurality of dispending heads being configured to dispense a separate material that forms the three dimensional object.

21. The method according to claim 1, further comprising ablating the straightened modeling material so as to form a texturized surface that improves an adhesion of the straightened modeling material to a subsequent layer of the three-dimensional object.

* * * * *